US009151963B2

(12) United States Patent
Sato et al.

(10) Patent No.: US 9,151,963 B2
(45) Date of Patent: Oct. 6, 2015

(54) LENS HOLDER DRIVING DEVICE INCLUDING DAMPER COMPOUND SUPPRESSING UNDESIRED RESONANCE

(75) Inventors: Keiichi Sato, Tokyo (JP); Makoto Ariji, Tokyo (JP); Masayoshi Sugawara, Tokyo (JP); Akihiro Moriya, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 394 days.

(21) Appl. No.: 13/586,235

(22) Filed: Aug. 15, 2012

(65) Prior Publication Data

US 2013/0050828 A1 Feb. 28, 2013

(30) Foreign Application Priority Data

Aug. 24, 2011 (JP) ................................. 2011-182462
Mar. 30, 2012 (JP) ................................. 2012-081688

(51) Int. Cl.
*G02B 27/64* (2006.01)
*H04N 5/225* (2006.01)
*G02B 7/08* (2006.01)
(Continued)

(52) U.S. Cl.
CPC .................. *G02B 27/64* (2013.01); *G02B 7/08* (2013.01); *G03B 3/10* (2013.01); *G03B 5/00* (2013.01); *H04N 5/2253* (2013.01); *H04N 5/2254* (2013.01); *G03B 2205/0015* (2013.01); *G03B 2205/0069* (2013.01)

(58) Field of Classification Search
USPC .......... 359/554–557; 396/52–55; 348/208.99, 348/208.1–208.16
See application file for complete search history.

(56) References Cited

U.S. PATENT DOCUMENTS

| 8,849,106 B1* | 9/2014 | Kokichi .......................... 396/55 |
| 2007/0035860 A1* | 2/2007 | Adachi et al. ................. 359/824 |
| 2007/0146883 A1* | 6/2007 | Akada et al. .................. 359/554 |

(Continued)

FOREIGN PATENT DOCUMENTS

| JP | 2008-292900 A | 12/2006 |
| JP | 2007-047494 A | 7/2007 |

(Continued)

OTHER PUBLICATIONS

Foreign Office Action dated Mar. 10, 2015.

(Continued)

*Primary Examiner* — Stephone B Allen
*Assistant Examiner* — Jeffrey Madonna
(74) *Attorney, Agent, or Firm* — Brundidge & Stanger, P.C.

(57) ABSTRACT

A lens holder driving device includes a lens holder moving portion, a fixed member, suspension wires, and a damper compound. In the lens holder moving portion, a lens holder moves in an optical axis and in first and second directions which are orthogonal to the optical axis and which are perpendicular to each other. The fixed member is disposed apart from the lens holder moving portion in the direction of the optical axis. The suspension wires have first end portions fixed to the fixed member at outer regions thereof, extending along the optical axis, having second end portions fixed to an elastic member mounted to the lens holder moving portion, and swingably supporting the lens holder moving portion in the first direction and the second direction. The damper compound is disposed so as to enclose at least one suspension wire and suppresses undesired resonance in the lens holder moving portion.

5 Claims, 43 Drawing Sheets

(51) Int. Cl.
*G03B 3/10* (2006.01)
*G03B 5/00* (2006.01)

(56) References Cited

U.S. PATENT DOCUMENTS

| | | | |
|---|---|---|---|
| 2010/0098394 A1* | 4/2010 | Ishihara et al. | 396/55 |
| 2010/0293940 A1* | 11/2010 | Noda et al. | 60/527 |
| 2011/0103782 A1* | 5/2011 | Tsuruta et al. | 396/55 |
| 2012/0154614 A1* | 6/2012 | Moriya et al. | 348/208.5 |
| 2012/0182436 A1* | 7/2012 | Hu et al. | 348/208.99 |
| 2013/0039640 A1* | 2/2013 | Sekimoto | 396/55 |
| 2013/0050515 A1 | 2/2013 | Wu et al. | |
| 2013/0089311 A1* | 4/2013 | Jung et al. | 396/55 |

FOREIGN PATENT DOCUMENTS

| | | |
|---|---|---|
| JP | 2009-145771 A | 7/2009 |
| JP | 2010-061771 A | 3/2010 |
| JP | 2011-065140 A | 3/2011 |
| JP | 2011-085666 A | 4/2011 |
| JP | 2013-167860 A | 8/2013 |

OTHER PUBLICATIONS

Foreign Office Action dated Mar. 3, 2015.

* cited by examiner

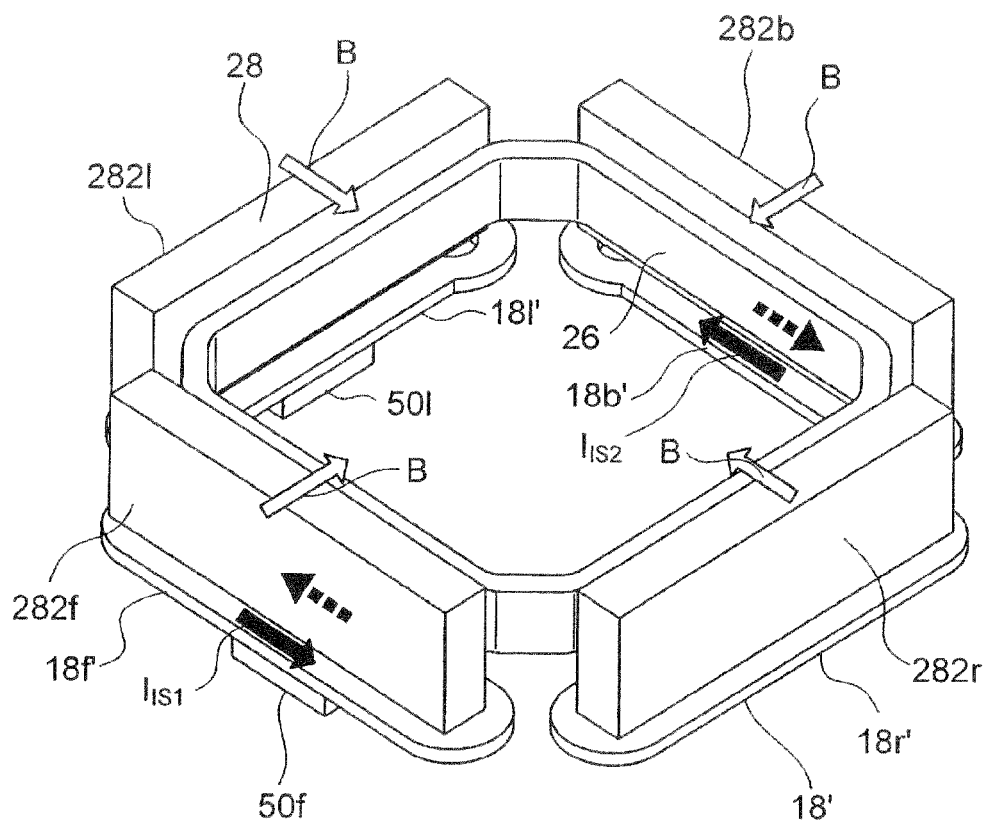
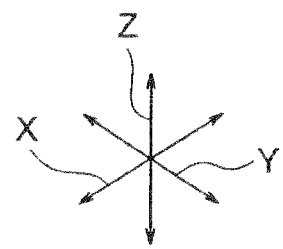
FIG. 5
RELATED ART

|  | BAND NOT HIGHER THAN PRIMARY RESONANCE FREQUENCY $|a|>|b|$ | BAND NOT LOWER THAN PRIMARY RESONANCE FREQUENCY $|a|>|b|$ | BAND NOT LOWER THAN PRIMARY RESONANCE FREQUENCY $|a|<|b|$ |
|---|---|---|---|
| MAGNETIC FLUX DENSITY GIVEN BY MAGNET: a | 0deg | -180deg | -180deg |
| MAGNETIC FLUX DENSITY GENERATED IN COIL: b | 0deg | 0deg | 0deg |
| TOTAL MAGNETIC FLUX DENSITY: a+b | 0deg | -180deg | 0deg |

FIG. 10
RELATED ART

|  | BAND NOT HIGHER THAN PRIMARY RESONANCE FREQUENCY $|a|>|b|$ | BAND NOT LOWER THAN PRIMARY RESONANCE FREQUENCY $|a|>|b|$ | BAND NOT LOWER THAN PRIMARY RESONANCE FREQUENCY $|a|>|b|$ |
| --- | --- | --- | --- |
| MAGNETIC FLUX DENSITY GIVEN BY MAGNET: a | 0deg | -180deg | -180deg |
| MAGNETIC FLUX DENSITY GENERATED IN COIL: b | -180deg | -180deg | -180deg |
| TOTAL MAGNETIC FLUX DENSITY: a+b | 0deg | -180deg | -180deg |

FIG. 17

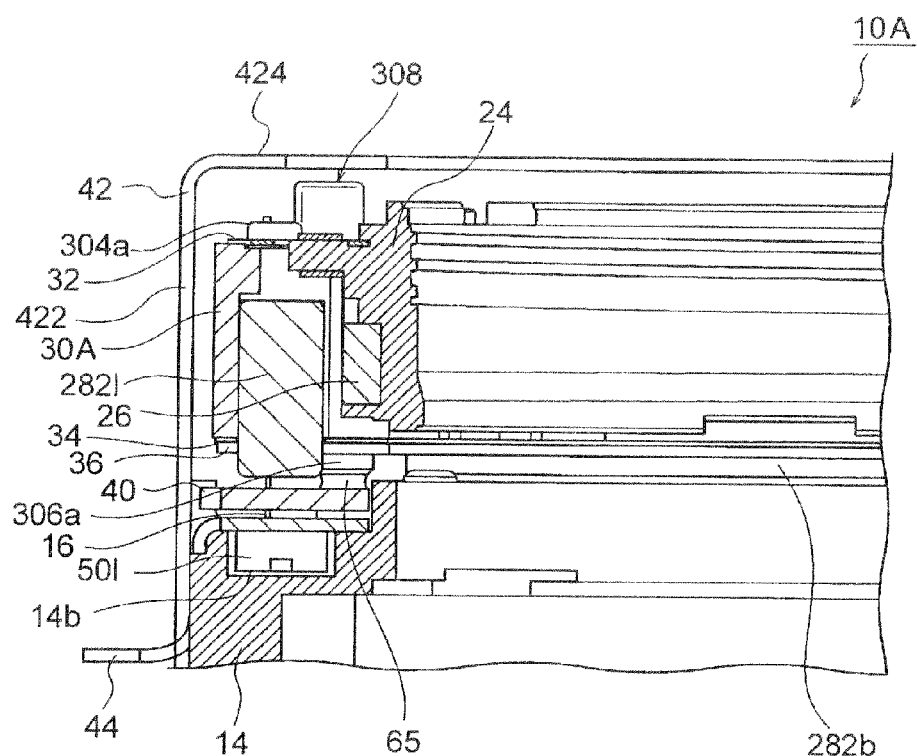
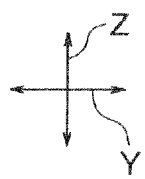
FIG. 36

LENS HOLDER DRIVING DEVICE INCLUDING DAMPER COMPOUND SUPPRESSING UNDESIRED RESONANCE

This application is based upon and claims the benefit of priority from Japanese Patent Application No. JP-2011-182462, filed on Aug. 24, 2011, and Japanese Patent Application No. JP-2012-81688, filed on Mar. 30, 2012, the disclosures of which are incorporated herein in their entirety by reference.

BACKGROUND OF THE INVENTION

This invention relates to a lens holder driving device and, in particular, to a lens holder driving device capable of picking up a still image without blurry images by stabilizing the blurry images (movement) occurring upon shooting the still image using a miniature camera for a mobile terminal.

Hitherto, various lens holder driving devices has been proposed which are capable of taking photographs with a high degree by stabilizing blurry images on an image-forming surface although there are blurry images (movement) upon shooting the still image.

By way of illustration, two of the present co-inventors proposed an image stabilizer which is capable of miniaturizing and lowering a height by sharing a permanent magnet for an auto-focusing (AF) lens driving device as a permanent magnet for the image stabilizer (see, Japanese Unexamined Patent Application Publication No. 2011-65140 (JP-A-2011-065140) (which will be also called Patent Document 1)).

The image stabilizer disclosed in Patent Document 1 is called an image stabilizer of "a barrel shift method" because blurry images are stabilized by moving a lens barrel received in an AF lens driving device (a lens holder moving portion) in itself. In addition, the image stabilizers of "the barrel shift method" are classified into "a moving magnet method" in which the permanent magnet moves (is movable) and "a moving coil method" in which the coil moves (is movable).

Patent Document 1 discloses, as the image stabilizer of "the moving magnet method" in a second exemplary embodiment thereof, an image stabilizer which is provided with a permanent magnet comprising four first permanent magnet pieces and four second permanent magnet pieces which are disposed so as to apart from up and down in a direction of an optical axis and which is provided with a stabilizer coil disposed between the upper four first permanent magnet pieces and the lower four second permanent magnet pieces. That is, the second exemplary embodiment comprises the image stabilizer of "the moving magnet method" including the permanent magnet comprising eight permanent magnet pieces in total.

In the image stabilizer disclosed in Patent Document 1, a base is disposed so as to apart from at a bottom portion of the auto-focusing lens driving device and a plurality of suspension wires have one ends which are fixed to the base at outer regions thereof. The plurality of suspension wires has other ends which are firmly fixed to the auto-focusing lens driving device (the lens holder moving portion).

In the image stabilizer disclosed in Patent Document 1, the plurality of suspension wires swingably support the auto-focusing lens driving device (the lens holder moving portion). Therefore, there is a problem in which the auto-focusing lens driving device (the lens holder moving portion) resonates undesirably.

Japanese Unexamined Patent Application Publication No. 2011-85666 (JP-A-2011-085666) (which will be also called Patent Document 2) also discloses a lens driving device which shares an AF control magnet as an image stabilizer control magnet. The lens driving device disclosed in Patent Document 2 comprises a lens holder including a first coil (an AF coil) disposed at an outer periphery of a lens, a magnet holder configured to fix a magnet having a first surface facing the first coil, springs for supporting the lens holder so as to couple the lens holder with the magnet holder and also so that the lens holder is moved with respect to the magnet in a direction of an optical axis, and a base member configured so that a second coil (an image stabilizer coil) is fixed to face a second surface of the magnet that is perpendicular to the first surface thereof. A lens holding unit, which comprises the lens holder, the magnet, the magnet holder, and the springs, is held so as to be relatively movable in a direction perpendicular to the optical axis relative to the base member.

Patent Document 2 discloses the lens driving device as a six exemplary embodiment in which a position detection sensor is disposed at a clearance of the image stabilizer coil wound. A Hall element is used as the position detection sensor. In addition, the lens holding unit is held by four suspension wires which are disposed to a fixed portion at four corners thereof. That is, the four suspension wires have one ends fixed to the four corners of the fixed portion and other ends which are firmly fixed to the lens holding unit.

In also the lens driving device disclosed in Patent Document 2, the four suspension wires swingably support the lens holding unit. As a result, in the manner similar to the image stabilizer disclosed in Patent Document 1, there is a problem in which the lens holding unit resonates undesirably.

Accordingly, it is impossible to carry out operation with stability in the devices disclosed in Patent Documents 1 and 2.

On the other hand, Japanese Unexamined Patent Application Publication No. 2009-145771 (JP-A-2009-145771) (which will be also called Patent Document 3) discloses "an image stabilizing device" which is capable of reducing influence of unnecessary resonance. The image stabilizing device disclosed in Patent Document 3 comprises a movable member for holding stabilizing means for stabilizing blurred images, a fixed member supporting the movable member movably within a plane orthogonal to an optical axis of an image pickup optical system, driving means changing a relative position of the movable member with respect to the fixed member, and damping means disposed between the movable member and the fixed member. In Patent Document 3, by arranging the damping means to suitable positions, resonance of translational motion which is motion within the plane orthogonal to the optical axis and resonance by rotation around the optical axis are suppressed (attenuated).

The image stabilizing device disclosed in Patent Document 3 merely suppresses (attenuates) the resonance by movement (the translational motion and the rotation around the optical axis) on the plane orthogonal to the optical axis.

SUMMARY OF THE INVENTION

It is therefore an exemplary object of the present invention to provide a lens holder driving device which is capable of carrying out operation with stability.

Other objects of this invention will become clear as the description proceeds.

On describing the gist of an exemplary aspect of this invention, it is possible to be understood that a lens holder driving device comprises a lens holder moving portion in which a lens holder moves in a direction of an optical axis and in first and second directions which are orthogonal to the optical axis and which are perpendicular to each other, and a fixed member disposed apart from the lens holder moving portion in the direction of the optical axis. According to the exemplary aspect of this invention, the lens holder driving device comprises: an elastic member mounted to the lens holder moving portion; a plurality of suspension wires having first end portions fixed to the fixed member at outer regions thereof, extending along the optical axis, having second end portions fixed to the elastic member, and swingably supporting the lens holder moving portion in the first direction and the second direction; and at least one damper compound disposed so as to enclose at least one suspension wire among the plurality of suspension wires to suppress undesired resonance in the lens holder moving portion.

BRIEF DESCRIPTION OF THE DRAWING

FIG. 5 is a perspective view showing a relationship between a related magnetic circuit and Hall elements;

FIG. 10 is a view tabulated for the relationships of FIGS. 9A-9C;

FIG. 17 is a view tabulated for the relationships of FIGS. 16A-16C;

FIG. 36 is a partial vertical cross sectional view of the lens holder driving device illustrated in FIG. 35;

DESCRIPTION OF THE PREFERRED EMBODIMENTS

Referring now to Figures, the description will proceed to exemplary embodiments of the present invention.

First Exemplary Embodiment

Figure 1:
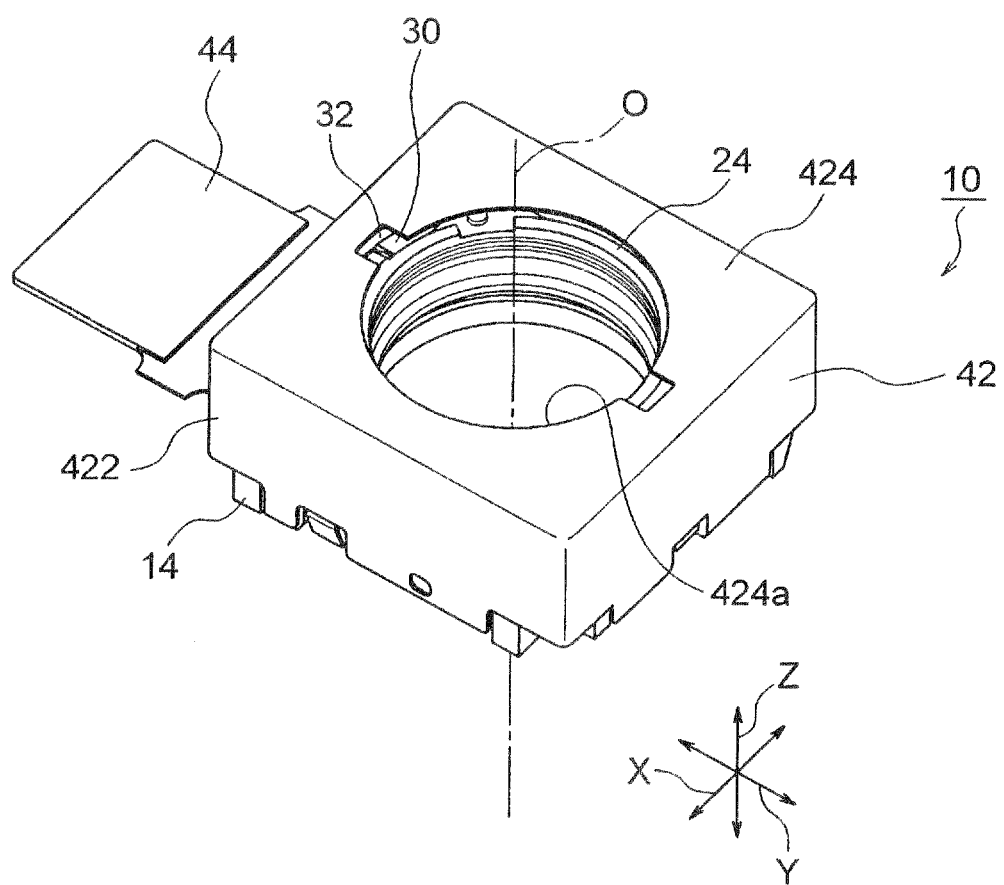
FIG. 1 is an external perspective view of a lens holder driving device according to a first exemplary embodiment of the present invention.
Figure 2:
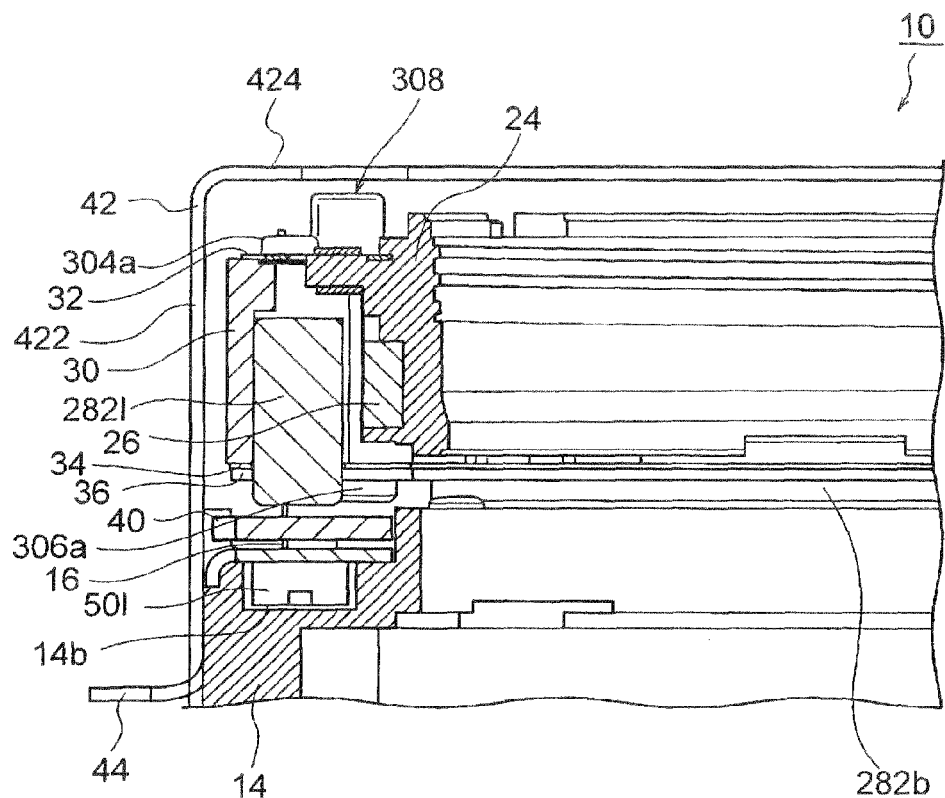
FIG. 2 is a partial vertical cross sectional view of the lens holder driving device illustrated in FIG. 1.
Figure 3:
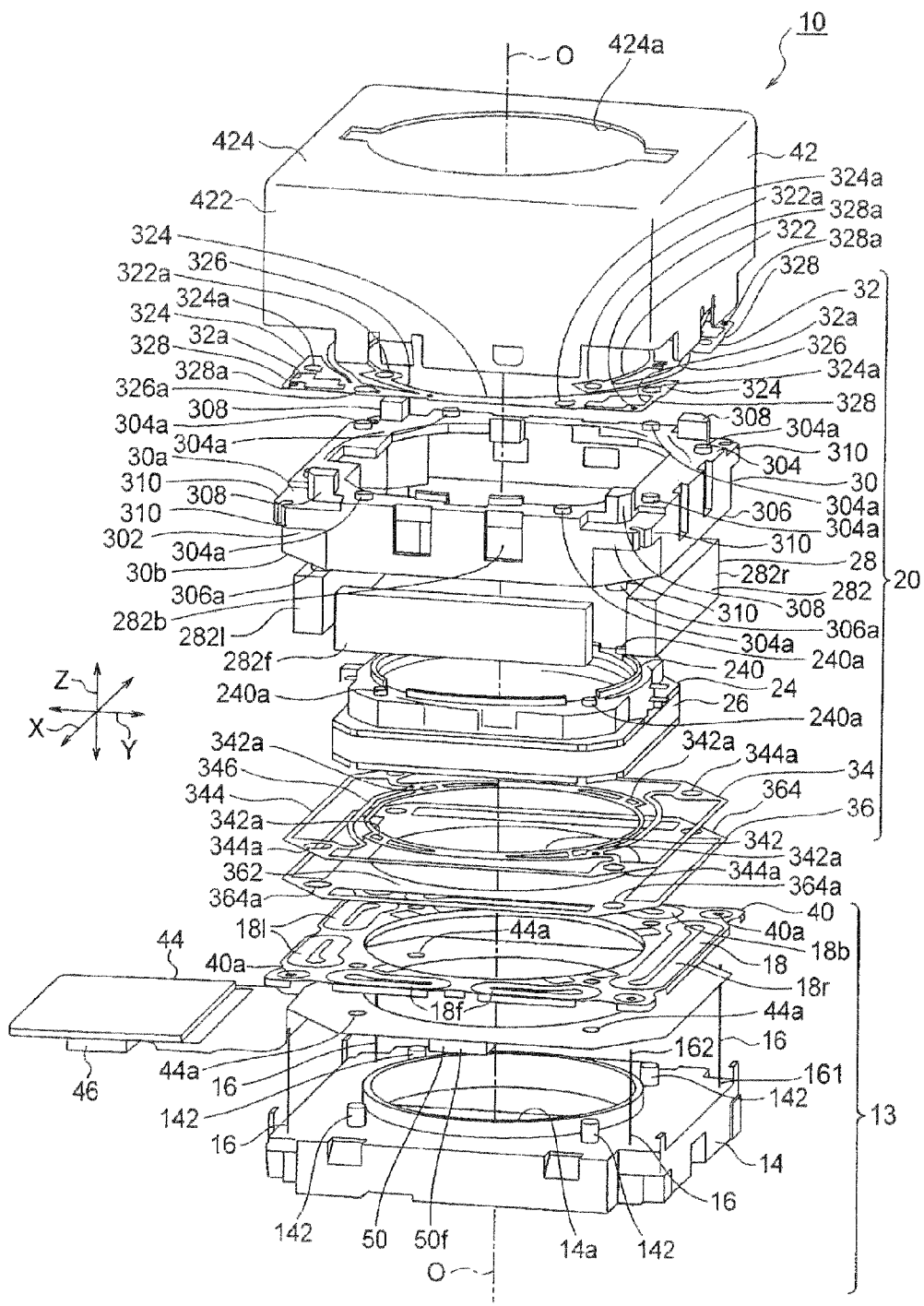
FIG. 3 is an exploded perspective view of the lens holder driving device illustrated in FIG. 1.

Referring to FIGS. 1 through 3, the description will proceed to a lens holder driving device 10 according to a first exemplary embodiment of this invention. FIG. 1 is an external perspective view of the lens holder driving device 10. FIG. 2 is a partial vertical cross sectional view of the lens holder driving device 10. FIG. 3 is an exploded perspective view of the lens holder driving device 10.

Herein, in the manner shown in FIGS. 1 through 3, an orthogonal coordinate system (X, Y, Z) is used. In a state illustrated in FIGS. 1 through 3, in the orthogonal coordinate system (X, Y, X), an X-axis direction is a fore-and-aft direction (a depth direction), a Y-axis direction is a left-and-right direction (a width direction), and a Z-axis direction is an up-and-down direction (a height direction). In addition, in the example being illustrated in FIGS. 1 through 3, the up-and-down direction Z is a direction of an optical axis O of a lens. In the first exemplary embodiment, the X-axis direction (the fore-and-aft direction) is called a first direction while the Y-axis direction (the left-and-right direction) is called in a second direction.

However, in an actual use situation, the direction of the optical axis O, namely, the Z-axis direction becomes a fore-and-aft direction. In other words, an upper direction of the Z-axis becomes a front direction while a lower direction of the Z-axis becomes a rear direction.

The illustrated lens driving device 10 is mounted to a mobile terminal such as a camera-equipped cellular mobile phone which is enable to automatic focusing, a smart phone, a notebook personal computer, a tablet-type personal computer, a mobile-type game machine, a Web camera, a vehicle-mounted camera, or the like. The lens holder driving device 10 comprises an auto-focusing lens holder driving portion 20 which will later be described, and an image stabilizer portion (which will later be described) for stabilizing blurry images (vibrations) occurring in the auto-focusing lens holder driving portion 20 upon shooting a still image using a miniature camera for the mobile terminal and is a device which is capable of picking up the still image without image blurred. The image stabilizer portion of the lens holder driving device 10 stabilizes the blurry images by moving the auto-focusing lens holder driving portion 20 in the first direction (the fore-and-aft direction) X and the second direction (the left-and-right direction) Y which are orthogonal to the optical axis O and which are perpendicular to each other.

In other words, the illustrated lens holder driving device 10 comprises a lens holder moving portion (which will later be described) in which a lens holder 24 moves in an optical axis O and in the first direction (the fore-and-aft direction) X and the second direction (the left-and-right direction) Y which are orthogonal to the optical axis O and which are perpendicular to each other, and a fixed member 13 (which will later be described) disposed apart from the lens holder moving portion in the direction of the optical axis O.

The auto-focusing lens holder driving portion 20 is for moving the lens holder 14 (which will later be described) capable of mounting a lens barrel 12 (see, FIG. 33) along the optical axis O. Apart from a bottom portion of the auto-focusing lens holder driving portion 20, the fixed member 13 is disposed. Although illustration is not made, the fixed member 13 has a lower portion (a rear portion) on which an image pickup device (a sensor) 76 (see, FIG. 33) disposed on a sensor board 72 (see, FIG. 33) is mounted. The image pickup device 76 picks up a subject image formed by the lens barrel 12 to convert it into an electric signal. The image pickup device 76 may, for example, comprise a CCD (charge coupled device) type image sensor, a CMOS (complementary metal oxide semiconductor) type image sensor, or the like. Accordingly, a camera module 70 (see, FIG. 33) comprises a combination of the lens barrel 12, the auto-focusing lens holder driving portion 20, the sensor board 72, and the image pickup device 76.

The fixed member 13 comprises a base 14, a coil board 40, an image stabilizer coil (a driving coil) 18, a flexible printed circuit (FPC) 44.

The base 14 has a ring-shaped which has the outside shape of a rectangular and which has a circular opening 14a in the interior thereof.

The image stabilizer portion of the lens holder driving device 10 comprises four suspension wires 16 having first end portions 161 fixed to four corner portions of the fixed member 13, and the image stabilizer coil (the driving coil) 18 disposed to face a permanent magnet 28 of the auto-focusing lens holder driving portion 20 (which will later be described) in the manner which will later be described.

The four suspension wires 16 extend along the optical axis O and swingably support the auto-focusing lens holder driving portion 20 (the lens holder moving portion) as a whole in the first direction (the fore-and-aft direction) X and the second direction (the left-and-right direction) Y. The four suspension wires 16 have second end portions 162 which are fixed to an upper end portion of the above-mentioned auto-focusing lens holder driving portion 20 in the manner which will later be described.

In the manner described above, the four suspension wires 16 serves as a supporting member for swingably supporting the auto-focusing lens holder driving portion 20 with respect to the fixed member 13 in the first direction Y and the second direction Y.

The image stabilizer portion of the lens holder driving device 10 comprises the coil board 40 having a rectangular ring shape that is disposed apart from to face the permanent magnet 28 in the manner which will later be described. The coil board 40 is mounted on the base 14 with the flexible printed circuit (FPC) 44 which will later be described is sandwiched therebetween. The above-mentioned image stabilizer coil (the driving coil) 18 is formed on the coil board 40.

In the manner which is described above, the fixed member 13 comprises a combination of the base 14, the coil board 40, the image stabilizer coil (the driving coil) 18, and the flexible printed circuit (FPC) 44.

Referring now to FIG. 3, the description will proceed to the auto-focusing lens holder driving portion 20. The auto-focusing lens holder driving portion 20 is also called an AF unit.

The auto-focusing lens holder driving portion 20 comprises the above-mentioned lens holder 24 including a tubular portion 240 for holding the lens barrel 12, a ring-shaped focusing coil 26 fixed to the lens holder 24 so as to position around the tubular portion 240 thereof, a magnet holder 30 for holding the permanent magnet 28 disposed opposite to the focusing coil 26 at the outside of the focusing coil 26, and first and second leaf springs 32 and 34 mounted on first and second ends 30a and 30b of the magnetic holder 30 in the direction of the optical axis O, respectively. The first and the second leaf springs 32 and 34 are collectively called an elastic member (32, 34).

In addition, a combination of the focusing coil 26, the permanent magnet 28, and the magnet holder 30 constitutes the above-mentioned lens holder moving portion (26, 28, 30). In other words, the lens holder moving portion (26, 28, 30) is a portion where the lens holder 24, the elastic member (32, 34), and a spacer 36 (which will later be described) are omitted from the auto-focusing lens holder driving portion 20.

The first and second springs 32 and 34 support the lens holder 24 in the direction of the optical axis O shiftably so as to position the lens holder 24 in a radial direction. In the example being illustrated, the first leaf spring 32 is called an upper leaf spring while the second leaf spring 34 is called a lower leaf spring.

In addition, in the manner which is described above, in the actual use situation, the upper direction in the Z-axis direction (the direction of the optical axis O) becomes the front direction while the lower direction in the Z-axis direction (the direction of the optical axis O) becomes the rear direction. Accordingly, the upper leaf spring 32 is also called a front-side spring while the lower leaf spring 34 is also called a rear-side spring.

The magnet holder 30 has configuration of a substantially octagonal tube. Specifically, the magnet holder 30 comprises an outer tubular portion 302 having an octagonal tubular shape, an octagonal upper ring-shaped end portion 304 provided at an upper end (a front end, the first end) 30a of the outer tubular portion 302, and an octagonal lower ring-shaped end portion 306 provided at a lower end (a rear end, the second end) 30b of the outer tubular portion 302. The upper ring-shaped end portion 304 has eight upper protrusions 304a which project at four corners upwards by two per corner. The lower ring-shaped end portion 306 has four lower protrusions 306a which project at four corners downwards.

The focusing coil 26 has an octagonal cylindrical shape which coincides with an outer shape of the magnet holder 30 having the octagonal tubular shape. The permanent magnet 28 comprises four rectangular permanent magnet pieces 282 which are disposed in the outer tubular portion 302 having the octagonal tubular shape in the magnet holder 30 so as to apart from each other in the first direction (the fore-and-aft direction) X and the second direction (the left-and-right direction) Y. The four permanent magnet pieces 282 are disposed with spaces between them and the focusing coil 26. In the example being illustrated, each permanent magnet piece 282 has an inner end side polarised (magnetized) to the north pole and an outer end side polarised (magnetized) to the south pole.

The upper leaf spring (the front-side spring) 32 is disposed at an upper side (a front side) of the lens holder 24 in the direction of the optical axis O while the lower leaf spring (the rear-side spring) 34 is disposed at a lower side (a rear side) of the lens holder 24 in the direction of the optical axis O.

The upper leaf spring (the front-side spring) 32 comprises an upper inner end portion 322 mounted on an upper end portion of the lens holder 24 in the manner which will later be described and an upper outer end portion 324 mounted on the upper ring-shaped end portion 304 of the magnet holder 30 in the manner which will later be described. Between the upper inner end portion 322 and the upper outer end portion 324, a plurality of upper arm portions 326 are provided. That is, the plurality of upper arm portions 326 connects the upper inner end portion 322 to the upper outer end portion 324.

The tubular portion 240 of the lens holder 24 has, at an upper end thereof, four upper protrusions 240a projecting at four corners upwards. The upper inner end portion 322 has four upper holes 322a in which the four upper protrusions 240a are compression inserted (charged), respectively. That is, the four upper protrusions 240a of the tubular portion 240 of the lens holder 243 are compression inserted (charged) in the four upper holes 322a of the upper inner end portion 322 of the upper leaf spring 32, respectively.

On the other hand, the upper outer end portion 324 has eight upper holes 324a in which the eight upper protrusions 34a of the magnet holder 30 are charged, respectively. That is, the eight upper protrusions 34a of the magnet holder 30 are charged in the eight upper holes 324a of the upper outer end portion 324.

The upper leaf spring (the front-side spring) 32 further comprises four arc-shaped extending portions 328 which extend at four corers of the upper outer end portion 324 in the radial direction outwards. The four arc-shaped extending portions 328 have four wire fixing holes 328a in which the second end portions 162 of the four suspension wires 16 are inserted (charged), respectively. A detailed structure of each arc-shaped extending portion 328 will later be described with reference to FIG. 19 in detail.

The lower leaf spring (the rear-side spring) 34 comprises a lower inner end portion 342 mounted on a lower end portion of the lens holder 24 in the manner which will later be described and a lower outer end portion 344 mounted on the lower ring-shaped end portion 306 of the magnet holder 30 in the manner which will later be described. Between the lower inner end portion 342 and the lower outer end portion 344, a plurality of lower arm portions 346 are provided. That is, the plurality of lower arm portions 346 connects the lower inner end portion 342 to the lower outer end portion 344.

The lower leaf spring 34 has a lower portion in which a spacer 36 having a substantially same outside shape is disposed. More specifically, the spacer 36 comprises an outer ring portion 364 having a shape which is substantially equivalent to that of the lower outer end portion 344 of the lower leaf spring 34 and an inner ring portion 362 having a shape so as to cover the lower inner end portion 342 and the lower arm portions 346 of the lower leaf spring.

The tubular portion 240 of the lens holder 24 has, at a lower end, four lower protrusions (not shown) projecting at four corners downwards. The lower inner end portion 342 has four lower holes 342a in which the four lower protrusions are compression inserted (charged), respectively. That is, the four lower protrusions of the tubular portion 240 of the lens holder 24 are compression inserted (charged) in the four lower holes 342a of the lower inner end portion 342 of the lower leaf spring 34.

On the other hand, the lower outer end portion 344 of the lower leaf spring 34 has four lower holes 344a in which the four lower protrusions 306a of the magnet holder 30 are charged, respectively. The outer ring portion 364 of the spacer 36 also has four lower holes 364a in which the four lower protrusions 306a of the magnet holder 30 are compression inserted at positions corresponding to the four lower holes 344a, respectively. That is, the four lower protrusions 306a of the magnet holder 30 are compression inserted in the four lower holes 364a of the outer ring portion 364 of the spacer 36 via the four lower holes 344a of the lower outer end portion 344 of the lower leaf spring 34, respectively, to be thermally welded at tips thereof.

As apparent from FIG. 2, the four lower protrusions 306a of the magnet holder 30 project so as to get near toward the coil board 40. In other words, it is understood that clearance between the four lower protrusions 306a and the coil board 40 becomes narrow in comparison with clearance in other areas (i.e. clearance between the spacer 36 and the coil board 40).

The elastic member (32, 34) comprising the upper leaf spring 32 and the lower leaf spring 34 serves as a guiding arrangement for guiding the lens holder 24 so as to be movable in the direction of the optical axis O alone. Each of the upper leaf spring 32 and the lower leaf spring 34 comprises a spring member made of beryllium copper, nickel copper, stainless steel, or the like.

The tubular portion 240 of the lens holder 24 has an inner wall in which a female screw thread (not shown) is cut. On the other hand, although the illustration is not made, the lens barrel 12 has an outer wall in which a male screw thread screwed in the above-mentioned female screw thread is cut. In a case of fitting the lens barrel 12 to the lens holder 24, it includes the steps of rotating the lens barrel 12 with respect to the tubular portion 240 of the lens holder 24 around the optical axis O to screw it along the direction of the optical axis O thereby accommodating the lens barrel 12 in the lens holder 24, and of connecting them to each other via an adhesive agent or the like.

In the manner which will later be described, by flowing an auto-focusing (AF) current through the focusing coil 26, it is possible to positionally adjust the lens holder 24 (the lens barrel 12) in the direction of the optical axis O according to interaction between a magnetic field of the permanent magnet 28 and a magnetic field due to the AF current flowing through the focusing coil 26.

In the manner which is described above, the auto-focusing lens holder driving portion (the AF unit) 20 comprises the lens holder 24, the focusing coil 26, the permanent magnet 28, the magnet holder 30, the upper leaf spring 32, the lower leaf spring 34, and the spacer 36.

Referring now to FIG. 3, the description will proceed to the image stabilizer portion of the lens holder driving device 10 in more detail.

In the manner which is described above, the image stabilizer portion of the lens holder driving device 10 comprises the four suspension wires 16 having the first end portion 161 fixed to the fixed member 13 at the four corner portions thereof, and the image stabilizer coil (the driving coil) 18 disposed to face the permanent magnet 28 of the above-mentioned auto-focusing lens holder driving portion 20 (the lens holder moving portion (26; 28; 30)).

The four suspension wires 16 extend along the optical axis O and swingably support the auto-focusing lens holder driving portion 20 (the lens holder moving portion (26; 28; 30)) as a whole in the first direction (the fore-and-aft direction) X and the second direction (the left-and-right direction) Y. The four suspension wires 16 have the second end portions 162 which are fixed to the upper end portion of the above-mentioned auto-focusing lens holder driving portion 20 (the lens holder moving portion (26; 28; 30)).

More specifically, in the manner which is described above, the four arc-shaped extending portions 328 of the upper leaf spring 32 have the four wire fixing holes 328a in which the second end portions 162 of the four suspension wires 16 are inserted (charged), respectively (see, FIG. 3). In the four wire fixing holes 328a, the second end portions 162 of the four suspension wires 16 are inserted (charged) and are fixed by means of an adhesive agent, solder, or the like.

Although each arc-shaped extending portion 328 has an L-shape in the example being illustrated, of course, it is not limited to this.

Two of the four suspension wires 16 are also used to feed to the focusing coil 26.

In the manner which is described above, the permanent magnet 28 comprises the four permanent magnet pieces 282 which are disposed so as to oppose to each other in the first direction (the fore-and-aft direction) X and the second direction (the left-and-right direction) Y.

The image stabilizer portion of the lens holder driving device 10 comprises the ring-shaped coil board 40 which is inserted between the four permanent magnet pieces 282 and the base 14 and which is disposed so as to apart from them. The coil board 40 has, at four corners thereof, four through holes 40a through which the four suspension wires 16 pass and in which the first end portions 161 are fixed. The above-mentioned image stabilizer coil (the driving coil) 18 for driving the lens holder moving portion (26; 28; 30) is formed on the coil board 40.

In the manner which is described above, the combination of the base 14, the coil board 40, the image stabilizer coil (the driving coil) 18, and the flexible printed circuit (FPC) 44 serves as the fixed member 13 disposed apart from the auto-focusing coil holder driving portion 20 (the lens holder moving portion (26; 28; 30)) in the direction of the optical axis O.

Herein, in the four permanent magnet pieces 282, the permanent magnet pieces disposed with respect to the optical axis O at a front side, a rear side, a left side, and a right side are called a front-side permanent magnet piece 282f, a rear-side permanent magnet piece 282r, a left-side permanent magnet piece 282l, and a right-side permanent magnet piece 282r, respectively.

Figure 4:
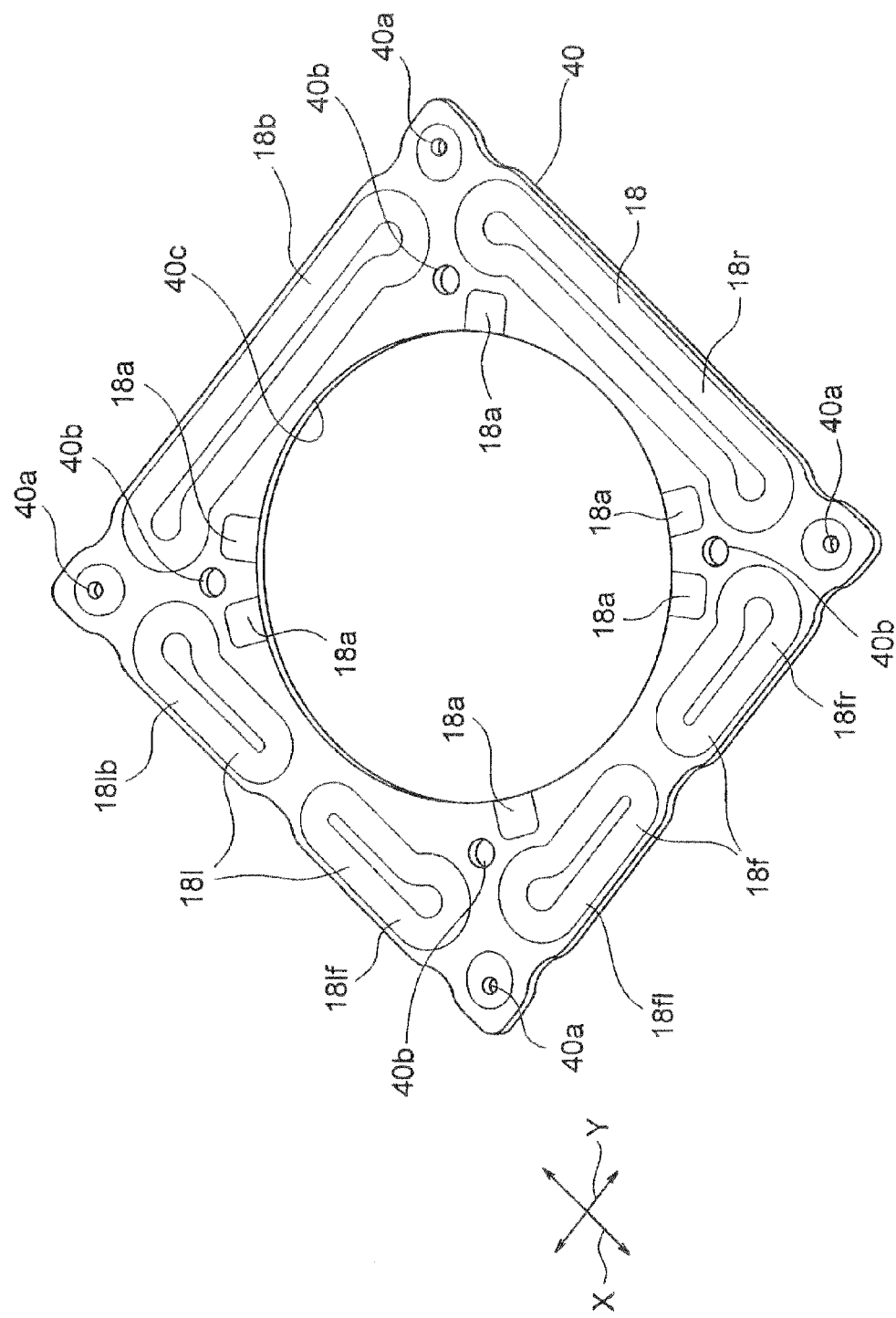
FIG. 4 is a perspective view of a coil board and an image stabilizer coil (a driving coil) formed therein which are used in the lens holder driving device illustrated in FIG. 1.

Referring to FIG. 4 also, on the coil board 40, four image stabilizer coil portions (driving coil portions) 18f, 18b, 18l, and 18r are formed as the image stabilizer coil (the driving coil) 18.

Disposed opposite to each other in the first direction (the fore-and-aft direction) X, the two image stabilizer coil portions (the driving coil portions) 18f and 18b are for moving (swinging) the auto-focusing lens holder driving portion (the AF unit) 20 (the lens holder moving portion (26; 28; 30)) in the first direction (the fore-and-aft direction) X. Such two image stabilizer coil portions (the driving coil portions) 18f and 18b are collectively called a first direction actuator. Herein, the image stabilizer coil portion 18f disposed at a front side with respect to the optical axis O is called "a front-side image stabilizer coil portion" while the image stabilizer coil portion 18b disposed at a back side with respect to the optical axis O is called "a back-side image stabilizer coil portion".

On the other hand, disposed opposite to each other in the second direction (the left-and-right direction) Y, the two image stabilizer coil portions (the driving coil portions) 18l and 18r are for moving (swinging) the auto-focusing lens holder driving portion (the AF unit) 20 (the lens holder moving portion (26; 28; 30)) in the second direction (the left-and-right direction) Y. Such two image stabilizer coil portions (the driving coil portions) 18l and 18r are collectively called a second direction actuator. Herein, the image stabilizer coil portion 18l disposed at a left side with respect to the optical axis O is called "a left-side image stabilizer coil portion" while the image stabilizer coil portion 18r disposed at a right side with respect to the optical axis O is called "a right-side image stabilizer coil portion".

As shown in FIG. 4, in the illustrated image stabilizer coil (the driving coil) 18, each of the front-side image stabilizer coil portion 18f and the left-side image stabilizer coil portion 18l is divided into two coil parts so as to separate at a center in a longitudinal direction of the front-side permanent magnet piece 182f and the left-side permanent magnet piece 182l opposite thereto, respectively. That is, the front-side image stabilizer coil portion 18f comprises a left-side coil part 18fl and a right-side coil part 18fr. Likewise, the left-side image stabilizer coil portion 18l comprises a front-side coil part 181f and a back-side coil part 181b.

In other words, each of the front-side image stabilizer coil portion 18f and the left-side image stabilizer coil portion 18r comprises two loop portions while each of the back-side image stabilizer coil portion 18b and the right-side image stabilizer coil portion 18r comprises only one loop portion.

In the manner which is described above, among the four image stabilizer coil portions (the driving coil portions) 18f, 18b, 18l, and 18r, each of two particular image stabilizer coil portions 18f and 18l disposed in the first direction X and the second direction Y is divided into the two coil parts 18fl, 18fr and 181f, 181b so as to separate it at the center of the longitudinal direction of the permanent magnet pieces 282f and 282l opposite thereto.

The four image stabilizer coil portions (the driving coil portions) 18f, 18b, 18l, and 18r configured as described above in cooperation with the permanent magnet 28 are for driving the auto-focusing lens holder driving portion (the AF unit) 20 (the lens holder moving portion (26; 28; 30)) as a whole in the X-axis direction (the first direction) and the Y-axis direction (the second direction). A combination of the four image stabilizer coil portions (the driving coil portions) 18f, 18b, 18l, and 18r and the permanent magnet 28 serves as a voice coil motor (VCM).

In the manner which is described above, the illustrated image stabilizer portion of the lens holder driving device 10 stabilizes the blurry images by moving the lens barrel 12 received in the auto-focusing lens holder driving portion (the AF unit) 20 (the lens holder moving portion (26; 28; 30)) itself in the first direction (the fore-and-aft direction) X and the second direction (the left-and-right direction) Y. Accordingly, the image stabilizer portion of the lens holder driving device 10 is called an image stabilizer portion of "a barrel shift method".

Turning back to FIG. 3, the lens holder driving device 10 further comprises a shielding cover 42 for covering the auto-focusing lens holder driving portion (the AF unit) 20. The shielding cover 42 comprises a rectangular tubular portion 422 for covering an outer periphery of the auto-focusing lens holder driving portion (the AF unit) 20 and a ring-shaped upper end portion 424 for covering an upper surface of the auto-focusing lens holder driving portion (the AF unit) 20. The upper end portion 424 has a circular opening 424a concentric with the optical axis O.

The illustrated image stabilizer portion of the lens holder driving device 10 further comprises a position detection arrangement 50 for detecting a position of the auto-focusing lens holder driving portion (the AF unit) 20 (the lens holder moving portion (26; 28; 30)) with respect to the base 14 (the fixed portion 13). The illustrated position detection arrangement 50 comprises a magnetic position detection arrangement comprising two Hall elements 50f and 50l mounted on the base 14 (see, FIG. 11). The two Hall elements 50f and 50l are disposed so as to oppose with a space to two of the four permanent magnet pieces 282, respectively, in the manner which will later be described. As shown in FIG. 2, each Hall element 50f and 50l is disposed so as to cross in a direction from the north pole to the south pole in the permanent magnet piece 282.

In the example being illustrated, one Hall element 50f is called a front-side Hall element because the Hall element 50f is disposed at a front side in the first direction (the fore-and-aft direction) X with respect to the optical axis O. Another Hall element 50l is called a left-side Hall element because the Hall element 50l is disposed at a left side in the second direction (the left-and-right direction) Y with respect to the optical axis O.

The front-side Hall element 50f is disposed on the base 14 at a position where the front-side image stabilizer coil portion 18f having the divided two coil parts 18fl and 18fr is separated into the two coil parts 18fl and 18fr. Similarly, the left-side Hall element 50l is disposed on the base 14 at a position where the left-side image stabilizer coil portion 18l having the divided two coil parts 181f and 181b is separated into the two coil parts 181f and 181b.

In the manner which is described above, the two Hall elements 50*f* and 50*l* are disposed on the base 14 at the positions where particular two image stabilizer coil portions 18*f* and 18*l* having the divided two coil parts 18*fl*, 18*fr* and 181*f*, 181*b* are separated into two coil parts 18*fl*, 18*fr* and 181*f*, 191*b*.

The front-side Hall element 50*f* detects a first position with a movement (a swing) in the first direction (the fore-and-aft direction) X by detecting a magnetic force of the front-side permanent magnet piece 282*f* opposite thereto. The left-side Hall element 50*l* detects a second position with a movement (a swing) in the second direction (the left-and-right direction) Y by detecting a magnetic force of the left-side permanent magnet piece 282*l* opposite thereto.

Figure 6:
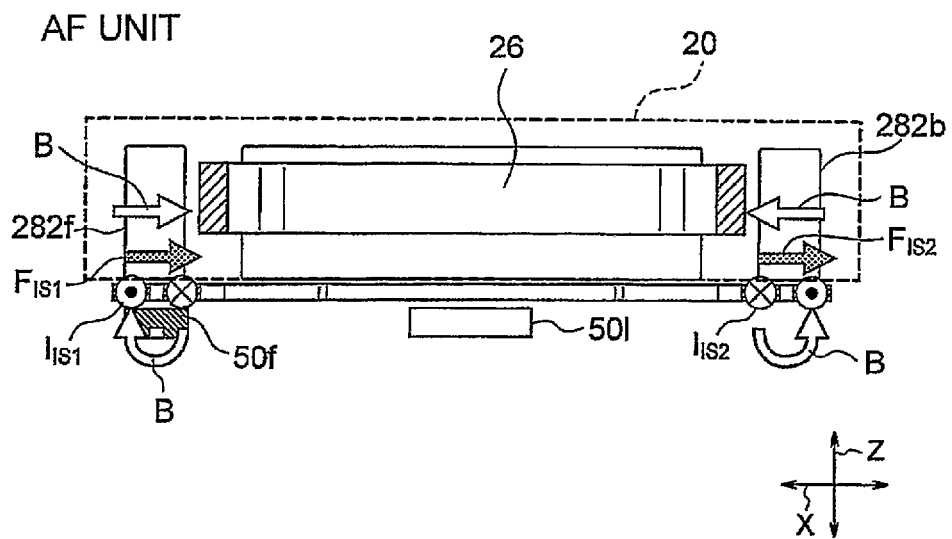
FIG. 6 is a vertical cross sectional view showing a relationship between the related magnetic circuit and the Hall elements.
Figure 7:
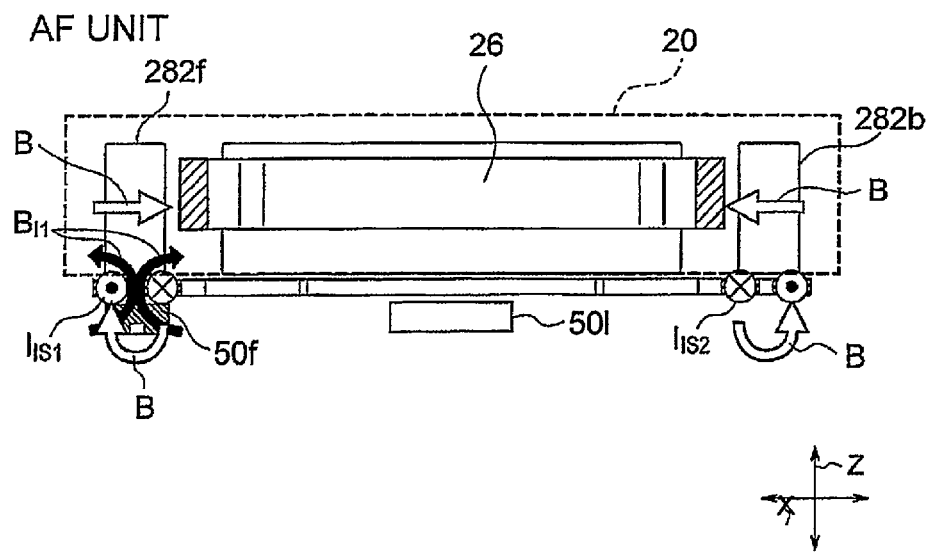
FIG. 7 is a vertical cross sectional view shoring a relationship between the related magnetic circuit and the Hall elements in a case of displacing an AF unit in a fore-and-aft direction X.

Referring to FIGS. 5 through 7, the description will proceed to a relationship between a related magnetic circuit and Hall elements for use in a related lens holder driving device in order to facilitate the understanding of the lens holder driving device 10 according to the first exemplary embodiment of the present invention. The relationship between the illustrated related magnetic circuit and the Hall elements is similar in structure (relationship) to that illustrated in the above-mentioned Patent Document 2. FIG. 5 is a perspective view showing the relationship between the related magnetic circuit and the Hall elements, FIG. 6 is a vertical cross sectional view showing the relationship between the related magnetic circuit and the Hall elements, and FIG. 7 is a vertical cross sectional view shoring the relationship between the related magnetic circuit and the Hall elements in a case of displacing the AF unit 20 in the fore-and-aft direction X.

A difference between the related magnetic circuit and the magnetic circuit used in the lens holder driving device 10 according to this exemplary embodiment is that any of four image stabilizer coil portions (driving coil portions) 18*f'*, 18*b'*, 18*l'*, and 18*r'* constituting an image stabilizer coil (a driving coil) 18' in the related magnetic circuit comprises no two loop ports. That is, in the related magnetic circuit, each of the four image stabilizer coil portions (the driving coil portions) 18*f'*, 18*b'*, 18*l'*, and 18*r'* comprises only one loop part.

As described above, each of the four permanent magnet pieces 282*f*, 282*b*, 282*l*, and 282*r* has the inner side polarized (magnetized) to the north pole and the outer side polarized (magnetized) to the south pole. Arrows B depicted in FIG. 5 indicate directions of magnetic fluxes generated by the permanent magnet pieces.

Referring now to FIG. 5, the description will be made as regards operation in a case of position adjusting the lens holder 24 (the lens barrel 12) in the direction of the optical axis O by using the related magnetic circuit.

By way of illustration, it will be assumed that the AF current is flowed through the focusing coil 26 counterclockwise. In this event, according to Fleming's right-hand rule, the focusing coil 26 is acted upon by an electromagnetic force upwards. As a result, it is possible to move the lens holder 24 (the lens barrel 12) in the direction of the optical axis O upwards.

Conversely, by flowing the AF current through the focusing coil 26 clockwise, it is possible to move the lens holder 24 (the lens barrel 12) in the direction of the optical axis O downwards.

Referring now to FIGS. 5 to 7, the description will be made as regards operation in a case of moving the auto-focusing lens holder driving portion (the AF unit) 20 (the lens holder moving portion (26; 28; 30)) as a whole in the first direction (the fore-and-aft direction) X or the second direction (the left-and-right direction) Y by using the related magnetic circuit.

First, the description will be made as regards operation in a case of moving the auto-focusing lens holder driving portion (the AF unit) 20 (the lens holder moving portion (26; 28; 30)) as a whole in the first direction (the fore-and-aft direction) X backwards. In this event, as shown in FIG. 5, a first image stabilizing (IS) current flows through the front-side image stabilizer coil portion 18*f'* counterclockwise as depicted at an arrow $I_{IS1}$ and a second image stabilizing (IS) current flows through the back-side image stabilizer coil portion 18*b'* clockwise as depicted at an arrow $I_{IS2}$.

In this event, according to Fleming's right-hand rule, the front-side image stabilizer coil portion 18*f'* is acted upon by an electromagnetic force forwards and the back-side image stabilizer coil portion 18*b'* is also acted upon by an electromagnetic force forwards. However, inasmuch as there image stabilizer coil portions (the driving coil portions) 18*f'* and 18*r'* are fixed to the base 14 (the fixed member 13), as reaction, the auto-focusing lens holder driving portion (the AF unit) 20 (the lens holder moving portion (26; 28; 30)) as a whole is acted upon by an electromagnetic force backwards, as depicted at arrows $F_{IS1}$ and $F_{IS2}$ in FIG. 6. As a result, it is possible to move the auto-focusing lens holder driving portion (the AF unit) 20 (the lens holder moving portion (26; 28; 30)) as a whole backwards.

Conversely, by flowing the first IS current through the front-side image stabilizer coil portion 18*f'* clockwise and by flowing the second IS current through the back-side image stabilizer coil portion 18*b'* counterclockwise, it is possible to move the auto-focusing lens holder driving portion (the AF unit) 20 (the lens holder moving portion (26; 28; 30)) as a whole forwards.

On the other hand, by flowing a third IS current through the left-side image stabilizer coil portion 18*l'* counterclockwise and by flowing a fourth IS current through the right-side image stabilizer coil portion 18*r'* clockwise, it is possible to move the auto-focusing lens holder driving portion (the AF unit) 20 (the lens holder moving portion (26; 28; 30)) as a whole rightwards.

In addition, by flowing the third IS current through the left-side image stabilizer coil portion 18*l'* clockwise and by flowing the fourth IS current through the right-side image stabilizer coil portion 18*r'* counterclockwise, it is possible to move the auto-focusing lens holder driving portion (the AF unit) 20 (the lens holder moving portion (26; 28; 30)) as a whole leftwards.

In the manner which is described above, it is possible to stabilize blurry images.

Figure 8:
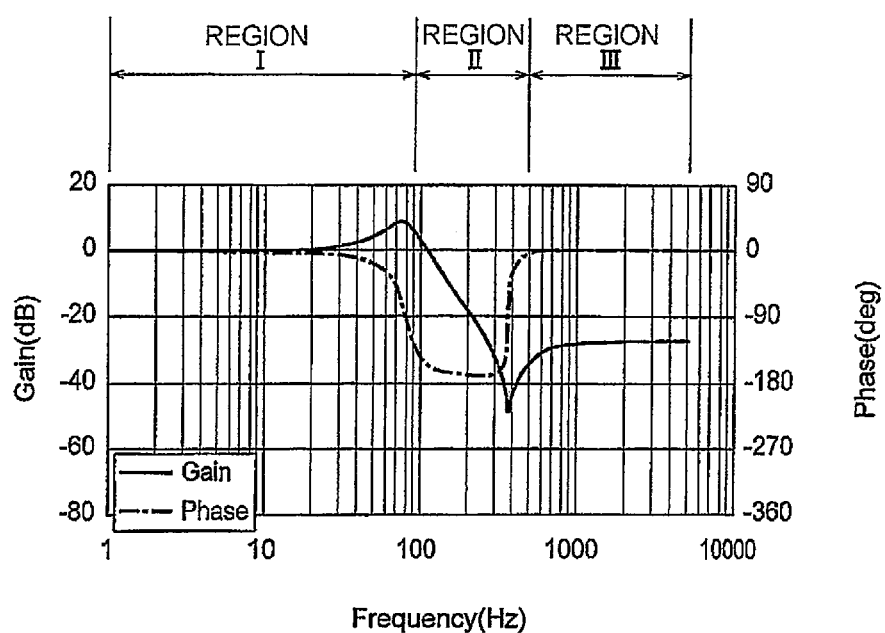
FIG. 8 is a view showing a frequency response of a front-side Hall element in the related magnetic circuit.

Referring now to FIGS. 8 through 10 in addition to FIGS. 5 through 7, the description will proceed to problems in the related lens holder driving device using the related magnetic circuit in more details.

The description will be made as taking a case as an example where the first IS current flows through the front-side image stabilizer coil portion 18*f'* counterclockwise as depicted at the arrow $I_{IS1}$ and the second IS current flows through the back-side image stabilizer coil portion 18*b'* clockwise as depicted at the arrow $I_{IS2}$, as shown in FIG. 5, in order to move the auto-focusing lens holder driving portion (the AF unit) 20 (the lens holder moving portion (26; 28; 30)) as a whole backwards in the manner which is described above.

In this event, as shown in FIG. 7, it is understood that a magnetic field $B_{11}$ produced by the first IS current $I_{IS1}$ flowing through the front-side image stabilizer coil portion 18*f* and the magnetic field B produced by the front-side permanent magnet piece 282*f* are in phase. It will be assumed that magnetic flux density of the magnetic field B is indicated by a and magnetic flux density of the magnetic field $B_{11}$ is indicated by b. Accordingly, it is understood that the front-side Hall element 50*f* detects total magnetic flux density (a+b) obtained by summing the magnetic flux density a of the magnetic field B and the magnetic flux density b of the magnetic field $B_{11}$.

It is herein noted that it is necessary that the magnetic flux density a of the magnetic field B and the total magnetic flux density (a+b) are in phase in order to detect a position of the auto-focusing lens holder driving portion (the AF unit) 20 (the lens holder moving portion (26; 28; 30)) by means of the front-side Hall element 50*f*.

FIG. 8 is a view showing a frequency response of the front-side Hall element 50*f* in the related magnetic circuit. In FIG. 8, the horizontal axis represents a frequency (Frequency) (Hz), the left-hand vertical axis represents a gain (Gain) (dB), and the right-hand vertical axis represents a phase (Phase) (deg). In addition, in FIG. 8, a solid line indicates a gain characteristic and an alternate long and short dashed line indicate a phase characteristic.

As is apparent from FIG. 8, the frequency response of the font-side Hall element 50*f* is divided into a region I, a region II, and a region III. The region I is a region having a band not higher than a primary resonance frequency of the actuator and having low frequencies. The region II is a region having a band not lower than the primary resonance frequency of the actuator and having middle frequencies. The region III is a region having a band not lower than the primary resonance frequency of the actuator and having high frequencies.

Figure 9A:
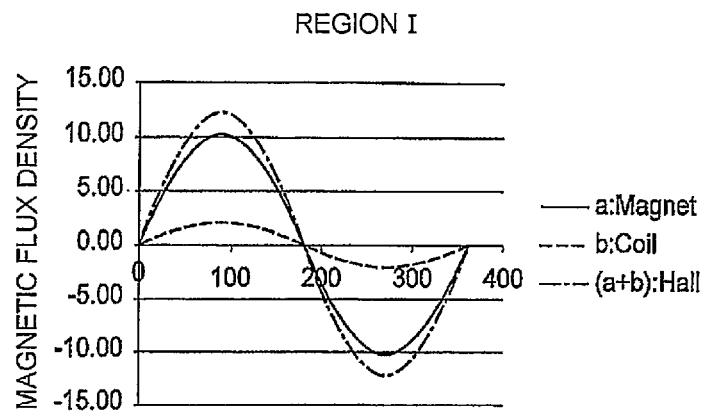
FIGS. 9A, 9B, and 9C are views showing relationships between phases and magnitudes among a magnetic flux density a of a magnetic field B generated by the a front-side permanent magnetic piece, a magnetic flux density b of a magnetic field $B_{11}$ generated by a first IS current $I_{IS1}$ flowing through a front-side image stabilizer coil, and a total magnetic flux density (a+b) detected by the front-side Hall element in a region I, a region II, and a region III of FIG. 8, respectively.
Figure 9B:
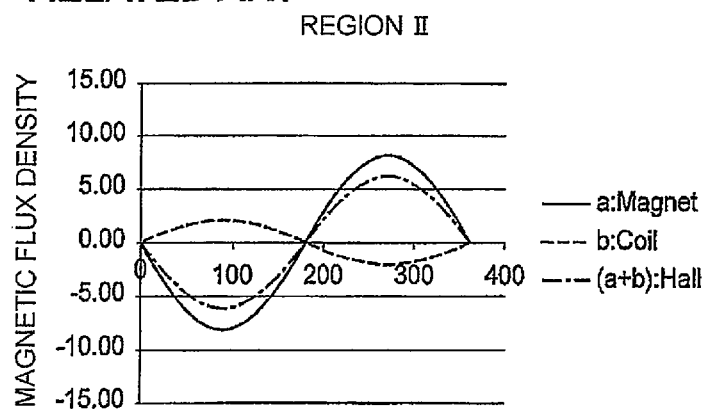
Figure 9C:
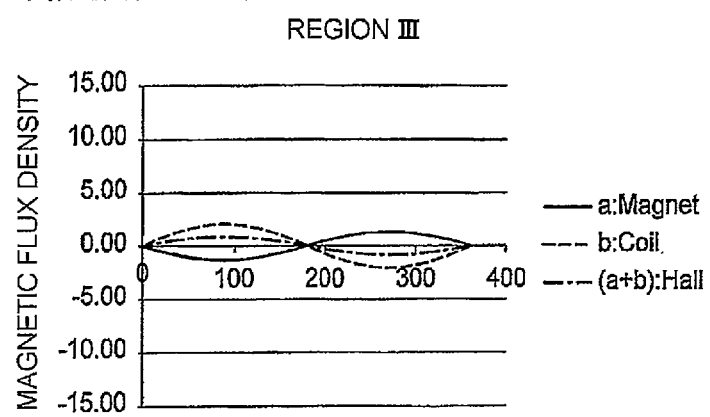

FIGS. 9A, 9B, and 9C are views showing relationships between phases and magnitudes among the magnetic flux density a of the magnetic field B generated by the front-side permanent magnetic piece 282*f*, the magnetic flux density b of the magnetic field $B_{11}$ generated by the first IS current $I_{IS1}$ flowing through the front-side image stabilizer coil 18*f*, and the total magnetic flux density (a+b) detected by the front-side Hall element 50*f* in the region I, the region II, and the region III of FIG. 8, respectively. FIG. 10 is a view tabulated for the relationships of FIGS. 9A-9C;

It is understood from FIGS. 9A-9C and 10 as follows.

In the band not higher than the primary resonance frequency of the region I, a magnitude |a| of the magnetic flux density a of the magnetic field B is larger than a magnitude |b| of the magnetic flux density b of the magnetic field $B_{11}$ (|a|>|b|), and the magnetic flux density a of the magnetic field B, the magnetic flux density b of the magnetic field $B_{11}$, and the total magnetic flux density (a+b) are in phase. Accordingly, in the region I, it is possible to detect the position of the auto-focusing lens holder driving portion (the AF unit) 20 (the lens holder moving portion (26; 28; 30)) by means of the front-side Hall element 50*f*.

On the other hand, in a band not lower than primary resonance frequency, the magnetic flux density a of the magnetic field B and the magnetic flux density b of the magnetic field $B_{11}$ are opposite phase because movement of the front-phase permanent magnet piece 282*f* shifts with respect to a phase of the first IS current $I_{IS1}$ flowing through the front-side image stabilizer coil portion 18*f* by 180 degrees.

In the band not lower than the primary resonance frequency of the region II, the magnetic flux density a of the magnetic field B and the total magnetic flux density (a+b) are in phase because the magnitude |a| of the magnetic flux density a of the magnetic field B is larger than a magnitude |b| of the magnetic flux density b of the magnetic field $B_{11}$ (|a|>|b|). Accordingly, in the region II, it is possible to detect the position of the auto-focusing lens holder driving portion (the AF unit) 20 (the lens holder moving portion (26; 28; 30)) by means of the front-side Hall element 50*f*.

However, in the band not lower than the primary resonance frequency of the region III, it is understood that the magnitude |a| of the magnetic flux density a of the magnetic field B is smaller than a magnitude |b| of the magnetic flux density b of the magnetic field $B_{11}$ (|a|<|b|). Therefore, the magnetic flux density a of the magnetic field B and the total magnetic flux density (a+b) are opposite phase. As a result, in the region III, it is impossible to detect the position of the auto-focusing lens holder driving portion (the AF unit) 20 (the lens holder moving portion (26; 28; 30)) by means of the front-side Hall element 50*f*. That is, an output of Hall element has resonance.

Accordingly, when the Hall element is disposed between (in) the loop part of the coil, it is understood that it is impossible to detect the position of the auto-focusing lens holder driving portion (the AF unit) 20 (the lens holder moving portion (26; 28; 30)) in the region III which is not lower than the primary resonance frequency. In other words, the Hall elements 50*f* and 50*l* are subjected to adverse effect caused by the magnetic fields generated by the currents flowing through the image stabilizer coil portions (the driving coil portions) 18*f'* and 18*l'*, respectively.

Figure 11:
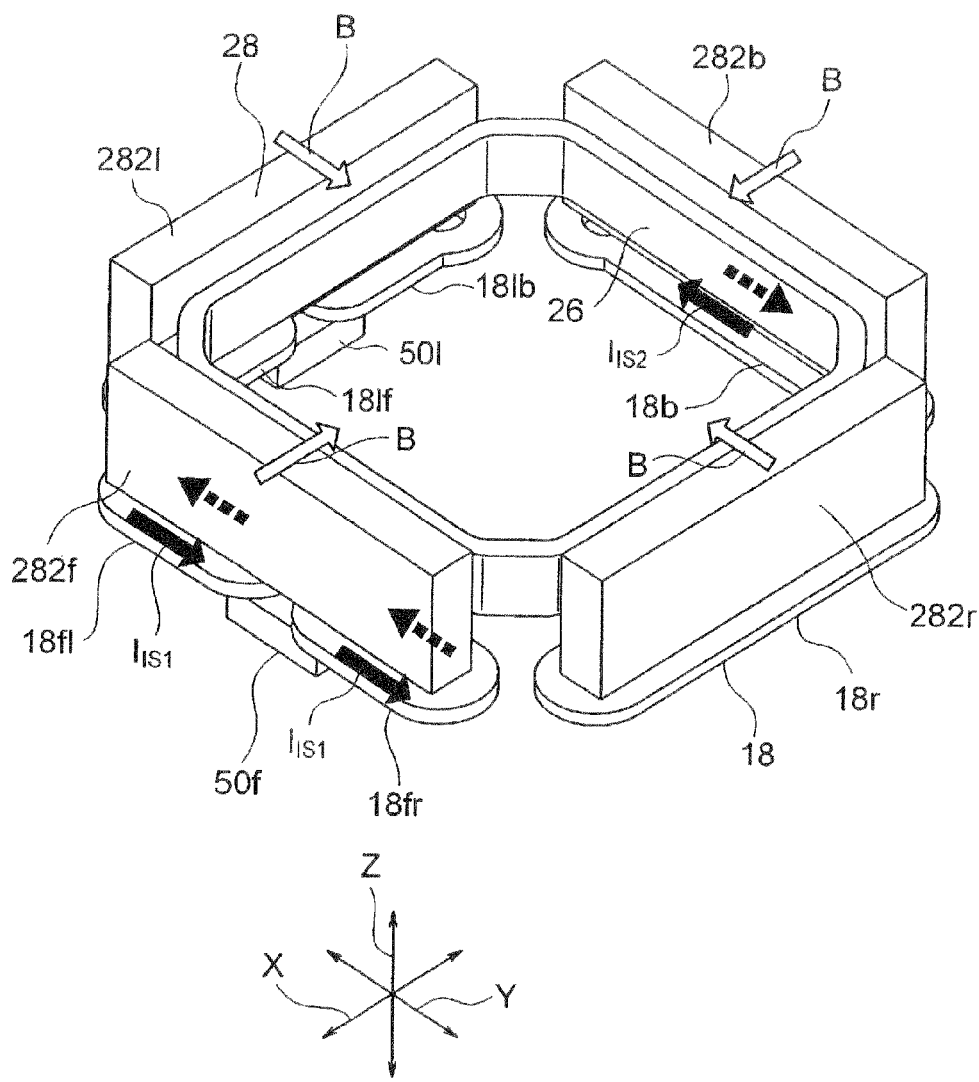
FIG. 11 is a perspective view showing a relationship between a magnetic circuit and Hall elements for use in the lens holder driving device illustrated in FIG. 1.
Figure 12:
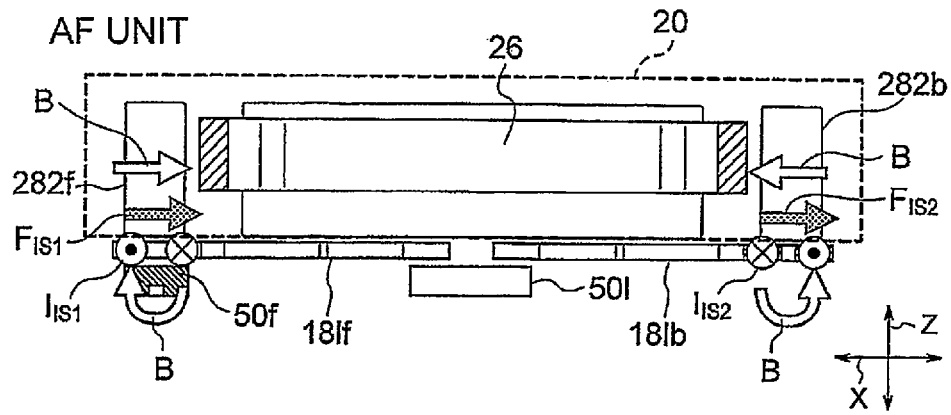
FIG. 12 is a vertical cross sectional view showing a relationship between the magnetic circuit and the Hall elements illustrated in FIG. 11.
Figure 13:
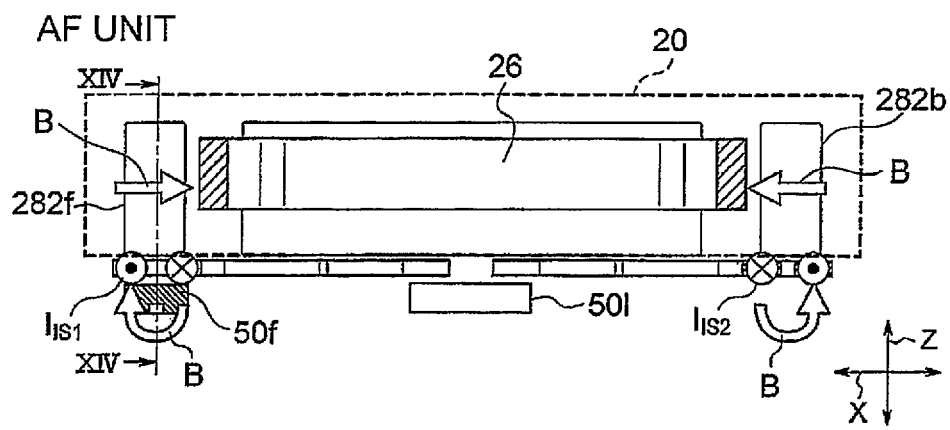
FIG. 13 is a vertical cross sectional view showing a relationship between the magnetic circuit and the Hall elements illustrated in FIG. 11 in a case of displacing an AF unit in an fore-and-aft direction X.
Figure 14:
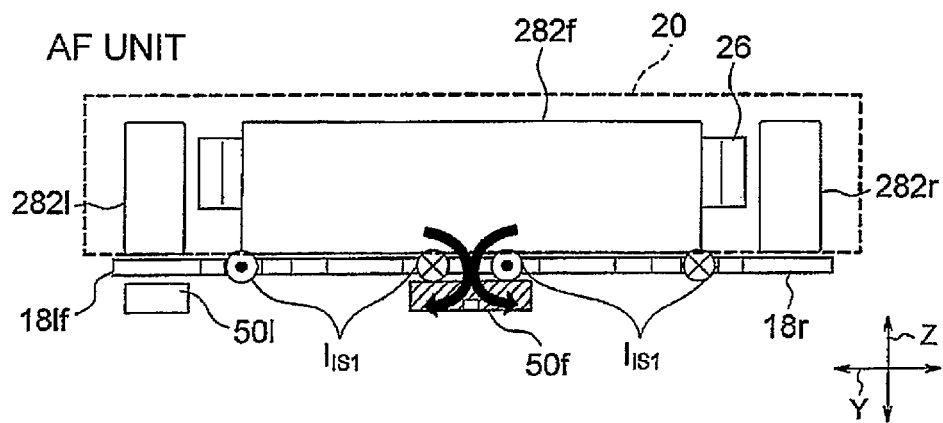
FIG. 14 is a cross sectional view taken on line XIV-XIV of FIG. 13.

Referring now to FIGS. 11 through 14, the description will proceed to a relationship between the magnetic circuit according to this exemplary embodiment and the Hall elements for use in the lens holder driving device 10 according to the first exemplary embodiment of this invention. FIG. 11 is a perspective view showing the relationship between the magnetic circuit according to this exemplary embodiment and the Hall elements, FIG. 12 is a vertical cross sectional view showing the relationship between the magnetic circuit according to this exemplary embodiment and the Hall elements, FIG. 13 is a vertical cross sectional view shoring the relationship between the magnetic circuit according to this exemplary embodiment and the Hall elements in a case of displacing the AF unit 20 (the lens holder moving portion (26; 28; 30)) in the fore-and-aft direction X, and FIG. 14 is a cross sectional view taken on line XIV-XIV of FIG. 13.

As described above, each of the four permanent magnet pieces 282*f*, 282*b*, 282*l*, and 282*r* has the inner side polarized (magnetized) to the north pole and the outer side polarized (magnetized) to the south pole. Arrows B depicted in FIG. 11 indicate directions of magnetic fluxes generated by the permanent magnet pieces.

Referring now to FIG. 11, the description will be made as regards operation in a case of position adjusting the lens holder 24 (the lens barrel 12) in the direction of the optical axis O by using the magnetic circuit according to this exemplary embodiment.

By way of illustration, it will be assumed that the AF current is flowed through the focusing coil 26 counterclockwise. In this event, according to Fleming's right-hand rule, the focusing coil 26 is acted upon by an electromagnetic force upwards. As a result, it is possible to move the lens holder 24 (the lens barrel 12) in the direction of the optical axis O upwards.

Conversely, by flowing the AF current through the focusing coil 26 clockwise, it is possible to move the lens holder 24 (the lens barrel 12) in the direction of the optical axis O downwards.

Referring now to FIGS. 11 to 14, the description will be made as regards operation in a case of moving the auto-focusing lens holder driving portion (the AF unit) 20 (the lens holder moving portion (26; 28; 30) as a whole in the first direction (the fore-and-aft direction) X or the second direction (the left-and-right direction) Y by using the magnetic circuit according to this exemplary embodiment.

First, the description will be made as regards operation in a case of moving the auto-focusing lens holder driving portion (the AF unit) 20 (the lens holder moving portion (26; 28; 30)) as a whole in the first direction (the fore-and-aft direction) X backwards. In this event, as shown in FIG. 11, a first image stabilizing (IS) current flows through each of the tow coil parts 18fl and 18fr of the front-side image stabilizer coil portion 18f counterclockwise as depicted at an arrow $I_{IS1}$ and a second image stabilizing (IS) current flows through the back-side image stabilizer coil portion 18b clockwise as depicted at an arrow $I_{IS2}$.

In this event, according to Fleming's right-hand rule, the front-side image stabilizer coil portion 18f is acted upon by an electromagnetic force forwards and the back-side image stabilizer coil portion 18b is also acted upon by an electromagnetic force forwards. However, inasmuch as there image stabilizer coil portions (the driving coil portions) 18f and 18r are fixed to the fixed member 13, as reaction, the auto-focusing lens holder driving portion (the AF unit) 20 (the lens holder moving portion (26; 28; 30) as a whole is acted upon by an electromagnetic force backwards, as depicted at arrows $F_{IS1}$ and $F_{IS2}$ in FIG. 12. As a result, it is possible to move the auto-focusing lens holder driving portion (the AF unit) 20 (the lens holder moving portion (26; 28; 30) as a whole backwards.

Conversely, by flowing the first IS current through each of the two coil parts 18fl and 18fr of the front-side image stabilizer coil portion 18f clockwise and by flowing the second IS current through the back-side image stabilizer coil portion 18b counterclockwise, it is possible to move the auto-focusing lens holder driving portion (the AF unit) 20 (the lens holder moving portion (26; 28; 30)) as a whole forwards.

On the other hand, by flowing a third IS current through each of the two coil parts 181f and 181b of the left-side image stabilizer coil portion 18l counterclockwise and by flowing a fourth IS current through the right-side image stabilizer coil portion 18r clockwise, it is possible to move the auto-focusing lens holder driving portion (the AF unit) 20 (the lens holder moving portion (26; 28; 30) as a whole rightwards.

In addition, by flowing the third IS current through each of the two coil parts 181f and 181r of the left-side image stabilizer coil portion 18l clockwise and by flowing the fourth IS current through the right-side image stabilizer coil portion 18r counterclockwise, it is possible to move the auto-focusing lens holder driving portion (the AF unit) 20 (the lens holder moving portion (26; 28; 30)) as a whole leftwards.

In the manner which is described above, it is possible to stabilize blurry images in the camera.

Figure 15:
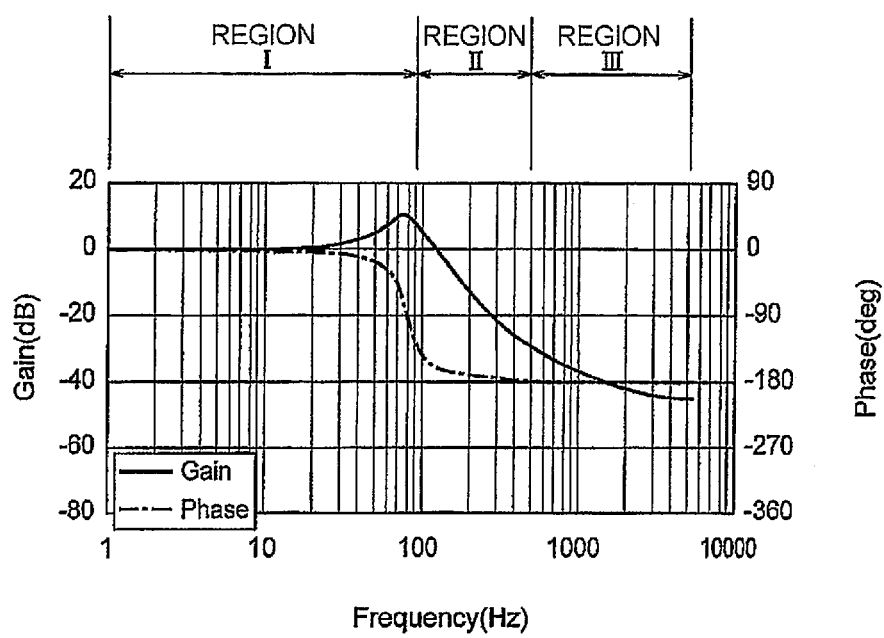
FIG. 15 is a view showing a frequency response of a front-side Hall element in the magnetic circuit illustrated in FIG. 11.

Referring now to FIGS. 15 through 17 in addition to FIGS. 11 through 14, the description will proceed to advantages in the lens holder driving device 10 using the magnetic circuit according to this exemplary embodiment in more details.

The description will be made as taking a case as an example where the first IS current flows through each of the two coil parts 18fl and 18fr of the front-side image stabilizer coil portion 18f counterclockwise as depicted at the arrow $I_{IS1}$ and the second IS current flows through the back-side image stabilizer coil portion 18b clockwise as depicted at the arrow $I_{IS2}$, as shown in FIG. 11, in order to move the auto-focusing lens holder driving portion (the AF unit) 20 (the lens holder moving portion (26; 28; 30)) as a whole backwards in the manner which is described above.

In this event, as shown in FIGS. 13 and 14, it is understood that a magnetic field $B_{11}$ produced by the first IS current $I_{IS1}$ flowing through the front-side image stabilizer coil portion 18f and the magnetic field B produced by the front-side permanent magnet piece 282f are opposite phase. It will be assumed that magnetic flux density of the magnetic field B is indicated by a and magnetic flux density of the magnetic field $B_{11}$ is indicated by b. Accordingly, it is understood that the front-side Hall element 50f detects total magnetic flux density (a+b) obtained by summing the magnetic flux density a of the magnetic field B and the magnetic flux density b of the magnetic field $B_{11}$.

It is herein noted that it is necessary that the magnetic flux density a of the magnetic field B and the total magnetic flux density (a+b) are in phase in order to detect a position of the auto-focusing lens holder driving portion (the AF unit) 20 (the lens holder moving portion (26; 28; 30)) by means of the front-side Hall element 50f.

FIG. 15 is a view showing a frequency response of the front-side Hall element 50f in the magnetic circuit according to this exemplary embodiment. In FIG. 15, the horizontal axis represents a frequency (Frequency) (Hz), the left-hand vertical axis represents a gain (Gain) (dB), and the right-hand vertical axis represents a phase (Phase) (deg). In addition, in FIG. 15, a solid line indicates a gain characteristic and an alternate long and short dashed line indicate a phase characteristic.

As is apparent from FIG. 15, the frequency response of the font-side Hall element 50f is divided into a region I, a region II, and a region III. The region I is a region having a band not higher than a primary resonance frequency of the actuator and having low frequencies. The region II is a region having a band not lower than the primary resonance frequency of the actuator and having middle frequencies. The region III is a region having a band not lower than the primary resonance frequency of the actuator and having high frequencies.

Figure 16A:
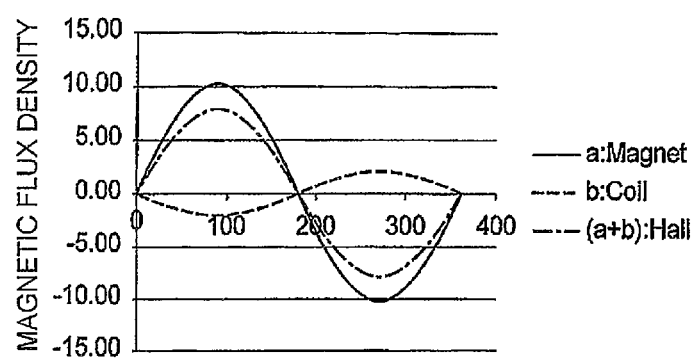
FIGS. 16A, 16B, and 16C are views showing relationships between phases and magnitudes among a magnetic flux density a of a magnetic field B generated by the a front-side permanent magnetic piece, a magnetic flux density b of a magnetic field $B_{11}$ generated by a first IS current IIS1 flowing in a front-side image stabilizer coil, and a total magnetic flux density (a+b) detected by the front-side Hall element in a region I, a region II, and a region III of FIG. 15, respectively.
Figure 16B:
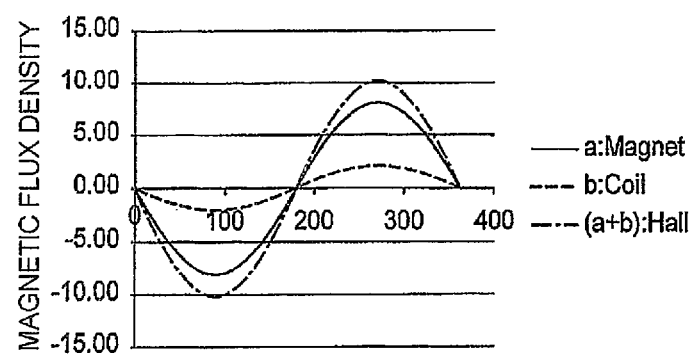
Figure 16C:
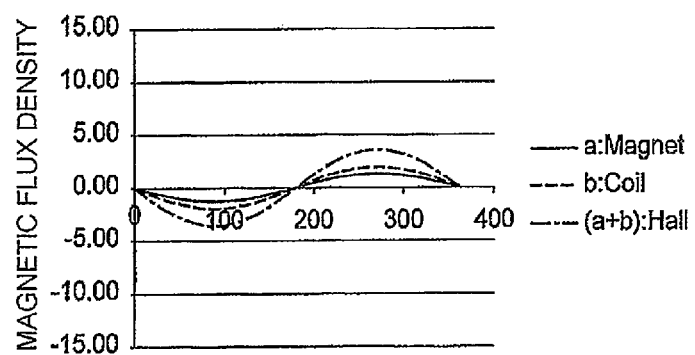

FIGS. 16A, 16B, and 16C are views showing relationships between phases and magnitudes among the magnetic flux density a of the magnetic field B generated by the front-side permanent magnetic piece 282f, the magnetic flux density b of the magnetic field $B_{11}$ generated by the first IS current $I_{IS1}$ flowing through the front-side image stabilizer coil 18f, and the total magnetic flux density (a+b) detected by the front-side Hall element 50f in the region I, the region II, and the region III of FIG. 15, respectively. FIG. 17 is a view tabulated for the relationships of FIGS. 16A-16C;

It is understood from FIGS. 16A-16C and 17 as follows.

In the band not higher than the primary resonance frequency of the region I, a magnitude |a| of the magnetic flux density a of the magnetic field B is larger than a magnitude |b| of the magnetic flux density b of the magnetic field $B_{11}$ (|a|>|b|), and the magnetic flux density a of the magnetic field B and the total magnetic flux density (a+b) are in phase although the magnetic flux density a of the magnetic field B and the magnetic flux density b of the magnetic field $B_{11}$ are opposite phase. Accordingly, in the region I, it is possible to detect the position of the auto-focusing lens holder driving portion (the AF unit) 20 (the lens holder moving portion (26; 28; 30)) by means of the front-side Hall element 50f.

On the other hand, in a band not lower than primary resonance frequency, the magnetic flux density a of the magnetic field B and the magnetic flux density b of the magnetic field $B_{11}$ are in phase because movement of the front-phase permanent magnet piece 282f is in phase with the first IS current $I_{IS1}$ flowing through the front-side image stabilizer coil portion 18f.

In the band not lower than the primary resonance frequency of the region II, the magnetic flux density a of the magnetic field B and the total magnetic flux density (a+b) are in phase because the magnitude |a| of the magnetic flux density a of the magnetic field B is larger than a magnitude |b| of the magnetic flux density b of the magnetic field $B_{11}$ (|a|>|b|). Accordingly, in the region II, it is possible to detect the position of the auto-focusing lens holder driving portion (the AF unit) 20 (the lens holder moving portion (26; 28; 30)) by means of the front-side Hall element 50f.

On the other hand, in the band not lower than the primary resonance frequency of the region III, it is understood that the magnitude |a| of the magnetic flux density a of the magnetic field B is smaller than a magnitude |b| of the magnetic flux density b of the magnetic field $B_{11}$ (|a|<|b|). However, inasmuch as the magnetic flux density b of the magnetic field B and the magnetic flux density b of the magnetic field $B_{11}$ are in phase, the magnetic flux density a of the magnetic field B and the total magnetic flux density (a+b) are also in phase. As a result, in also the region III, it is possible to detect the position of the auto-focusing lens holder driving portion (the AF unit) 20 (the lens holder moving portion (26; 28; 30)) by means of the front-side Hall element 50f. That is, resonance does not occur in an output of Hall element.

Accordingly, when the Hall element is disposed between the two loop parts of the coil, it is understood that it is possible to detect the position of the auto-focusing lens holder driving portion (the AF unit) 20 (the lens holder moving portion (26; 28; 30)) in all of frequency ranges. In other words, the Hall elements 50f and 50l can avoid to subject to adverse effect caused by the magnetic fields generated by the currents flowing through the image stabilizer coil portions (the driving coil portions) 18f and 18l, respectively.

Figure 18:
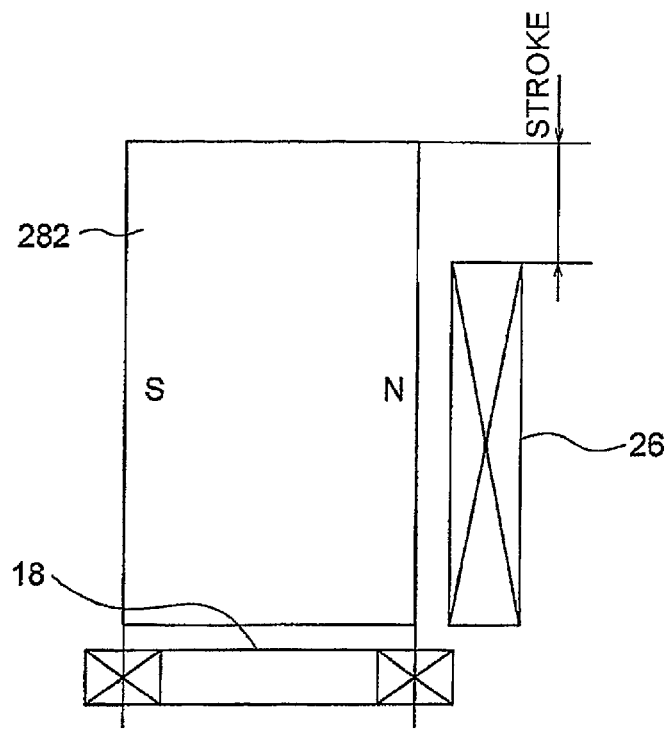
FIG. 18 is a cross sectional view showing a relationship of a placement among one permanent magnet piece of the permanent magnet, a focusing coil disposed around it, and an image stabilizer coil (a driving coil) in the magnetic circuit illustrated in FIG. 11.

FIG. 18 is a cross sectional view showing a relationship of a placement among one permanent magnet piece 282 of the permanent magnet 28, the focusing coil 26 disposed around it, and the image stabilizer coil portion 18 in the magnetic circuit illustrated in FIG. 11.

It is understood that a height of the permanent magnet piece 281 is higher than a height of the focusing coil 26. It is therefore possible to make a stoke larger in a case of position adjusting the lens holder 24 (the lens barrel 12) in the direction of the optical axis O.

In addition, the permanent magnet piece 282 and the image stabilizer coil (the driving coil) 18 are disposed so that edges of the permanent magnet piece 282 in the radial direction are laid in a coil sectional width of the image stabilizer coil portion 18 in the radial direction. It is therefore possible to heighten sensitivity of a driving force for moving the auto-focusing lens holder driving portion (the AF unit) 20 (the lens holder moving portion (26; 28; 30)) as a whole in a direction orthogonal to the optical axis O.

Incidentally, there is in danger that the four suspension wires 16 may be fracture in the lens holder driving device 10 having such a structure because the four suspension wires 16 are subjected to force in a direction to expand caused by a drop impact or the like. On this account, the lens holder driving device 10 according to the first exemplary embodiment comprises a fracture preventing member for preventing the four suspension wires 16 from fracturing in the manner which will be presently described.

Figure 19:
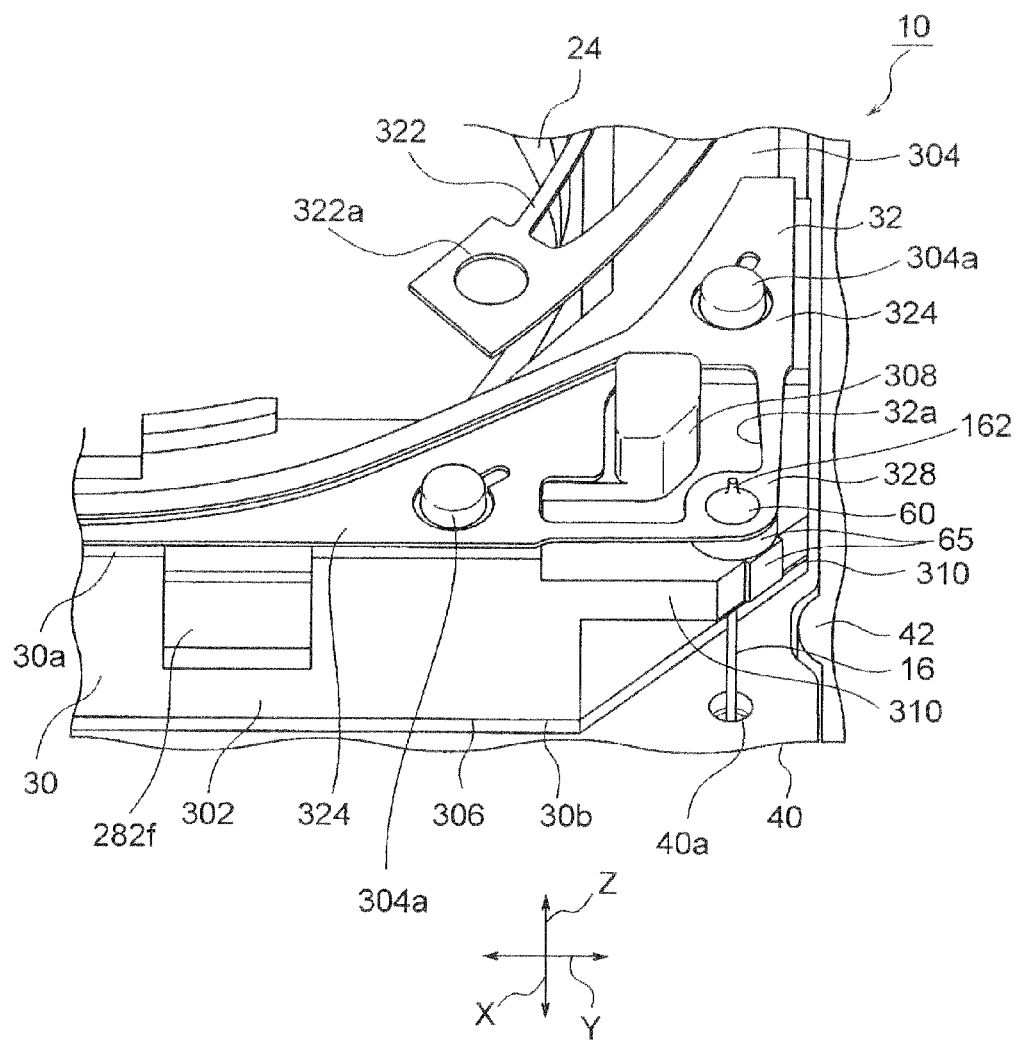
FIG. 19 is a partial perspective view enlargedly showing a part fixing a second end portion of a suspension wire to an upper leaf spring for use in the lens holder driving device illustrated in FIG. 1.
Figure 20:
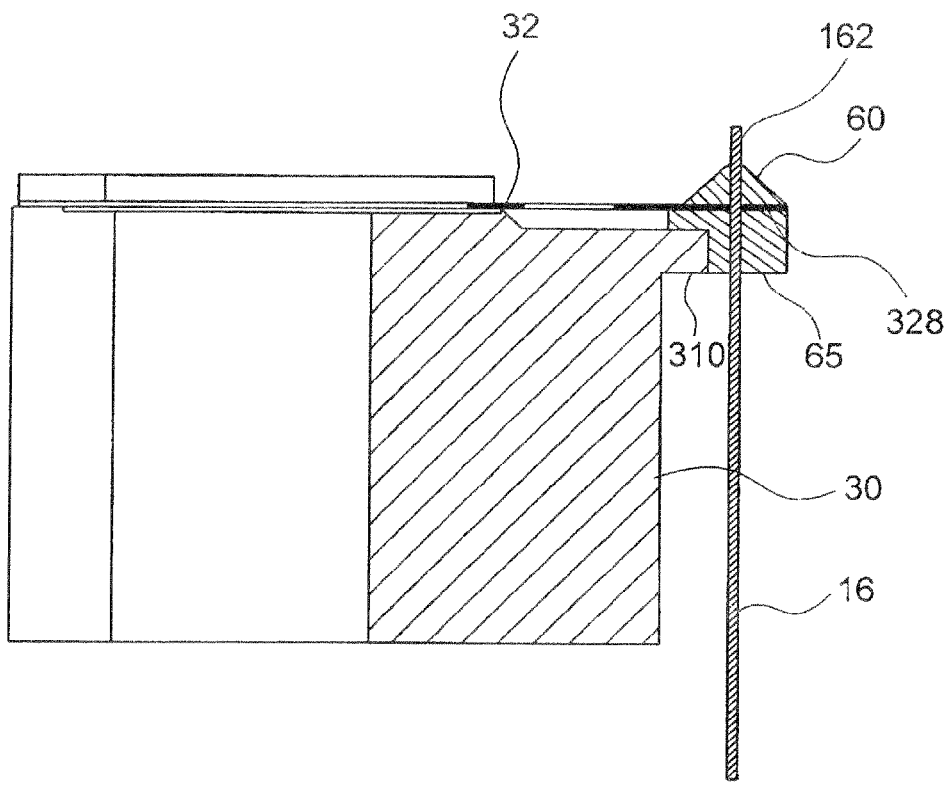
FIG. 20 is a partial cross sectional view of the fixed part illustrated in FIG. 19.

Referring to FIGS. 19 and 20, the description will proceed to the fracture preventing member according to this exemplary embodiment in detail. FIG. 19 is a partial perspective view enlargedly showing a part fixing the second end portion 162 of the suspension wire 16 to the upper leaf spring 32, FIG. 20 is a partial cross sectional view of the fixed part.

In the manner which is described above, the upper leaf spring 32 comprises the four arc-shaped extending portions 328 (only one arc-shaped extending portion 328 is shown in FIG. 19) for extending at the four corners of the upper outer end portion 324 in the radial direction outwards. The four arc-shaped extending portions 328 have, at tip portions thereof, four wire fixing holes 328a (see, FIG. 3) in which the second end portions 162 of the four suspension wires 16 are inserted (fitted), respectively. The second end portions 162 of the four suspension wires 16 are inserted in the four wire fixing holes 328a to be fixed to the four arc-shaped extending portions 328 by means of solder 60 or adhesive agent (not shown).

Accordingly, the four arc-shaped extending portions 328 serve as a wire fixing portion for fixing the second end portions 162 of the four suspension wires 16.

In the lens holder driving device 10 having such a structure, although the auto-focusing lens holder driving portion (the AF unit) 20 (the lens holder moving portion (26; 28; 30)) is subjected to the force in the direction to apart from the base 14 (the fixed member 13) due to a drop impact or the like, the auto-focusing lens holder driving section (the AF unit) 20 (the lens holder moving portion (26; 28; 30)) moves upward with the four arc-shaped extending portions 328 elastically deformed in a state where the second end portions 162 of the four suspension wire 16 are fixed to the four arc-shaped extending portions 328.

As a result, it is possible to prevent the four suspension wires 16 from fracturing. Accordingly, the four arc-shaped extending portions 328 acts as the fracture preventing member for preventing the four suspension wires 16 from fracturing.

On the other hand, as shown in FIG. 19, the magnet holder 30 comprises four upper stoppers 308 (only one upper stopper 308 is shown in FIG. 19) which project at the four corners of the upper ring-shaped end portion 304 upwards. Each upper stopper 308 projects from an opening 32a formed in the upper leaf spring 32 between the upper outer end portion 324 and the each arc-shaped extending portion 328.

In other words, the four upper stoppers 308 project from the magnet holder 30 toward an inner wall surface of the shielding cover 42.

By the four upper stoppers 308, movement of the auto-focusing lens holder driving portion (the AF unit) 20 (the lens holder moving portion (26; 28; 30)) upwards is limited. In other words, when auto-focusing lens holder driving section (the AF unit) 20 (the lens holder moving portion (26; 28; 30)) moves upwards, the four upper stoppers 308 of the magnet holder 30 hits to the inner wall surface of the upper end portion 424 of the shielding cover 42 although the four arc-shaped extending portions 328 become elastically deformed before the four arc-shaped extending portions 328 buckle or before the four suspension wires 16 are subjected to a fracturing force.

That is, the four upper stoppers 308 serve as a fracture prevention supporting member for supporting prevention of fracture in the four suspension wires 16.

As shown in FIG. 2, there is little clearance (gap) between the fixed member 13 and the auto-focusing lens holder driving portion (the AF unit) 20 (the lens holder moving portion (26; 28; 30)). Accordingly, although the auto-focusing lens holder driving portion (the AF unit) 20 (the lens holder moving portion (26; 28; 30)) is subjected to a force in a direction to get near the fixed member 13 due to a drop impact or the like, the four suspension wires 16 do not buckle because the auto-focusing lens holder driving portion (the AF unit) 20 (the lens holder moving portion (26; 28; 30)) immediately hits to an upper surface of the fixed member 13.

Figure 21:
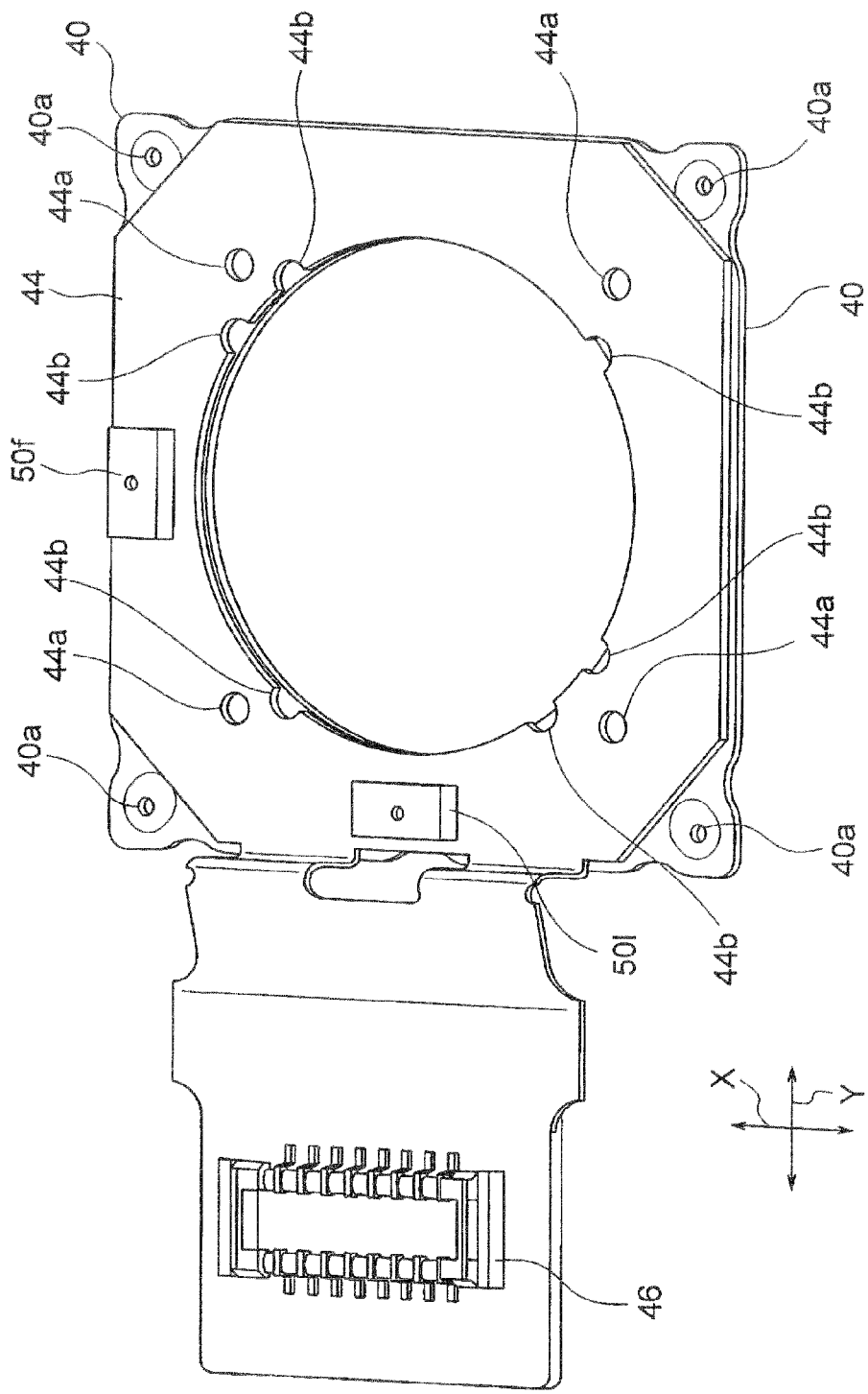
FIG. 21 is a perspective view showing a assembly of a coil board and a flexible printed circuit (FPC) for use in the lens holder driving device illustrated in FIG. 1 seen from a rear side.

Referring to FIG. 21 in addition to FIGS. 2 to 4, the description will proceed to the flexible printed circuit (FPC) 44 disposed between the base 41 and the coil board 40 and a method of mounting it. FIG. 21 is a perspective view showing an assembly of the coil board 40 and the flexible printed circuit (FPC) 44 seen from a rear side;

As shown in FIG. 3, the base 14 has four positioning protrusions 142 which project upwards on diagonal lines in vicinity of the circular opening 14a in the radial direction outwards. On the other hand, as shown in FIG. 4, the coil board 40 has four positioning hole portions 40b in which the four positioning protrusions 142 are charged, respectively. As shown in FIG. 21, the flexible printed circuit (FPC) 44 also has four positioning hole portions 44a at positions corresponding to the four positioning hole portions 40b. Accordingly, the four positioning protrusions 142 of the base 14 are charged in the four positioning hole portions 40b of the coil board 40 via the four positioning hole portions 44a of the flexible printed circuit (FPC) 44.

As shown in FIG. 21, the flexible printed circuit (FPC) 44 has a rear surface on which the two Hall elements 50f and 50l are mounted. On the other hand, as shown in FIG. 2, the base 14 has concave portions 14b in which the two Hall elements 50f and 50l are fitted.

As shown in FIG. 4, on the coil board 40, six lands 18a for supplying electric currents to the four image stabilizer coil portions (the driving coil portions) 18f, 18b, 18l, and 18r are formed along the circular opening 40a bored at a central portion thereof. On the other hand, as shown in FIG. 21, on the flexible printed circuit (FPC) 44, six notch portions 44b are formed at positions corresponding to the six lands 18a. Accordingly, by mounting solder pastes on the six notch portions 44b and by carrying out solder reflow, it is possible to electrically connect internal wiring (not shown) of the flexible printed circuit (FPC) 44 with the six lands 18a of the coil board 44.

In the manner which is described above, the first end portions 16l of the four suspension wires 16 pass through the four through holes 40a of the coil board 40 and are fixed to the coil board 40.

As shown in FIG. 4, on the coil board 40, four lands are formed around the four through holes 40a, respectively. Among the four lands formed around the through holes 40a, two lands (right-back and left-front in the example of FIG. 4) are electrically connected to the inner wiring (not shown) of the flexible printed circuit (FPC) 44 by means of solder. Accordingly, among the four suspension wires 16, the first end portions 161 of the two suspension wires 16 are fixed to the coil board 40 at the above-mentioned two lands by means of the above-mentioned solder and are electrically connected to the flexible printed circuit (FPC) 44. On the other hand, the first end portions 161 of remaining two suspension wires 16 are fixed to the coil board 40 at remaining two lands by means of solder or adhesive agent but are electrically insulated to the internal wiring (not shown) of the flexible printed circuit (FPC) 44.

As shown in FIG. 21, the flexible printed circuit (FPC) 44 has a rear surface on which a control portion 46 is mounted. The control portion 46 controls the AF current flowing through the focusing coil 16 and controls the first through fourth IS currents flowing through the four image stabilizer coil portions (the driving coil portions) 18f, 18b, 18l, and 18r so as to compensate wobbling detected based on two directional gyro sensors (not shown) on the basis of position detected signals detected by the two Hall elements 50f and 50l.

Figure 22:
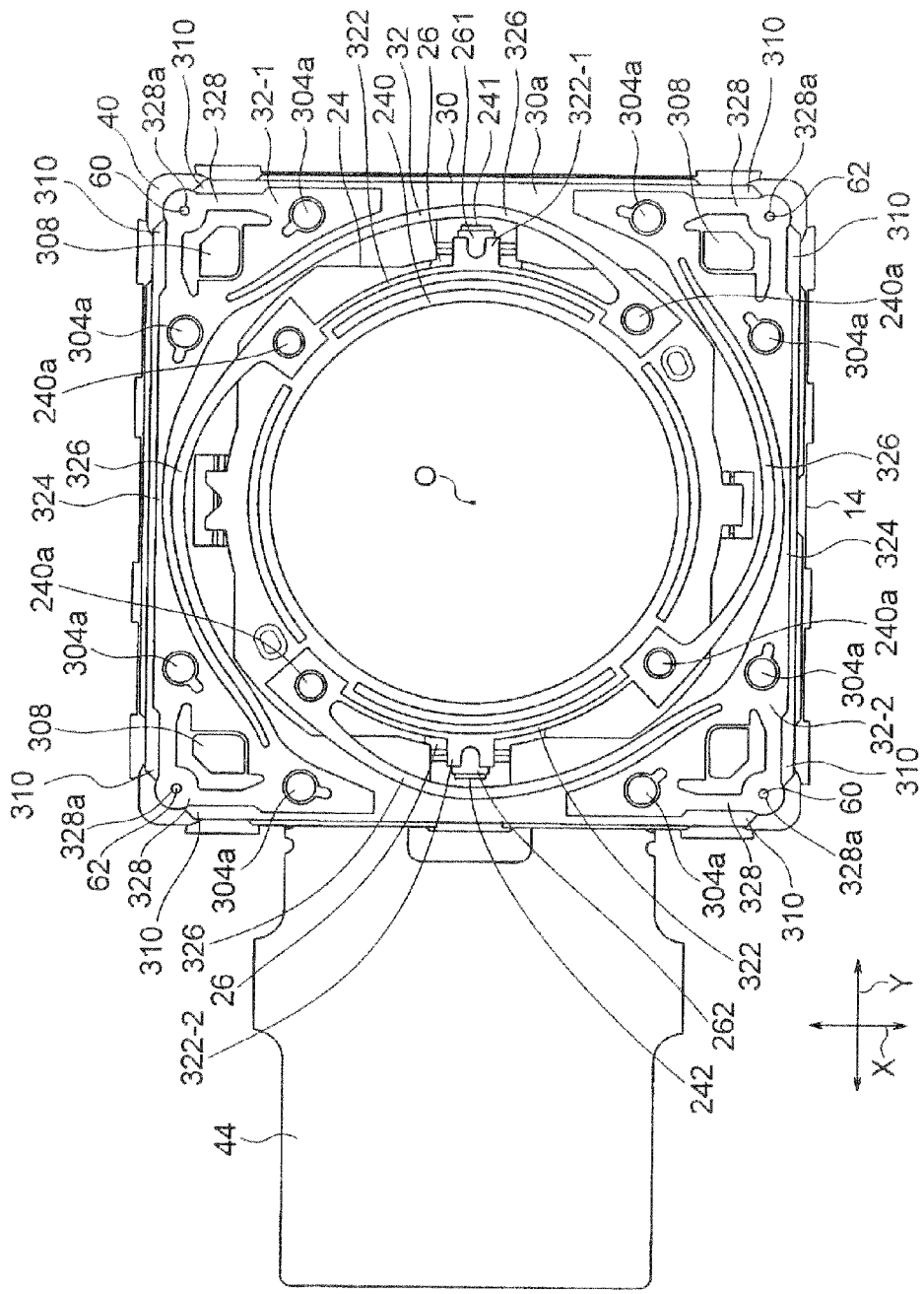
FIG. 22 is a plan view showing a state where a shielding cover is omitted from the lens holder driving device illustrated in FIG. 1.
Figure 23:
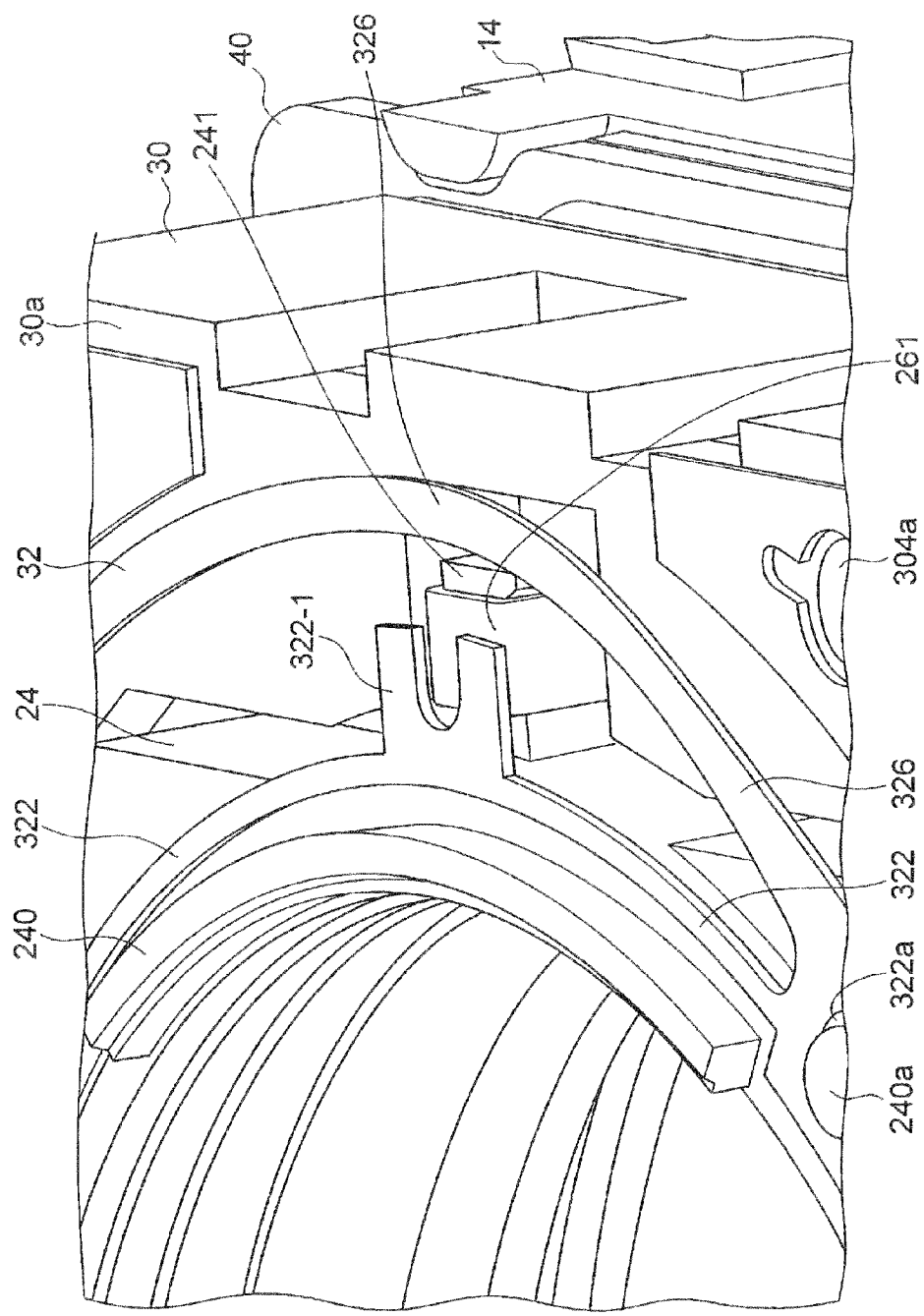
FIG. 23 is a partial enlarged perspective view enlargedly showing a tied-up part of an end portion of a wire composed of the focusing coil in FIG. 22.

Referring to FIGS. 22 and 23, the description will proceed to a method for feeding to the focusing coil 26. FIG. 22 is a plan view showing a state where the shielding cover 42 is omitted from the lens holder driving device 10. FIG. 23 is a partial enlarged perspective view enlargedly showing a tied-up part of an end portion of a wire composed of the focusing coil 26.

As shown in FIG. 22, lens holder 24 has, at an upper end thereof, first and second projecting portions 241 and 242 which project in a direction (outwards in the radial direction) to apart from each other in the left-and-right direction Y. In the example being illustrated, the first projecting portion 241 is also called a right-side projecting portion because it projects to right side while the second projecting portion 242 is also called a left-side projecting portion because it projects to left side.

On the other hand, the wire composed of the focusing coil 26 has first and second end portions 261 and 262. As shown in FIG. 23, the first end portion 261 of the wire of the focusing coil 26 is tied up to the first projecting portion (the right-side projecting portion) 241 of the lens holder 24. Similarly, the second end portion 262 of the wire of the focusing coil 26 is tied up to the second projecting portion (the left-side projecting portion) 242 of the lens holder 24. Accordingly, the first and second end portions 261 and 262 are also called first and second tied-up parts, respectively.

On the other hand, as shown in FIG. 22, the first leaf spring (the upper leaf spring) 32 comprises first and second leaf spring pieces 32-1 and 32-2 which are electrically insulated from each other. The first and second leaf spring pieces 32-1 and 32-2 have rotational symmetry shapes with respect to the optical axis O of the lens as a center. The first leaf spring piece 32-1 is disposed, at the first end (the upper end) of the magnet holder 30, substantially back side and right side while the second leaf spring piece 32-2 is disposed, at the first end (the upper end) of the magnet holder 30, substantially front side and left side.

The upper inner end portion 322 of the first leaf spring piece 32-1 disposed at the right side has a first U-shaped terminal portion 322-1 projecting rightwards (outwards in the radial direction) at a position corresponding to the first projecting portion (the right-side projecting portion) 241 of the lens holder 24. Likewise, the upper inner end portion 322 of the second leaf spring piece 32-2 disposed at the left-side has a second U-shaped terminal portion 322-2 projecting leftwards (outwards in the radial direction) at a position corresponding to the second projecting portion (the left-side projecting portion) 242 of the lens holder 24. The first U-shaped terminal portion 322-1 is also called a right-side U-shaped terminal portion while the second U-shaped terminal portion 322-2 is also called a left-side U-shaped terminal portion.

The first U-shaped terminal portion (the right-side U-shaped terminal portion) 322-1 is electrically connected to the first end portion (the first tied-up part) 261 of the focusing coil 26 by means of solder (not shown) at the first projecting portion (the right-side projecting portion) 241 of the lens holder 24. Similarly, the second U-shaped terminal portion (the left-side U-shaped terminal portion) 322-2 is electrically connected to the second end portion (the second tied-up part) 262 of the focusing coil 26 by means of solder (not shown) at the second projecting portion (the left-side projecting portion) 242 of the lens holder 24.

In addition, in the manner which is described above, among the four suspension wires 16, the second end portions 162 of the two suspension wires 16 (right-back and left-front in the example of FIG. 22) are connected to the arc-shaped extending portions 328 through the wire fixing holes 328a by means of solder 60. The second end portions 162 of remaining two suspension wires 16 (left-back and right-front in the example of FIG. 22) are fixed to the arc-shaped extending portions 328 through the wire fixing holes 328a by means of adhesive agent 62. Solder may be used in lieu of the adhesive agent 62.

Furthermore, in the manner which is described above, among the four suspension wires 16, the first end portions 161 of the two suspension wires 16 (right-back and left-front in the example of FIG. 22) are fixed to the lands of the coil board 44 via the through holes 40a by means of solder and are electrically connected to the flexible printed circuit (FPC) 44. The first end portions 161 of the remaining two suspension wires 16 (left-back and right-front in the example of FIG. 22) are connected to the lands of the coil board 40 via the through holes 40a by means of solder or adhesive agent but are electrically insulated from the flexible printed circuit (FPC) 44.

Accordingly, the flexible printed circuit (FPC) 44 is electrically connected to the first end portion (the first tied-up part) 261 of the focusing coil 26 via the suspension wire 16 of the right-back, the first leaf spring piece 32-1 of the first leaf spring (the upper leaf spring) 32, and the first U-shaped terminal portion (the right-side U-shaped terminal portion) 322-1. Similarly, the flexible printed circuit (FPC) 44 is electrically connected to the second end portion (the second tied-up part) 262 of the focusing coil 26 via the suspension wire 16 of the left-front, the second leaf spring piece 32-2 of the first leaf spring (the upper leaf spring) 32, and the second U-shaped terminal portion (the left-side U-shaped terminal portion) 322-2.

In the manner which is described above, feeding to the focusing coil 26 is carried out from the flexible printed circuit (FPC) 44 via the two suspension wires 16 and the first leaf spring 32.

New, the description will proceed to a method of assembling the lens holder driving device 10.

First, the auto-focusing lens holder driving portion (the AF unit) 20 is manufactured by assembling the lens holder 24, the focusing coil 26, the permanent magnet 28, the magnet holder 30, the upper leaf spring 32, the lower leaf spring 34, and the spacer 36.

On the other hand, an assembly consisting of the coil board 40 and the flexible printed circuit (FPC) 44, as shown in FIG. 21, is manufactured by the above-mentioned solder reflow. The assembly is mounted on the base 14 provided the side of the first terminal portions 161 of the four suspension wires 16.

Subsequently, the above-mentioned auto-focusing lens holder driving portion (the AF unit) 20 is mounted on the base 14 via the above-mentioned assembly and the second end portions 162 of the four suspension wires 14 are fixed to the arc-shaped extending portions 328 via the wire fixing holes 328a by means of the solder 60 or the adhesive agent 62.

The first and second U-shaped terminal portions 322-1 and 322-2 of the first leaf spring (the upper leaf spring) 32 are connected to the first and second end portions 261 and 261 of the focusing coil 26.

Lastly, the shielding cover 42 is put so as to cover the auto-focusing lens holder driving portion (the AF unit) 20 and a lower end of the shielding cover 42 is fixed to the base 14.

As such a manner, it is possible to easily assemble the lens holder driving device 10.

The lens holder driving device 10 assembled in such a manner has a size of 11 mm×11 mm×4.2 mm.

Referring to FIGS. 24 through 27, the description will proceed to a method of mounting four damper compounds 65 and positioning thereof that is for suppressing undesired resonance in the direction O of the optical axis O of the auto-focusing lens holder driving portion (the AF unit) 20 (the lens holder moving portion (26; 28; 30)) in the lens holder driving device 10.

Figure 24:
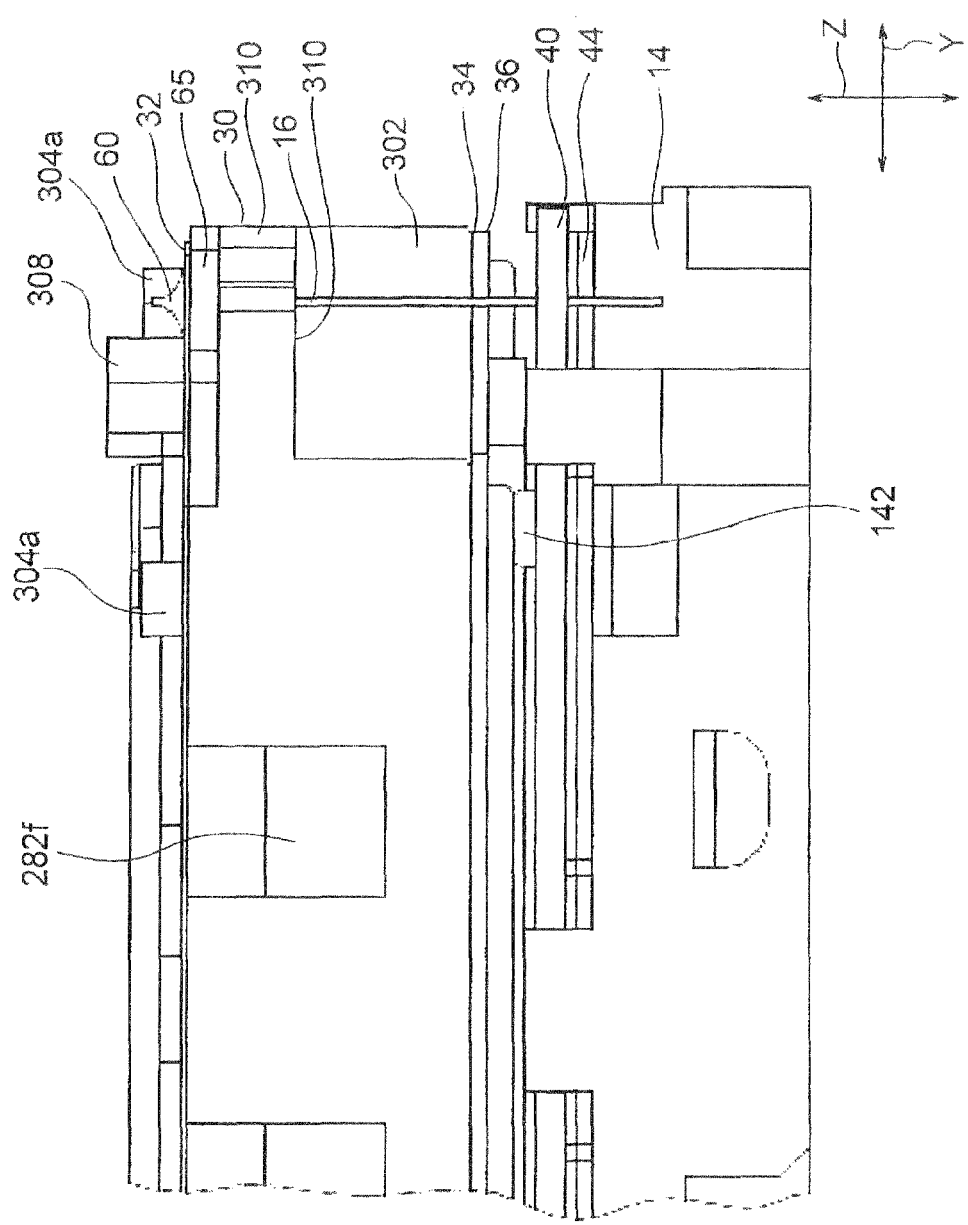
FIG. 24 is a fragmentary vertical sectional view showing a state where a shielding cover is omitted from the lens holder driving device illustrated in FIG. 1.
Figure 25:
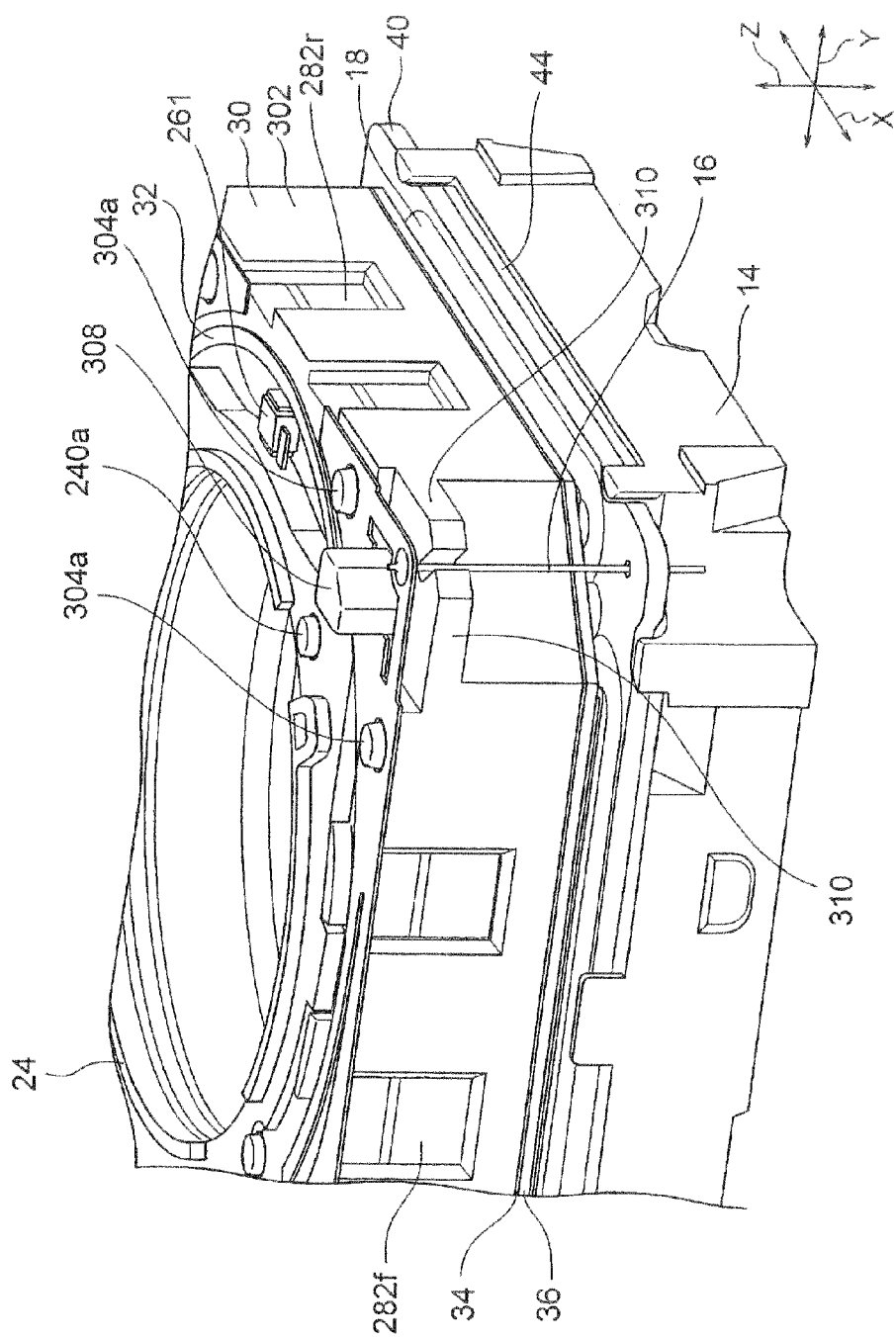
FIG. 25 is a fragmentary perspective view of the lens holder driving device illustrated in FIG. 24 seen from a slanting above.
Figure 26:
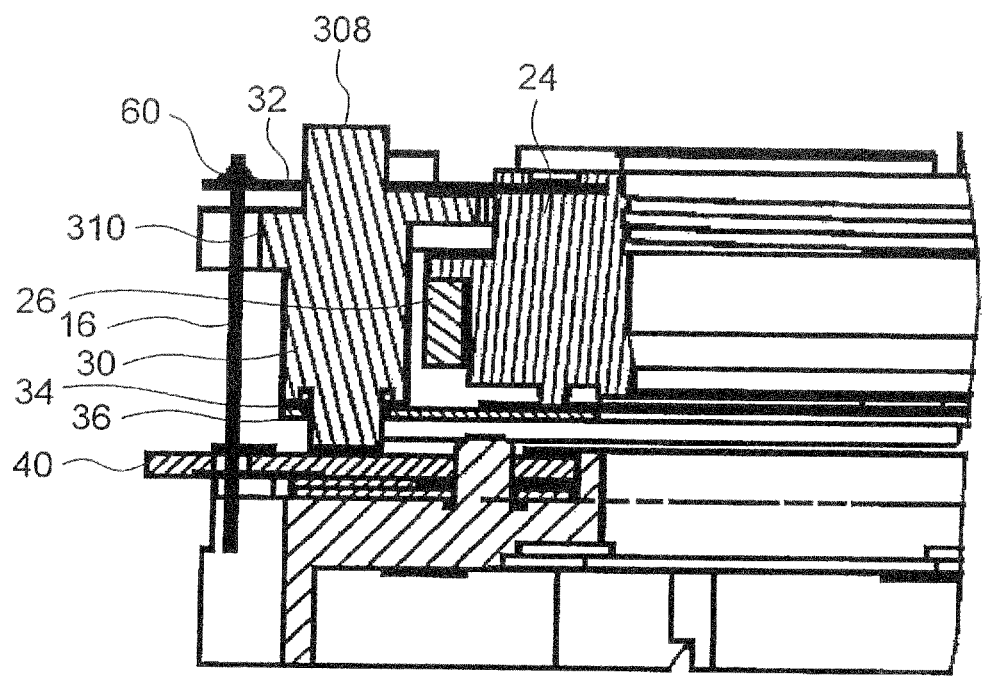
FIG. 26 is a fragmentary sectional view of the lens holder driving device in a case without any damper compound in the lens holder driving device illustrated in FIG. 24.
Figure 27:
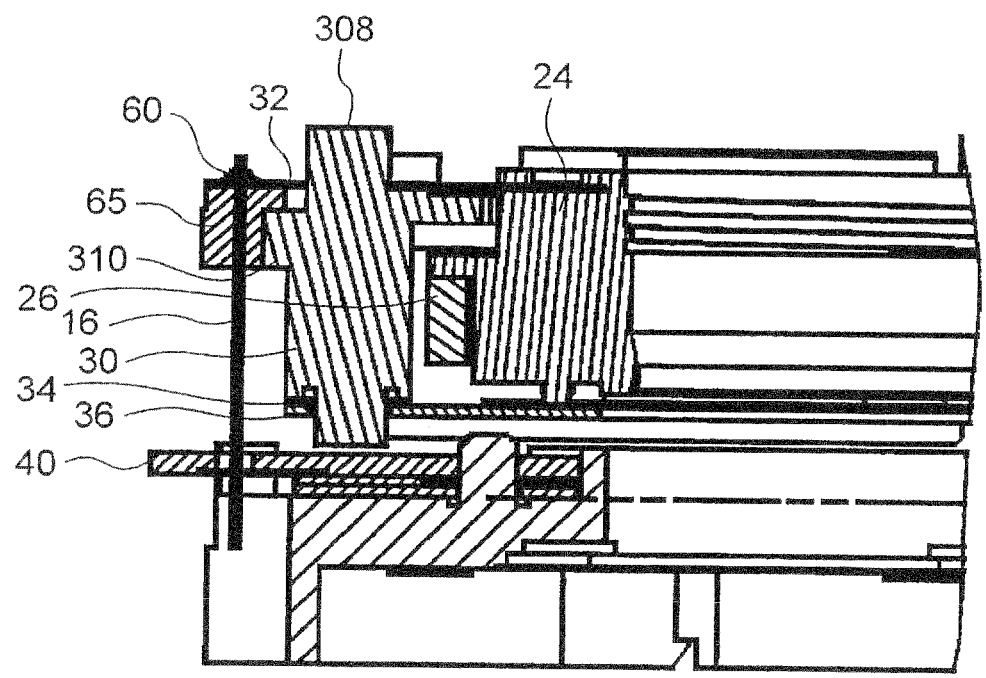
FIG. 27 is a fragmentary sectional view of the lens holder driving device in a case with damper compounds in the lens holder driving device illustrated in FIG. 24.

FIG. 24 is a fragmentary vertical sectional view showing a state where the shielding cover 42 is omitted from the lens holder driving device 10. FIG. 25 is a fragmentary perspective view of the lens holder driving device 10 seen from a slanting above. FIG. 26 is a fragmentary sectional view of the lens holder driving device 10 in a case without any damper compound 65. FIG. 27 is a fragmentary sectional view of the lens holder driving device 10 in a case with the four damper compounds 65.

In the example being illustrated, the four damper compounds 65 are disposed between the magnet holder 30 and the first leaf spring 32 serving as the elastic member so as to enclose the four suspension wires 16. More specifically, the magnet holder 30 (the lens holder moving portion (26; 28; 30)) comprises four extending portions 310, at positions in the vicinity of the four wire fixing portions 328, extending at four corners of the magnet holder 30 (the lens holder moving portion (26; 28; 30)) in the radial direction outwards so as to enclose the four suspension wires 16 with spaces. The four damper compounds 65 are disposed between the four extending portions 310 and the four wire fixing portions 328 so as to enclose the four suspension wires 16, respectively. The four damper compounds 65 are easily applied, by using a dispenser (not shown), between the four extending portions 310 and the four wire fixing portions 328, as shown in FIG. 27.

In the example being illustrated, as each damper compounds 65, an ultraviolet cure silicone gel having viscosity of 90 Pa·s is used that is sold by a product name of TB3168E made in ThreeBond Co., Ltd.

Accordingly, after the four damper compounds 65 are applied to gaps between the four extending portions 310 of the magnet holder 30 and the four wire fixing portions 328 in the manner which is described above, the four damper compounds 65 are cured by irradiating the four damper compounds 65 with ultraviolet.

Figure 28:
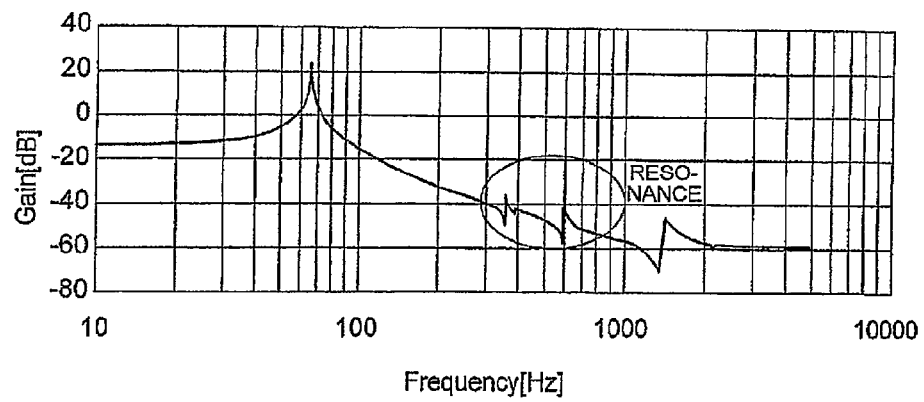
FIG. 28 is a view showing a frequency response of an auto-focusing lens driving portion (a lens holder moving portion) of a conventional lens holder device without the damper compounds in directions perpendicular to an optical axis.
Figure 29:
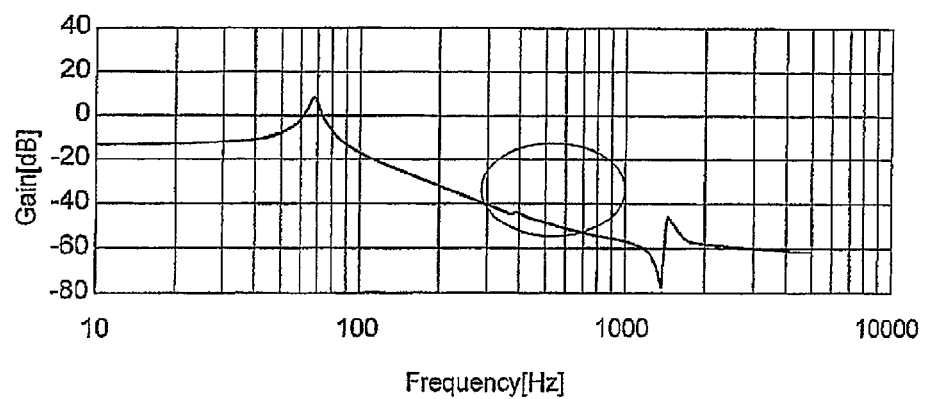
FIG. 29 is a view showing a frequency response of an auto-focusing lens driving portion (a lens holder moving portion) of the lens holder device according to the first exemplary embodiment of the present invention in directions perpendicular to an optical axis.

Referring to FIGS. 28 and 29, the description will proceed to frequency responses in a case where the four damper compounds 65 are absent (prior art example) and in a case where the four damper compounds 65 are present (the first exemplary embodiment). FIG. 28 is a view showing a frequency response of the auto-focusing lens driving portion (the AF unit) 20 of a conventional lens holder device without the four damper compounds 65 in directions (X/Y) perpendicular to the optical axis O while FIG. 29 is a view showing a frequency response of the auto-focusing lens driving portion (AF unit) 20 of the lens holder device 10 according to the first exemplary embodiment of the present invention with the four damper compounds 65 in directions (X/Y) perpendicular to the optical axis O. In each of FIGS. 28 and 29, the abscissa presents a frequency [Hz] while the ordinate represents a gain [dB].

As is apparent from FIG. 28, in the conventional lens holder driving device without the damper compounds 65, it is understood that undesired resonance (a higher resonance mode) of the auto-focusing lens holder driving portion (the AF unit) 20 is generated at frequencies of about 400 Hz.

In contrast with this, as is apparent from FIG. 29, in the lens holder driving device 10 according to the first exemplary embodiment with the four damper compounds 65, it is understood that generation of such undesired resonance (the higher resonance mode) is suppressed.

Accordingly, the lens holder driving device 10 according to the first exemplary embodiment can carry out a stable control operation for stabilizing blurred images.

In addition, inasmuch as the four damper compounds 65 are disposed so as to support the auto-focusing lens holder driving portion (the AF unit) 20 (the lens holder moving portion (26; 28; 30)) serving as a movable part at a side for stabilizing blurred images, it also has an effect which can relief impact to the auto-focusing lens holder driving portion (the AF unit) 20 (the lens holder moving portion (26; 28; 30)) on a drop of the lens holder driving device 10.

The above-mentioned lens holder driving device 10 according to the first exemplary embodiment of the present invention has effects which will be presently described.

First, it is possible for the two Hall elements 50f and 50l to avoid a detrimental effect caused by the magnetic field generated by the current flowing through the specific two image stabilizer coil portions (the driving coil portions) 18f and 18l because the two Hall elements 50f and 50l are disposed on the base 14 at the positions where the specific two image stabilizer coil portions (the driving coil portions) 18f and 18l are separated into the respective two coil parts 18fl, 18fr and 181f, 181b.

Secondly, it is possible to prevent the four suspension wires 15 from fracturing and to heighten impact resistance of the lens holder driving device 10 because the lens holder driving device comprises fracture preventing member 328.

Thirdly, it is possible to electrically connect the inner wiring of the flexible printed circuit (FPC) 44 with the plurality of lands 18a of the coil board 40 by means of solder reflow because the notch portions 44b are formed to the flexible printed circuit (FPC) 44 at the positions corresponding to the plurality of lands 18a formed on the coil board 40.

Fourthly, it is possible to make the stoke in the case of position adjusting the lens holder 24 (the lens barrel 12) in the direction of the optical axis O larger because the height of the focusing coil 26 is lower than the height of the permanent magnet piece 282.

Fifthly, it is possible to enhance sensitivity of the driving force for moving the auto-focusing lens holder driving portion (the AF unit) 20 (the lens holder moving portion (26; 28; 30)) as a whole in the direction orthogonal to the optical axis O because the permanent magnet pieces 282 and the image stabilizer coil (the driving coil) 18 are disposed so that the edges of the permanent magnet pieces in the radial direction are laid in the coil sectional width of the image stabilizer coil (the driving coil) 18 in the radial direction.

Sixthly, it is possible to suppress undesired resonance of the auto-focusing lens holder driving portion (the AF unit) 20 (the lens holder moving portion (26; 28; 30)) and it is possible to carry out a stable operation because the damper compounds 65 are disposed between the magnet holder 30 and the elastic member 32 so as to enclose the suspension wires 16.

Seventhly, it possible to prevent the damper compounds 65 from moving, rupturing, and degenerating on dropping/vibrating because each damper compound 65 is disposed between the extending portion 310 of the magnet holder 30 and the wire fixing portion 328 of the first leaf spring 32 so as to enclose each suspension wire 16.

Eighthly, it is possible to easily apply a proper amount of the damper compound 65 because the extending portion 310 is provided at the position in the vicinity of the wire fixing portion 328 so as to enclose each suspension wire 16 with a space.

Modified Examples

Now, the description will proceed to modified examples of the lens holder driving device 10 according to the first exemplary embodiment.

Although the four damper compounds 65 are provided at the four corners of the magnet holder 30 (the lens holder moving portion (26; 28; 30)) in the above-mentioned lens holder driving device 10 according to the first exemplary embodiment, the number of the damper compounds 65 and configuration thereof are not important in this invention, it is therefore important that the damper compound 65 is disposed between the lens holder 30 (the lens holder moving portion (26; 28; 30)) and the elastic member 32 so as to enclose at least one suspension wire 16.

Figure 30:
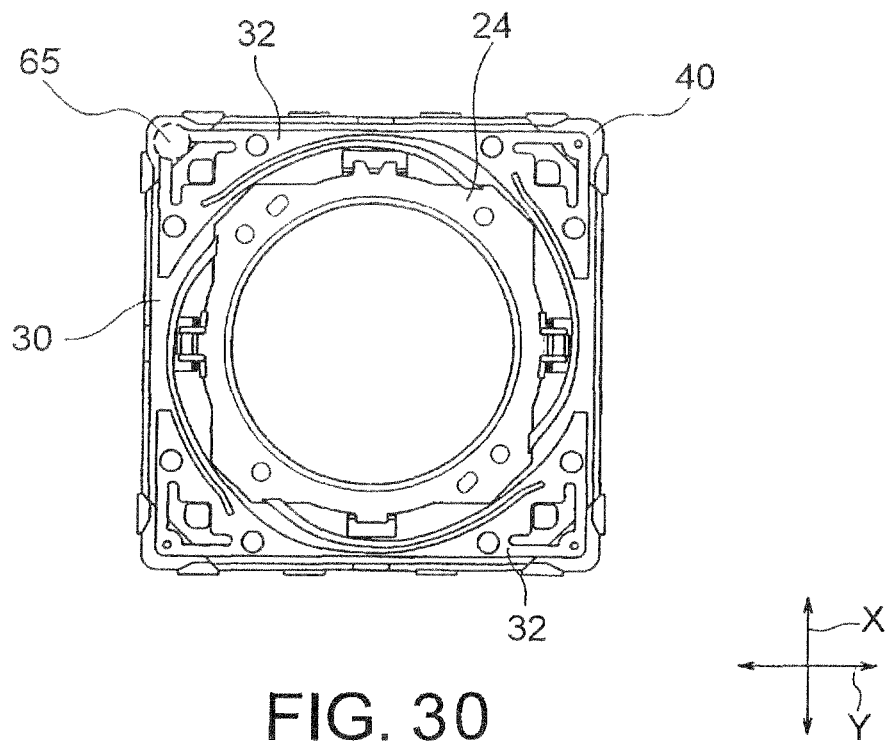
FIG. 30 is a plan view showing an arrangement position of a damper compound in a lens holder driving device according to a first modified example of the first exemplary embodiment with a shielding cover omitted therefrom and with a part of an upper leaf spring (a first leaf spring) omitted therefrom.
Figure 31:
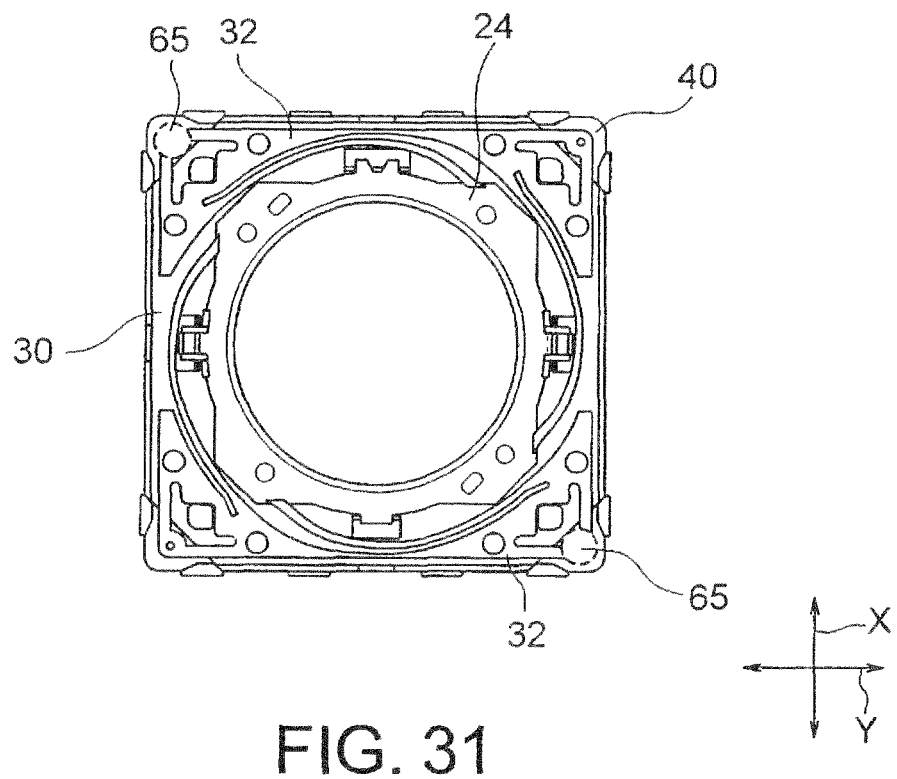
FIG. 31 is a plan view showing arrangement positions of damper compounds in a lens holder driving device according to a second modified example of the first exemplary embodiment with the shielding cover omitted therefrom and with the part of the upper leaf spring (the first leaf spring) omitted therefrom.

By way of illustration, one damper compound 65 may be provided at only one location as the lens holder driving device 10 according to a first modified example in the manner as illustrated in FIG. 30. In addition, two damper compounds 65 may be provided at two locations as the lens holder driving device 10 according to a second modified example in the manner as illustrated in FIG. 31.

In the manner which is described above, by proving one or plural damper compounds 65 at one or plural locations as well, effects similar to those of the above-mentioned first exemplary embodiment are obtained.

Although the ultraviolet cure silicone gel is used as the damper compound 65 in the above-mentioned lens holder driving device 10 according to the first exemplary embodiment, material of the damper compound 65 is not limited thereto, and may use any material having a damper effect.

Figure 32:
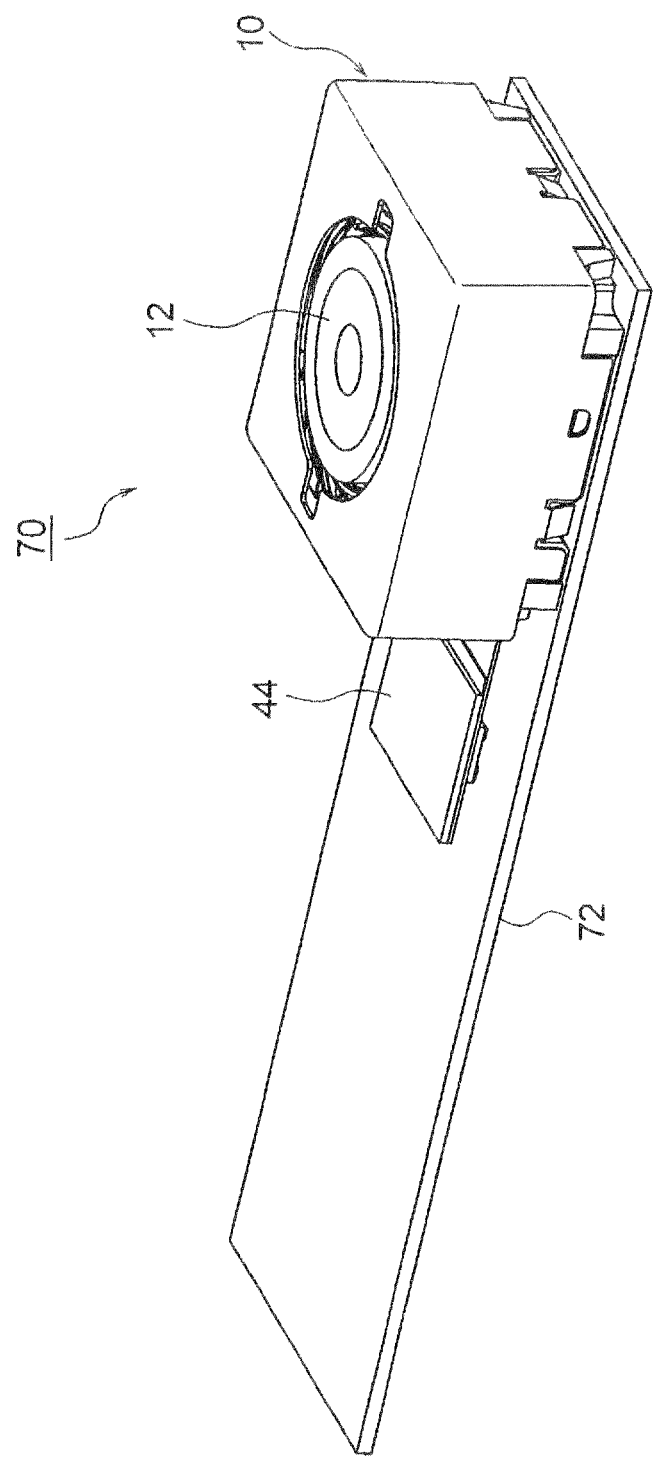
FIG. 32 is an external perspective view of a camera module comprising the lens holder driving device according to the first exemplary embodiment.
Figure 33:
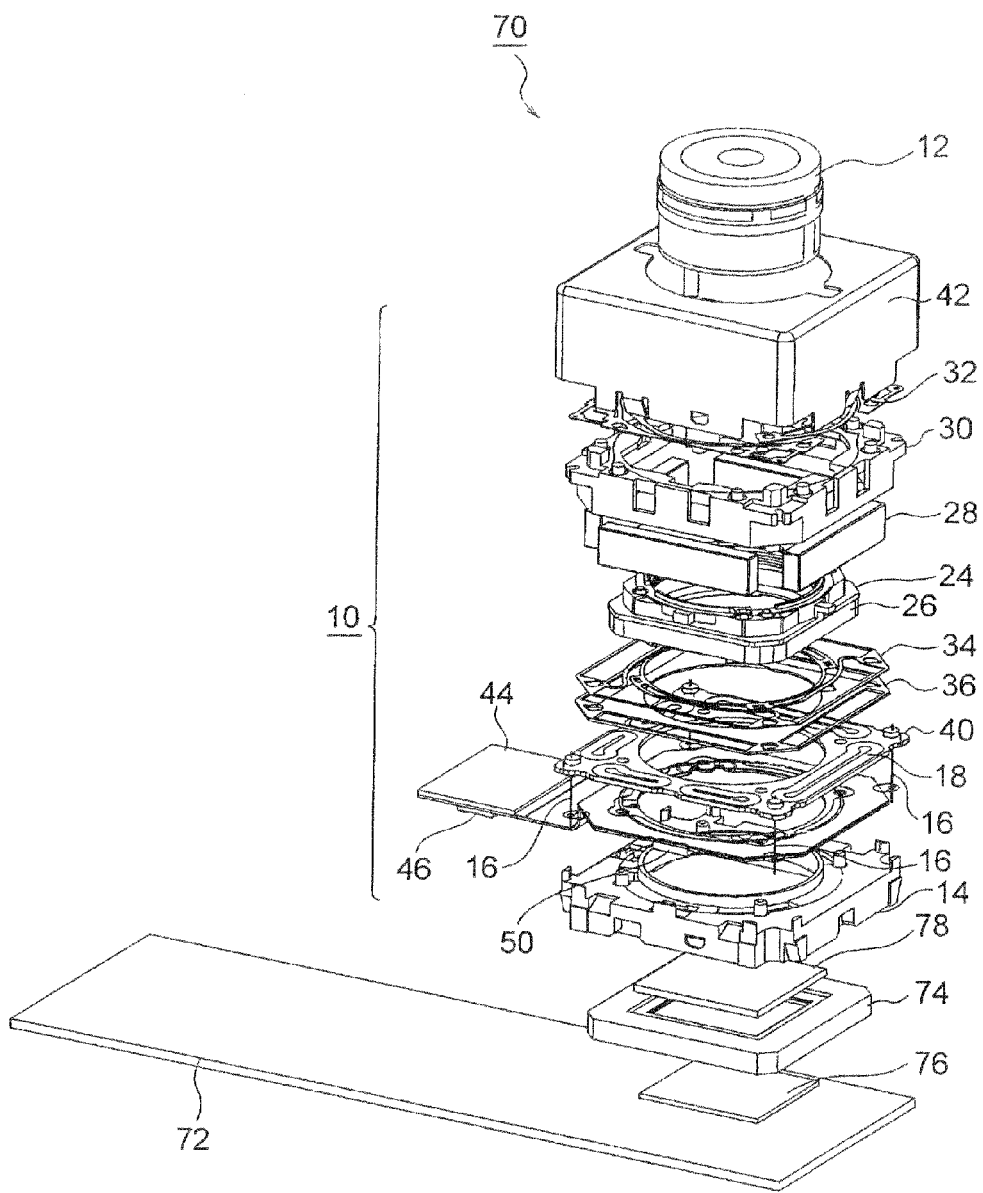
FIG. 33 is an exploded perspective view showing the camera module illustrated in FIG. 32.

Referring to FIGS. 32 and 33, the description will proceed to a camera module 70 comprising the above-mentioned lens holder driving device 10. FIG. 32 is an external perspective view of the camera module 70, and FIG. 33 is an exploded perspective view showing the camera module 70.

The illustrated camera module 70 comprises the lens barrel 12 mounted (held) in the lens holder 24, the sensor board 72 on which the image pickup device (sensor) 76 is mounted, and a holding member 74 which is disposed between the sensor board 72 and the base 14 and which is holding an infrared-cut filter 78 in addition to the lens holder driving device 10.

Figure 34:
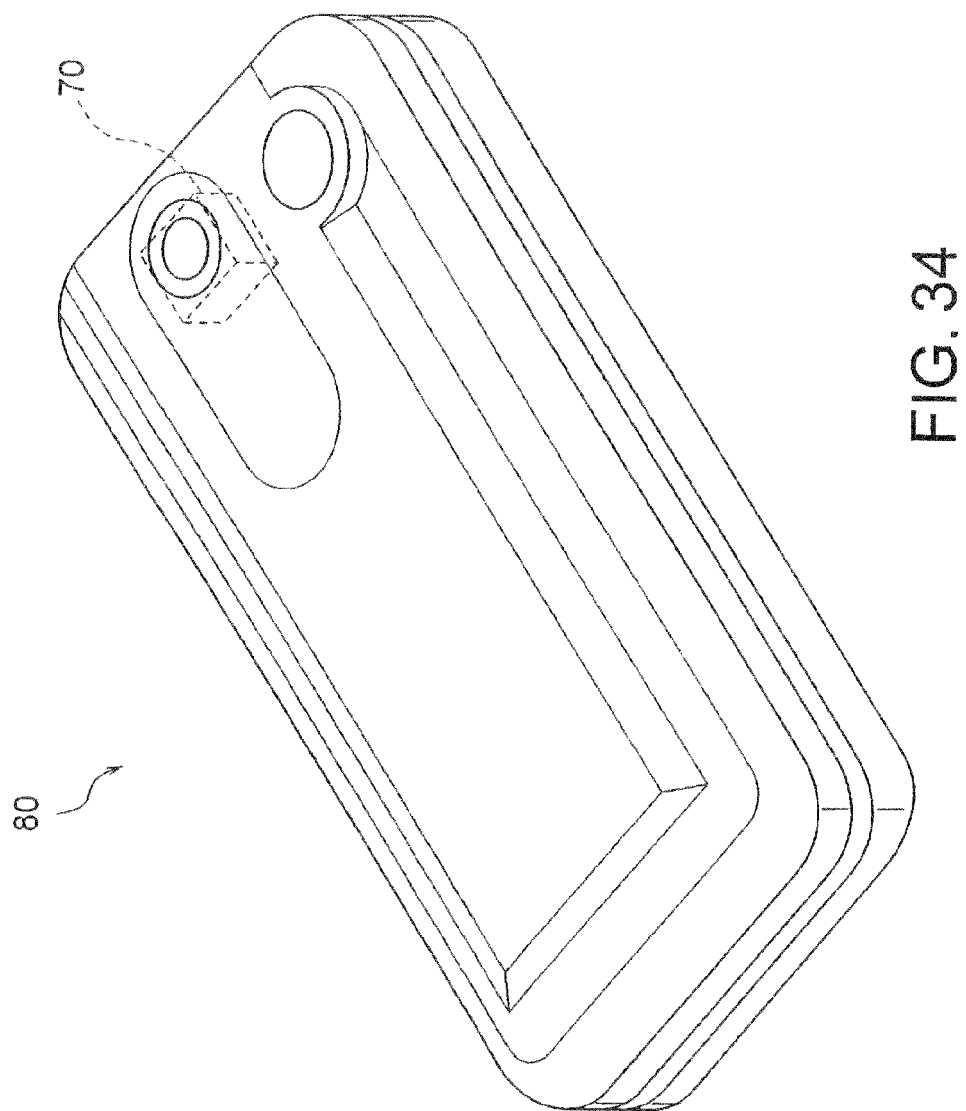
FIG. 34 is a perspective view showing appearance of a camera-equipped mobile terminal comprising the camera module illustrated in FIG. 33.

FIG. 34 is a perspective view showing appearance of a camera-equipped mobile terminal 80 on which the camera module 70 is mounted. The illustrated camera-equipped mobile terminal 80 is a camera-equipped cellular mobile phone and shows a folded state. The camera module 70 is mounted at a predetermined potion of the camera-equipped mobile terminal 80. With this structure, a user can shoot using the camera-equipped mobile terminal 80.

Although this example shows by taking as an example in a case of the camera-equipped cellular mobile phone as the camera-equipped mobile terminal 80, the camera-equipped mobile terminal may be a smart phone, a notebook personal computer, a tablet-type personal computer, a mobile-type game machine, a Web camera, and a vehicle-mounted camera.

Second Exemplary Embodiment

Figure 35:
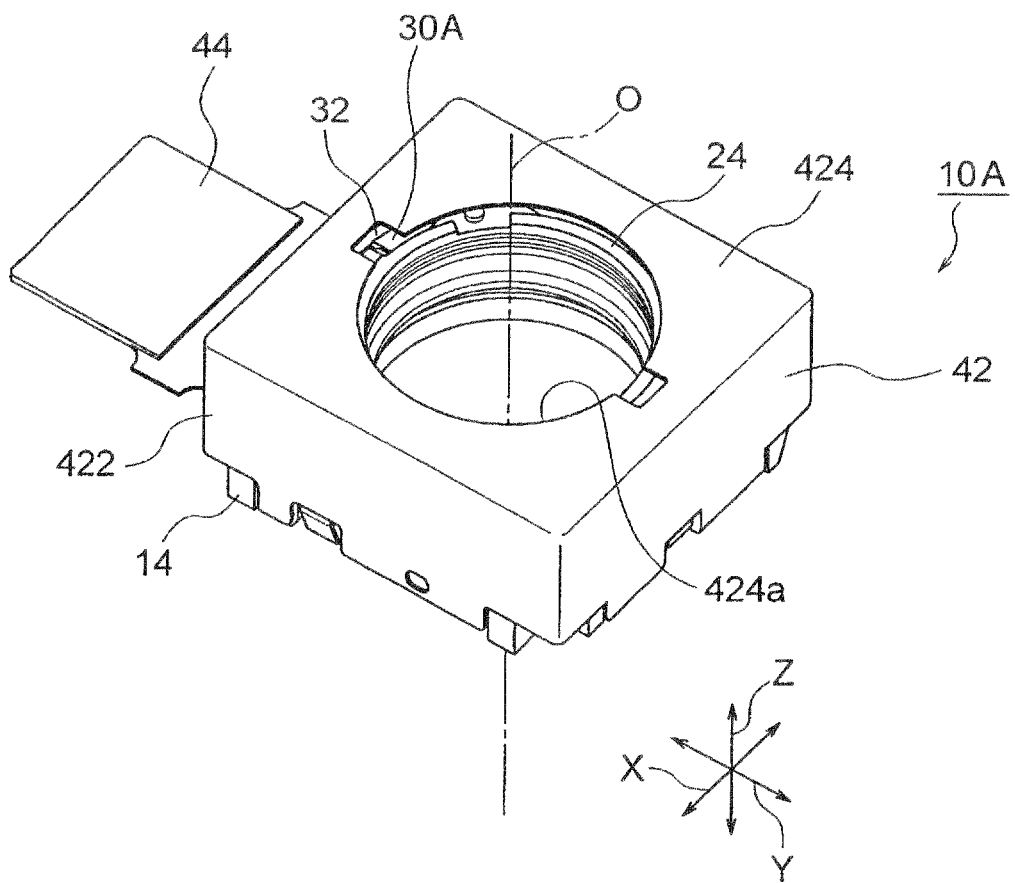
FIG. 35 is an external perspective view of a lens holder driving device according to a second exemplary embodiment of the present invention.
Figure 37:
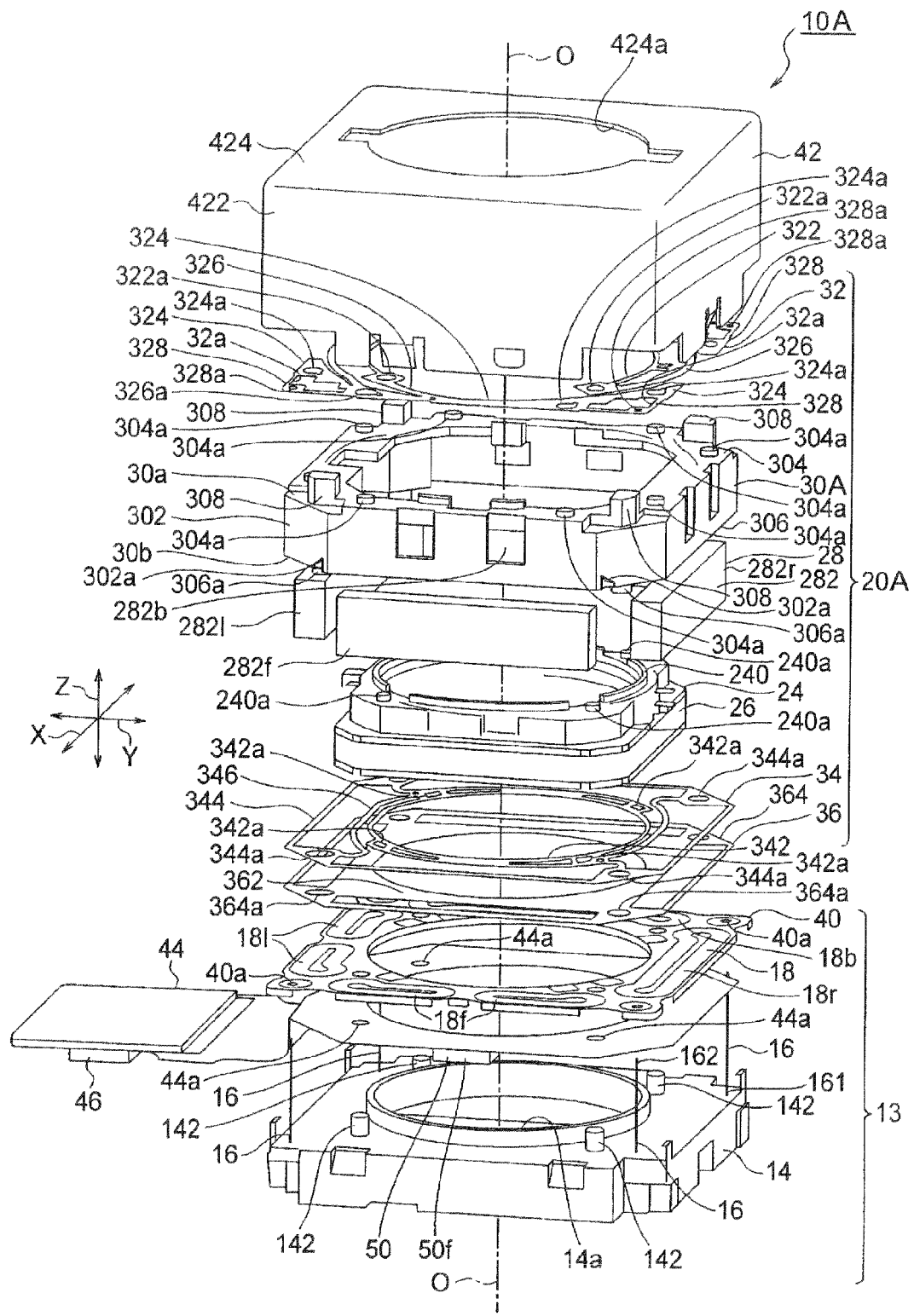
FIG. 37 is an exploded perspective view of the lens holder driving device illustrated in FIG. 35.

Referring to FIGS. 35 through 37, the description will proceed to a lens holder driving device 10A according to a second exemplary embodiment of the present invention. FIG. 35 is an external perspective view of the lens holder driving device 10A. FIG. 36 is a partial vertical cross sectional view of the lens holder driving device 10A. FIG. 37 is an exploded perspective view of the lens holder driving device 10A.

Herein, in the manner shown in FIGS. 35 to 37, an orthogonal coordinate system (X, Y, Z) is used. In a state illustrated in FIGS. 35 to 37, in the orthogonal coordinate system (X, Y, X), an X-axis direction is a fore-and-aft direction (a depth direction), a Y-axis direction is a left-and-right direction (a width direction), and a Z-axis direction is an up-and-down direction (a height direction). In addition, in the example being illustrated in FIGS. 35 to 37, the up-and-down direction Z is a direction of an optical axis O of a lens. In the second exemplary embodiment, the X-axis direction (the fore-and-aft direction) is called a first direction while the Y-axis direction (the left-and-right direction) is called in a second direction.

However, in an actual use situation, the direction of the optical axis O, namely, the Z-axis direction becomes a fore-and-aft direction. In other words, an upper direction of the Z-axis becomes a front direction while a lower direction of the Z-axis becomes a rear direction.

The illustrated lens holder driving device 10A is similar in structure and operation to the above-mentioned lens holder driving device 10 according to the first exemplary embodiment except that locations (positions) where the damper compounds 65 are different from in the manner which will later be described and a shape (structure) of the auto-focusing lens holder driving portion (the AF unit) (the lens holder moving portion) is different from in the manner which will later be described. The auto-focusing lens holder driving portion (the AF unit) is therefore depicted at 20A. The same reference signs are attached to those having the same functions of the components of the lens holder driving device 10 according to the first exemplary embodiment, and the description thereof is omitted for the sake of simplification of the description. Hereafter, only differences will be described.

The auto-focusing lens holder driving portion (the AF unit) 20A is similar in structure and operation to the auto-focusing lens holder driving portion (the AF unit) 20 according to the first exemplary embodiment except that a shape (structure) of the magnet holder is different from in the manner which will later be described. The magnet holder is therefore depicted at 30A.

Figure 38:
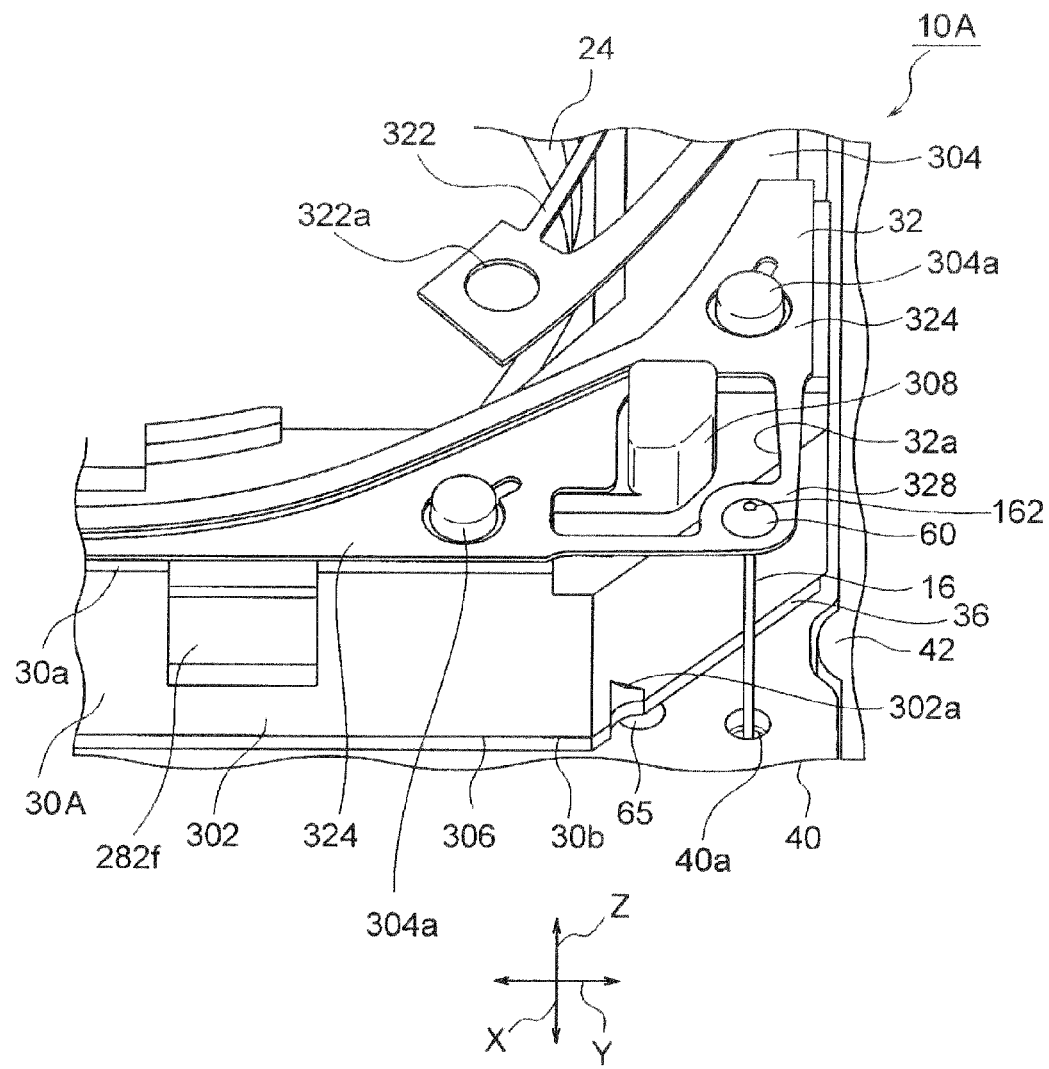
FIG. 38 is a partial perspective view enlargedly showing a part fixing a second end portion of a suspension wire to an upper leaf spring for use in the lens holder driving device illustrated in FIG. 35.
Figure 39:
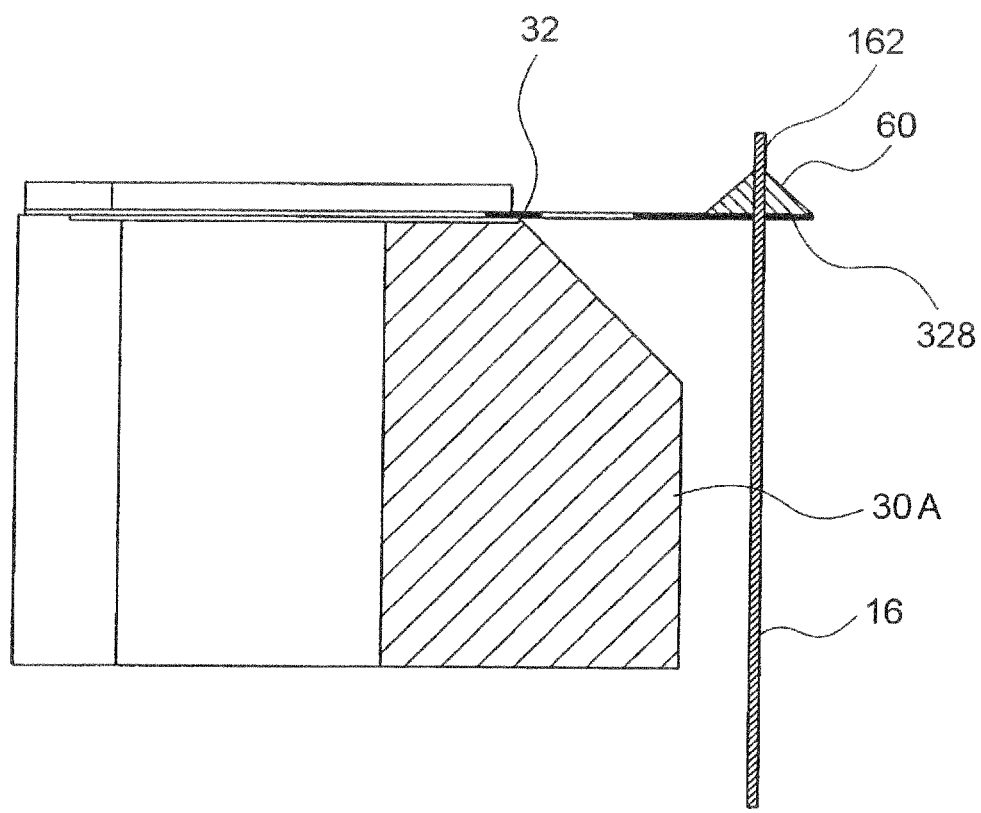
FIG. 39 is a partial cross sectional view of the fixed part illustrated in FIG. 38.
Figure 40:
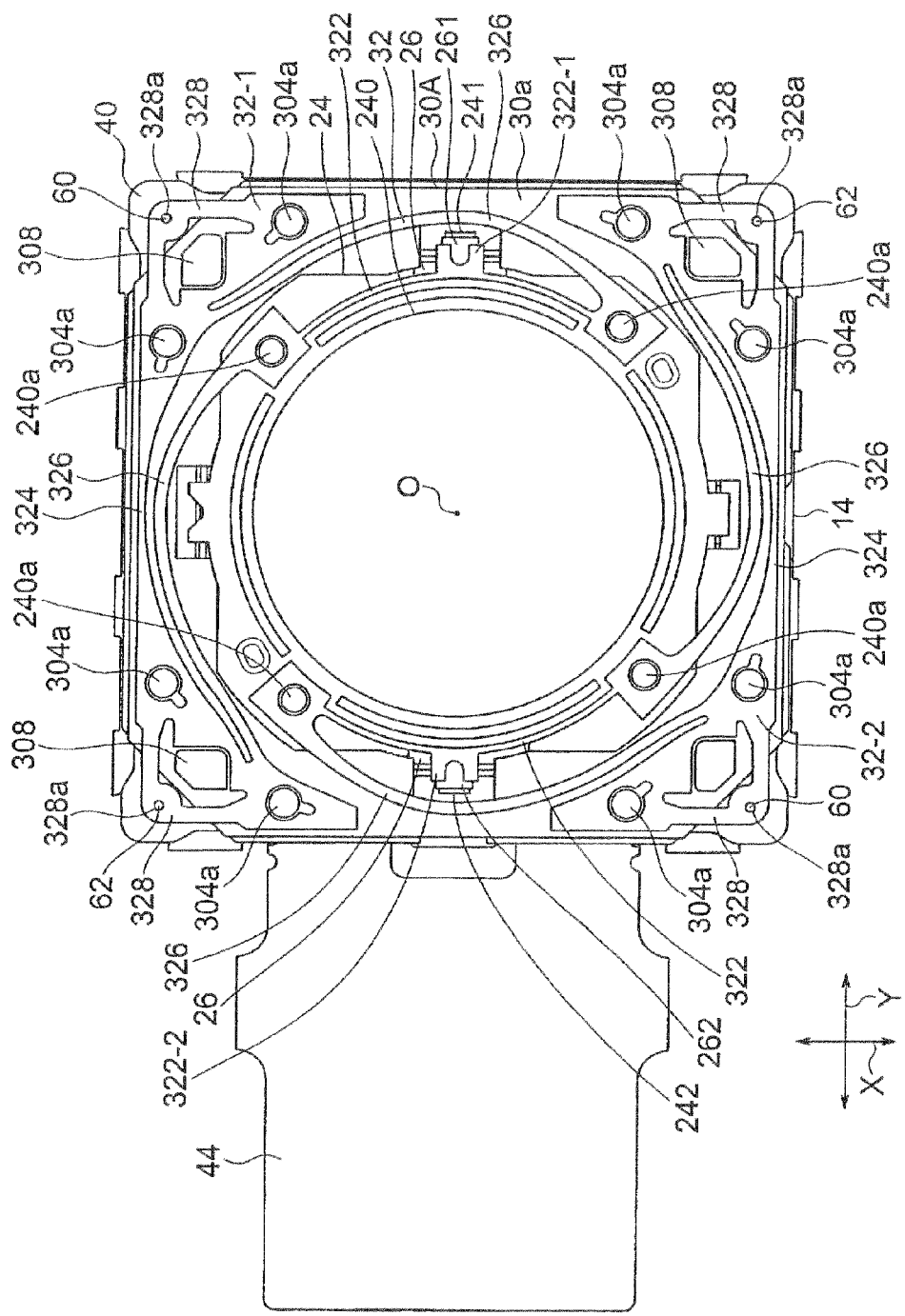
FIG. 40 is a plan view showing a state where a shielding cover is omitted from the lens holder driving device illustrated in FIG. 35.

FIG. 38 is a partial perspective view enlargedly showing a part fixing the second end portion 162 of the suspension wire 16 to the upper leaf spring 32. FIG. 39 is a partial cross sectional view of the fixed part. FIG. 40 is a plan view showing a state where the shielding cover 42 is omitted from the lens holder driving device 10A.

In the above-mentioned lens holder driving device 10 according to the first exemplary embodiment, the magnet holder 30 comprises the four extending portions 310 which extend at the four corners thereof in the radial direction outwards as shown in FIGS. 19, 20, and 22.

In comparison with this, as shown in FIGS. 38, 39, and 40, in the lens holder driving device 10A according to the second exemplary embodiment, the magnet holder 30A does not comprise such four extending portions 310. As a substitute for this, the outer tubular portion 302 of the magnet holder 30A has four guide grooves 302a.

Figure 41:
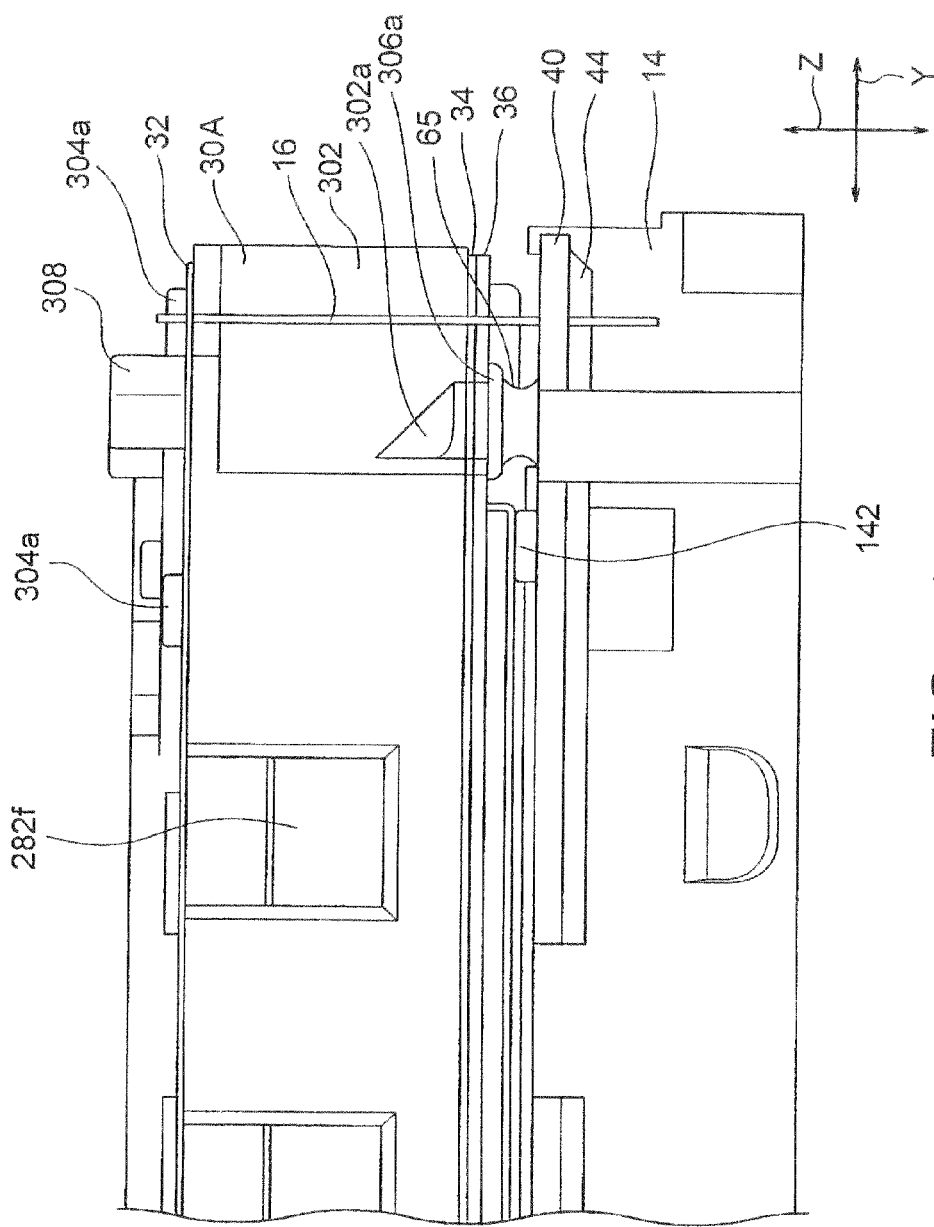
FIG. 41 is a fragmentary vertical sectional view showing a state where the shielding cover is omitted from the lens holder driving device illustrated in FIG. 35.
Figure 42:
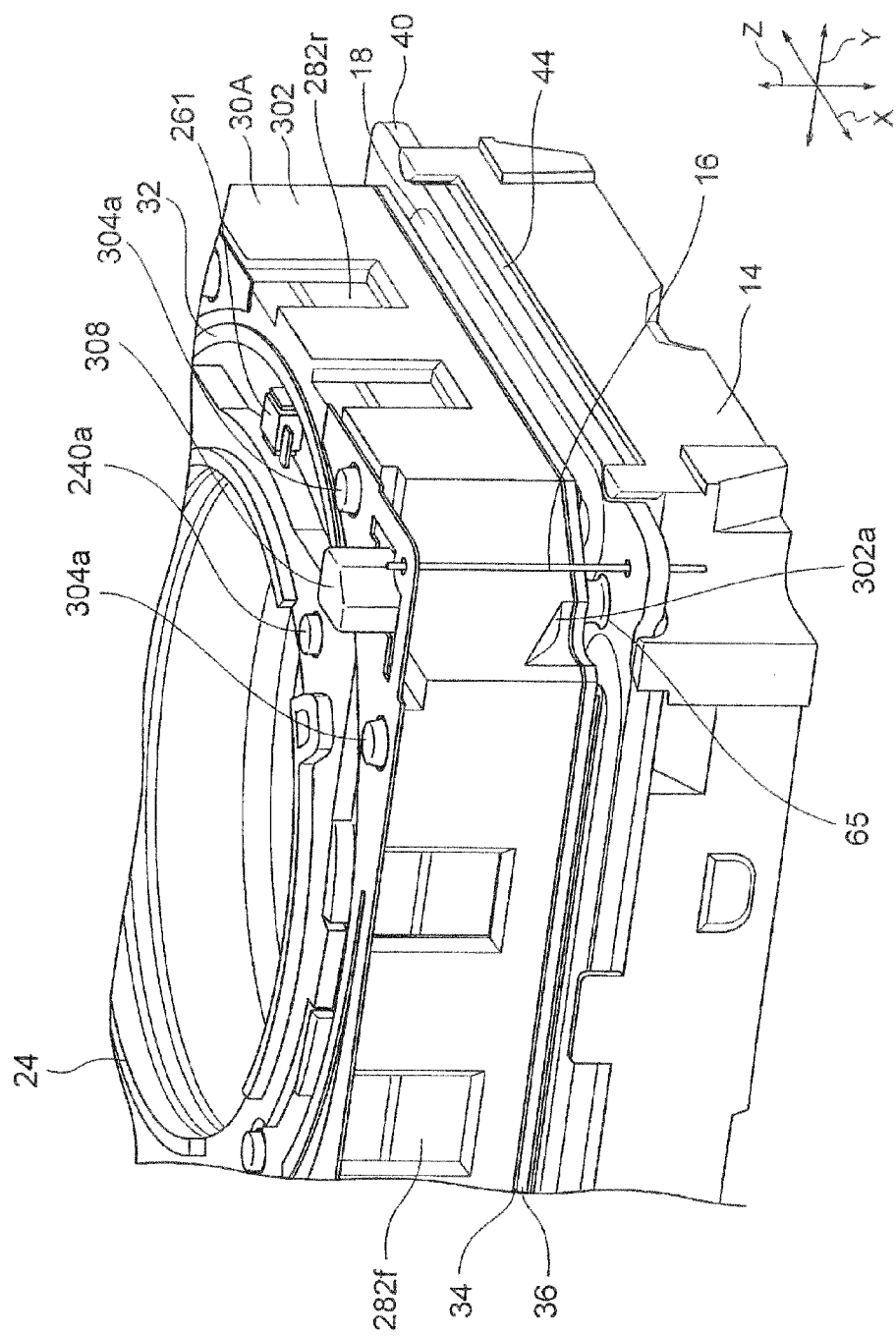
FIG. 42 is a fragmentary perspective view of the lens holder driving device illustrated in FIG. 41 seen from a slanting above.
Figure 43:
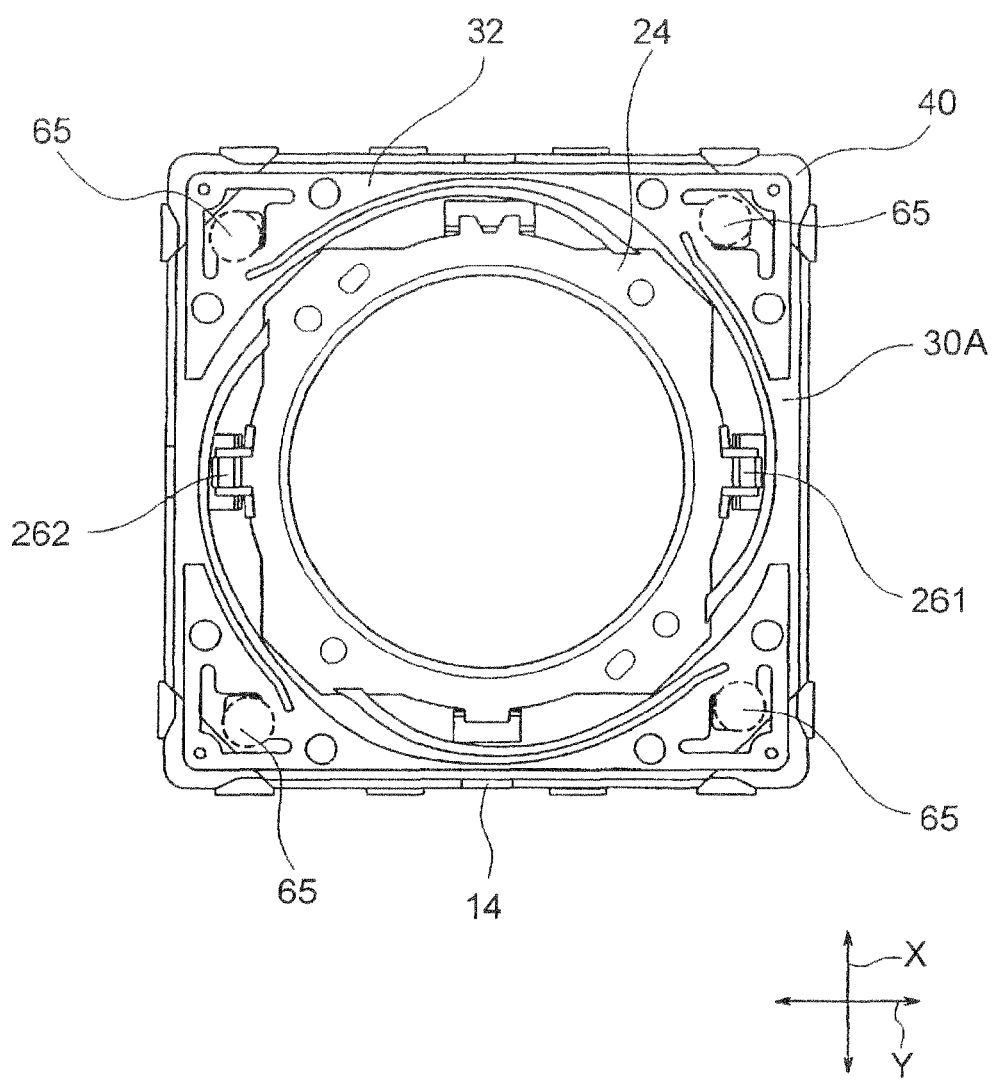
FIG. 43 is a plan view showing arrangement positions of damper compounds in the lens holder driving device illustrated in FIG. 41 with a part of an upper leaf spring (a first leaf spring) omitted therefrom.

Referring to FIGS. 41 through 43, the description will proceed to a method of mounting the four damper compounds 65 and positioning thereof that is for suppressing undesired resonance in the direction O of the optical axis O of the auto-focusing lens holder driving portion (the AF unit) 20A in the lens holder driving device 10A.

FIG. 41 is a fragmentary vertical sectional view showing a state where the shielding cover 42 is omitted from the lens holder driving device 10A. FIG. 42 is a fragmentary perspective view of the lens holder driving device 10A illustrated in FIG. 41 seen from a slanting above. FIG. 43 is a plan view showing arrangement positions of the four damper compounds 65 in the lens holder driving device 10A with a part of the upper leaf spring (the first leaf spring) 32 omitted therefrom.

The four damper compounds 65 are disposed between the four lower protrusions 306a of the magnet holder 30A and the coil board 40. The outer tubular portion 302 of the magnet holder 30A has the above-mentioned four guide grooves 302a for guiding a dispenser (not shown) for applying the four damper compounds 65. With this structure, it is possible to easily apply the four damper compounds 65 to the clearances between the four lower protrusions 306a and the coil board 40 by using the dispenser. In the manner which is described above, the clearances between the four lower protrusions 306a and the coil board 40 becomes narrow in comparison with clearance in the other areas. Accordingly, when the four damper compounds 65 are applied near the four lower protrusions 306a using the dispenser inserted along the guide groove 302a, the applied four damper compounds 65 naturally gather the clearances between the four lower protrusions 306a and the coil board 40 by the surface tension.

In the example being illustrated, as each damper compounds 65, an ultraviolet cure silicone gel having viscosity of 90 Pa·s is used that is sold by a product name of TB3168E made in ThreeBond Co., Ltd.

Accordingly, after the four damper compounds 65 are applied to the clearances between the four lower protrusions 306a of the magnet holder 30A and the coil board 40 in the manner which is described above, the four damper compounds 65 are cured by irradiating the four damper compounds 65 with ultraviolet.

Figure 44:
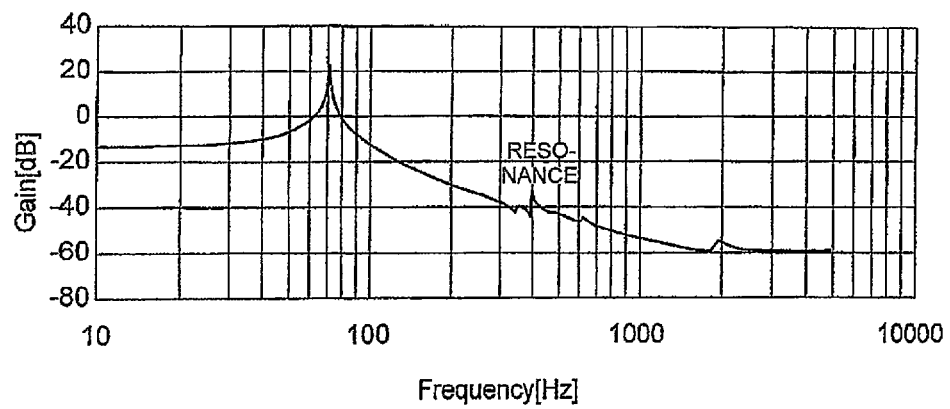
FIG. 44 is a view showing a frequency response of an auto-focusing lens driving portion of a conventional lens holder device without the damper compounds in a direction of an optical axis.
Figure 45:
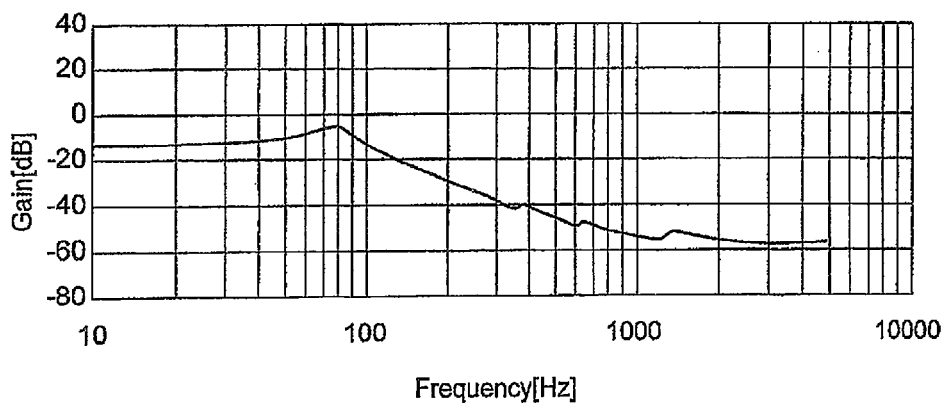
FIG. 45 is a view showing a frequency response of an auto-focusing lens driving portion of the lens holder driving device according to the second exemplary embodiment of the present invention in a direction of an optical axis.

Referring to FIGS. 44 and 45, the description will proceed to frequency responses in a case where the four damper compounds 65 are absent (prior art example) and in a case where the four damper compounds 65 are present (the second exemplary embodiment). FIG. 44 is a view showing a frequency response of the auto-focusing lens driving portion (the AF unit) 20A of a conventional lens holder device without the four damper compounds 65 in the direction of the optical axis O while FIG. 45 is a view showing a frequency response of the auto-focusing lens driving portion (AF unit) 20A of the lens holder driving device 10A according to the first exemplary embodiment of the present invention with the four damper compounds 65 in the directions of the optical axis O. In each of FIGS. 44 and 45, the abscissa presents a frequency [Hz] while the ordinate represents a gain [dB].

As is apparent from FIG. 44, in the conventional lens holder driving device without the damper compounds 65, it is understood that undesired resonance (a higher resonance mode) of the auto-focusing lens holder driving portion (the AF unit) 20 is generated at frequencies of about 400 Hz in the direction of the optical axis O.

In contrast with this, as is apparent from FIG. 45, in the lens holder driving device 10A according to the second exemplary embodiment with the four damper compounds 65, it is understood that generation of such undesired resonance (the higher resonance mode) in the direction of the optical axis O is suppressed.

Accordingly, the lens holder driving device 10A according to the second exemplary embodiment can carry out a stable control operation for stabilizing blurred images.

In addition, inasmuch as the four damper compounds 65 are disposed so as to support the auto-focusing lens holder driving portion (the AF unit) 20A serving as a movable part at a side for stabilizing blurred images, it also has an effect which can relief impact to the auto-focusing lens holder driving portion (the AF unit) 20A on a drop of the lens holder driving device 10A.

The above-mentioned lens holder driving device 10A according to the second exemplary embodiment of the present invention has effects which will be presently described.

First, it is possible for the two Hall elements 50f and 50l to avoid a detrimental effect caused by the magnetic field generated by the current flowing through the specific two image stabilizer coil portions 18f and 18l because the two Hall elements 50f and 50l are disposed on the base 14 at the positions where the specific two image stabilizer coil portions 18f and 18l are separated into the respective two coil parts 18fl, 18fr and 181f, 181b.

Secondly, it is possible to prevent the four suspension wires 15 from fracturing and to heighten impact resistance of the lens holder driving device 10A because the lens holder driving device 10A comprises fracture preventing member 328.

Thirdly, it is possible to electrically connect the inner wiring of the flexible printed circuit (FPC) 44 with the plurality of lands 18a of the coil board 40 by means of solder reflow because the notch portions 44b are formed to the flexible printed circuit (FPC) 44 at the positions corresponding to the plurality of lands 18a formed on the coil board 40.

Fourthly, it is possible to make the stoke in the case of position adjusting the lens holder 24 (the lens barrel) in the direction of the optical axis O larger because the height of the focusing coil 26 is lower than the height of the permanent magnet piece 282.

Fifthly, it is possible to enhance sensitivity of the driving force for moving the auto-focusing lens holder driving portion (the AF unit) 20A as a whole in the direction orthogonal to the optical axis O because the permanent magnet pieces 282 and the image stabilizer coil 18 are disposed so that the edges of the permanent magnet pieces in the radial direction are laid in the coil sectional width of the image stabilizer coil 18 in the radial direction.

Sixthly, it is possible to suppress undesired resonance of the auto-focusing lens holder driving portion 20A and it is possible to carry out a stable operation because the damper compounds 65 are disposed between the fixed member 13 and the auto-focusing lens holder driving portion 20A.

Seventhly, it possible to improve proof stress of the lens holder driving device 10A on dropping because the damper compounds 65 are disposed between the fixed member 13 and the auto-focusing lens holder driving portion 20A.

Modified Examples

Now, the description will proceed to modified examples of the lens holder driving device 10A according to the second exemplary embodiment.

Although the four damper compounds 65 are provided at the four locations as shown in FIG. 43 in the above-mentioned lens holder driving device 10A according to the second exemplary embodiment, the number of the damper compounds 65 and configuration thereof are not important in this invention, it is therefore important that the damper compound 65 is disposed between a movable portion (the auto-focusing lens holder driving portion) 20A and the fixed member 13.

Figure 46:
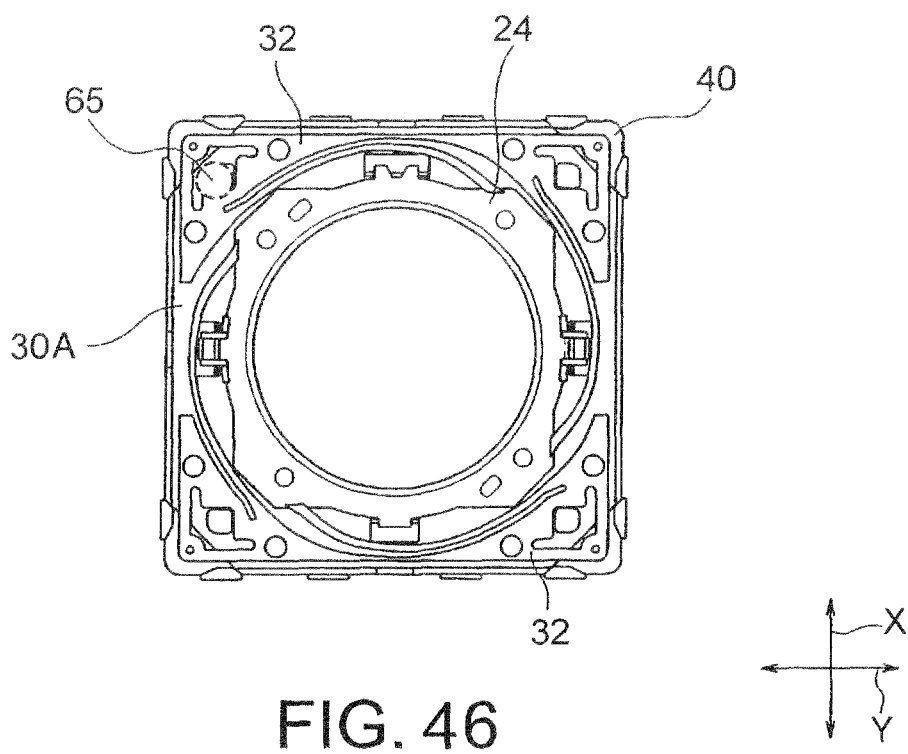
FIG. 46 is a plan view showing an arrangement position of a damper compound in a lens holder driving device according to a first modified example of the second exemplary embodiment with a shielding cover omitted therefrom and with a part of an upper leaf spring (a first leaf spring) omitted therefrom.
Figure 47:
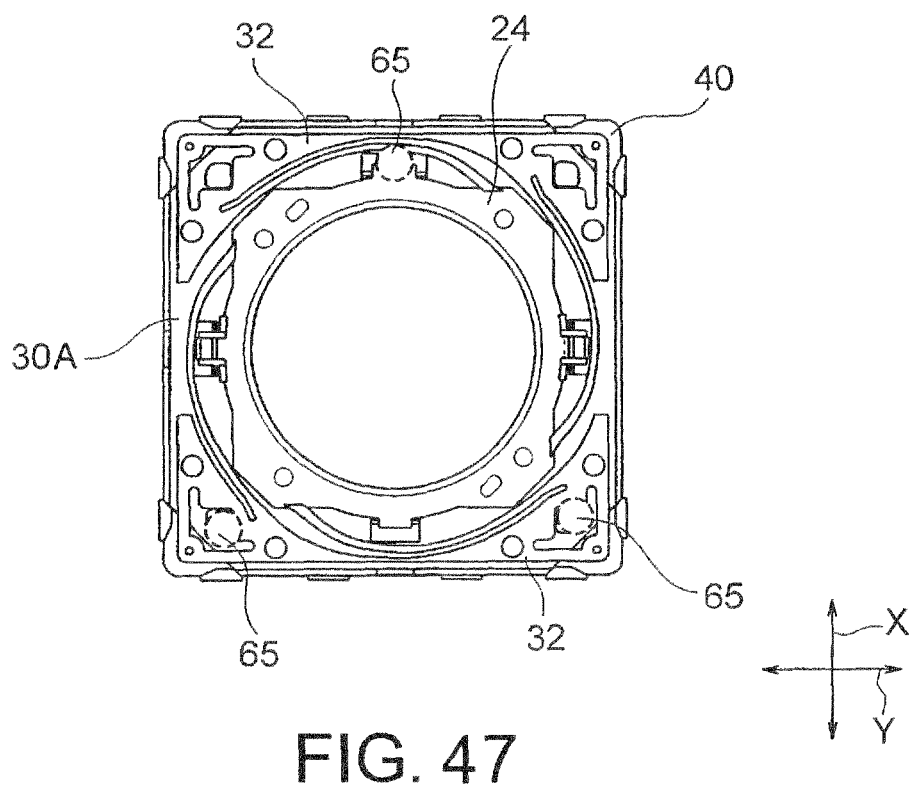
FIG. 47 is a plan view showing arrangement positions of damper compounds in a lens holder driving device according to a second modified example of the second exemplary embodiment with the shielding cover omitted therefrom and with the part of the upper leaf spring (the first leaf spring) omitted therefrom.
Figure 48:
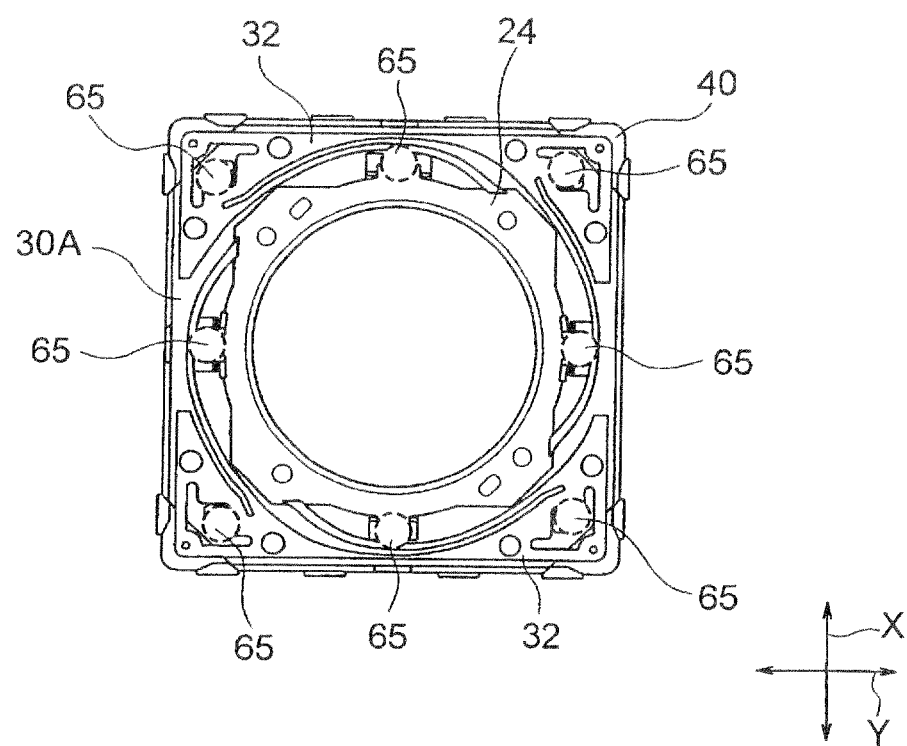
FIG. 48 is a plan view showing arrangement positions of damper compounds in a lens holder driving device according to a third modified example of the second exemplary embodiment with the shielding cover omitted therefrom and with the part of the upper leaf spring (the first leaf spring) omitted therefrom.

By way of illustration, one damper compound 65 may be provided at only one location as the lens holder driving device 10A according to a first modified example in the manner as illustrated in FIG. 46. In addition, three damper compounds 65 may be provided at three locations as the lens holder driving device 10A according to a second modified example in the manner as illustrated in FIG. 47. Furthermore, eight damper compounds 65 may be provided at eight locations as the lens holder driving device 10A according to a third modified example in the manner as illustrated in FIG. 48.

In the manner which is described above, by proving one or plural damper compounds 65 at one or plural locations as well, effects similar to those of the above-mentioned second exemplary embodiment are obtained.

Figure 49:
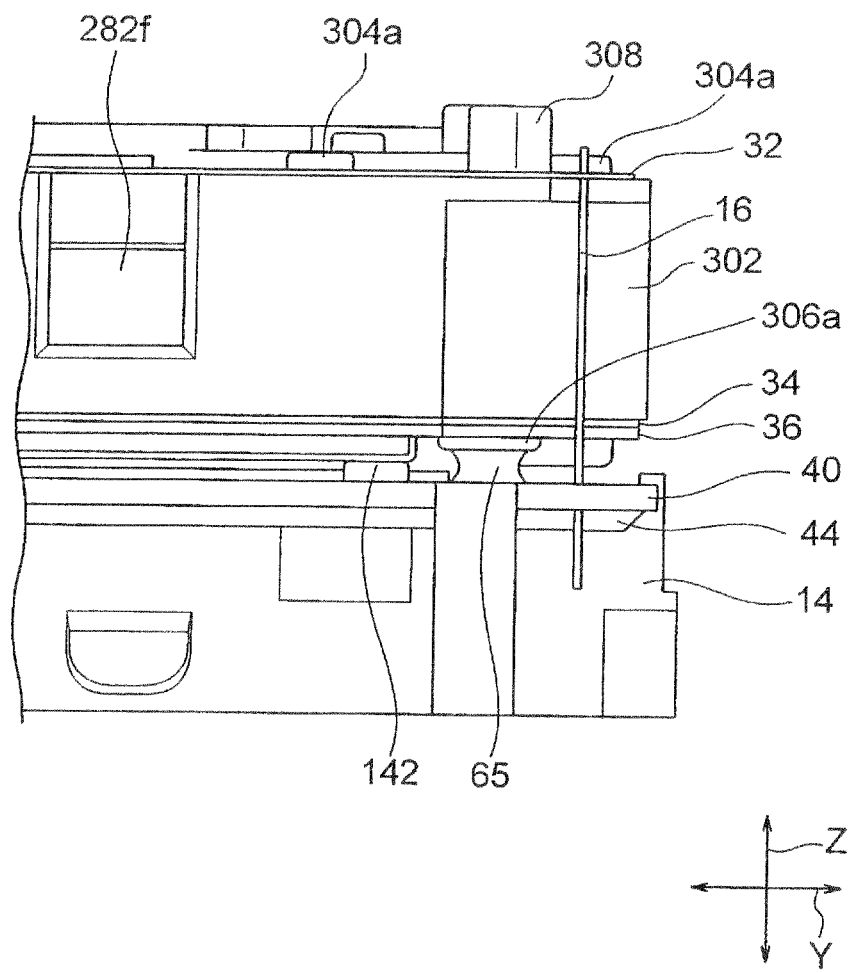
FIG. 49 is a fragmentary vertical sectional view showing a state where a shielding cover is omitted from a lens holder driving device according to a fourth modified example of the second exemplary embodiment.

In the above-mentioned lens holder driving device 10A according to the second exemplary embodiment, the guide grooves 302a are formed in the magnet holder 30A in order to easily apply the damper compounds 65 as shown in FIGS. 41 and 42. However, it may devoid of the guide grooves 302a as the lens holder driving device 10A according to a fourth modified example in the manner as illustrated in FIG. 49.

Although the ultraviolet cure silicone gel is used as the damper compound 65 in the above-mentioned lens holder driving device 10A according to the second exemplary embodiment, material of the damper compound 65 is not limited thereto, and may use any material having a damper effect.

Third Exemplary Embodiment

Figure 50:
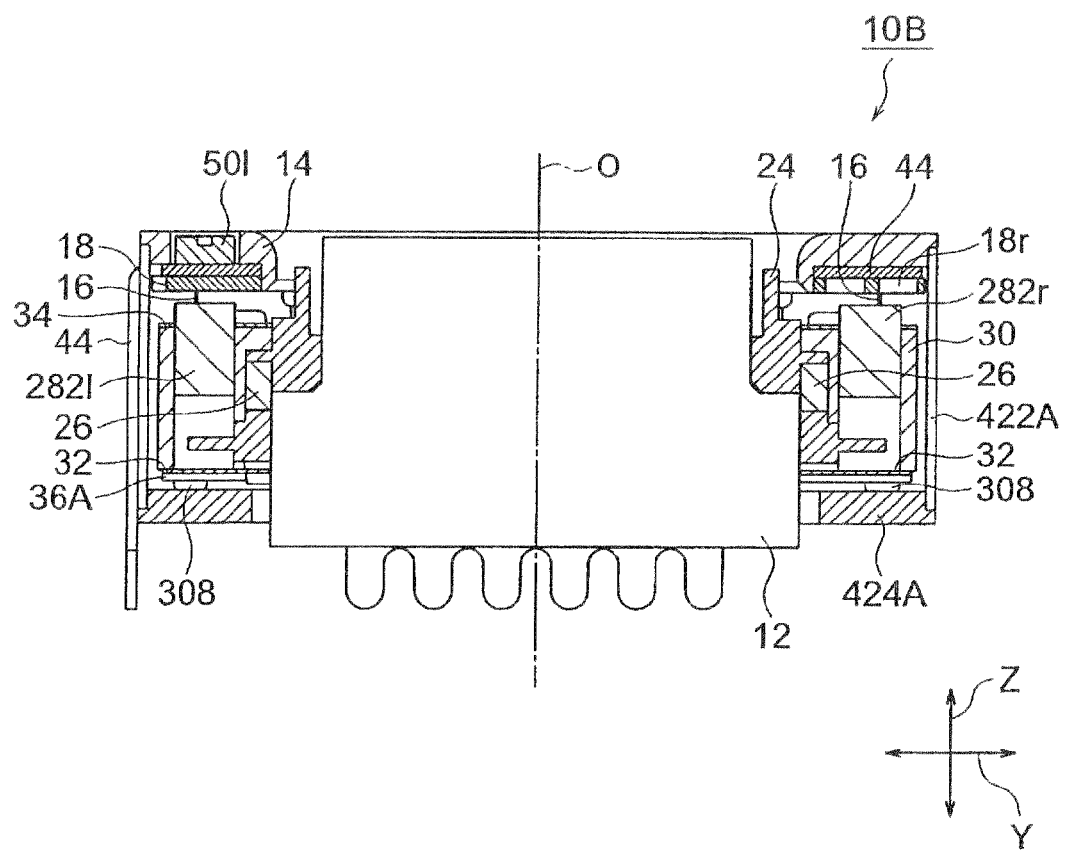
FIG. 50 is a vertical cross sectional view of a lens holder driving device according to a third exemplary embodiment of the present invention.
Figure 51:
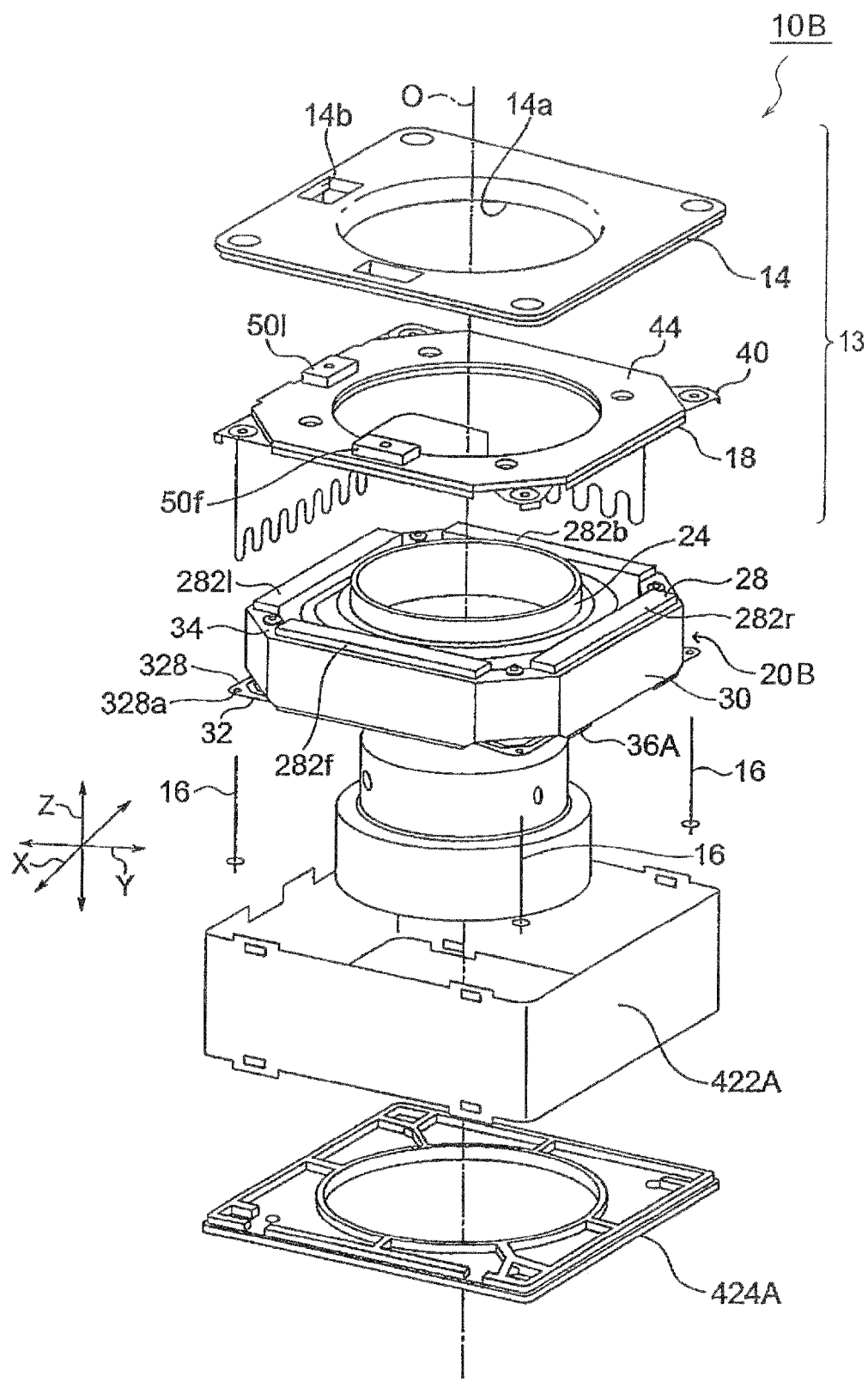
FIG. 51 is an exploded perspective view of the lens holder driving device illustrated in FIG. 50.

Referring to FIGS. 50 and 51, the description will proceed to a lens holder driving device 10B according to a third exemplary embodiment of the present invention. FIG. 50 is a vertical cross sectional view of the lens holder driving device 10B. FIG. 51 is an exploded perspective view of the lens holder driving device 10B.

Herein, in the manner shown in FIGS. 50 and 51, an orthogonal coordinate system (X, Y, Z) is used. In a state illustrated in FIGS. 50 and 51, in the orthogonal coordinate system (X, Y, X), an X-axis direction is a fore-and-aft direction (a depth direction), a Y-axis direction is a left-and-right direction (a width direction), and a Z-axis direction is an up-and-down direction (a height direction). In addition, in the example being illustrated in FIGS. 50 and 51, the up-and-down direction Z is a direction of an optical axis O of a lens. In the third exemplary embodiment, the X-axis direction (the fore-and-aft direction) is called a first direction while the Y-axis direction (the left-and-right direction) is called in a second direction.

However, in an actual use situation, the direction of the optical axis O, namely, the Z-axis direction becomes a fore-and-aft direction. In other words, an upper direction of the Z-axis becomes a front direction while a lower direction of the Z-axis becomes a rear direction.

The illustrated lens holder driving device 10B includes an auto-focusing lens holder driving portion 20B and an image stabilizer portion for stabilizing blurry images produced in the auto-focusing lens holder driving portion 20B on shooting a still image using a miniature camera for a mobile terminal and is a device which can pick up the still image free from image blurred.

The illustrated lens holder driving device 10B has a structure in which the lens holder driving device 10A according to the above-mentioned second exemplary embodiment is substantially turned upside down. Accordingly, it is suitable to change "upper" into "lower" and to change "lower" into "upper". In order to simplify the description, the same reference signs are attached to those having functions similar those of the lens holder driving device 10A according to the second exemplary embodiment and the description will later be made as regards only differences.

The lend barrel 12 has a shape like a hanging bell. In place of the shielding cover 42, a shielding wall 422A having a rectangular tubular shape and a second base (a cover) 424A are used. In the auto-focusing lens holder driving portion (an AF unit) 20B, a spacer 36A is mounted to the lower leaf spring 32 serving as a first leaf spring.

A configuration except for those is similar to the above-mentioned lens holder driving device 10A according to the second exemplary embodiment.

That is, damper compounds (not shown) are disposed between the fixed member 13 and the auto-focusing lens holder driving portion (the AF unit) 20B serving as the movable portion.

Accordingly, the lens holder driving device 10B according to the third exemplary embodiment of the present invention has effects similar to those of the above-mentioned lens holder driving device 10A according to the second exemplary embodiment.

While this invention has been particularly shown and described with reference to the exemplary embodiments thereof, the invention is not limited to the embodiment. It will be understood by those of ordinary skill in the art that various changes in form and details may be therein without departing from the spirit and scope of the present invention as defined by the claims.

For example, although the four suspension wires 16 are used as the supporting member for swingably supporting the auto-focusing lens holder driving portion (the lens holder moving portion) with respect to the fixed member in the above-mentioned exemplary embodiments, the number of the suspension wires is not limited to four and therefore may be two or more. In addition, although the first leaf spring 32 for supporting the lens holder 24 in the direction of the optical axis O shiftably so as to position the lens holder 24 in the radial direction doubles as the elastic member which is mounted to the lens holder moving portion (26; 28; 30) and to which the damper compounds 65 are applied in the above-mentioned first exemplary embodiment, a spring member expressly meant for preventing the suspension wires 16 from rupturing may be used of course as a different part of the first leaf spring 32. Furthermore, although the protrusions 306a are provided to the magnet holder 30A in the above-mentioned second embodiment, as a substitute for this, it may adopt a configuration in which concave portions or convex portions are provided on the coil board 40 to stay the damper compounds in locations thereof.

The whole or part of the exemplary embodiments disclosed above can be described as, but not limited to, the following supplementary notes.

(Supplementary Note 1)
A lens holder driving device (10) comprising:
a lens holder moving portion (26; 28; 30) in which a lens holder (24) moves in a direction of an optical axis (O) and in first and second directions (X, Y) which are orthogonal to the optical axis (O) and which are perpendicular to each other; and
a fixed member (13) disposed apart from said lens holder moving portion in the direction of the optical axis (O),
wherein said lens holder driving device (10) comprises:
an elastic member (32, 34) mounted to said lens holder moving portion (26; 28; 30);
a plurality of suspension wires (16) having first end portions (161) fixed to said fixed member (13) at outer regions thereof, said plurality of suspension wires (16) extending along the optical axis (O) and having second end portions (162) fixed to said elastic member (32), said plurality of suspension wires (16) swingably supporting said lens holder moving portion (26; 28; 30) in the first direction (X) and the second direction (Y); and
at least one damper compound (65) disposed so as to enclose at least one suspension wire among said plurality of suspension wires, said damper compound (65) suppressing undesired resonance in said lens holder moving portion (26; 28; 30).

(Supplementary Note 2)
The lens holder driving device according to Supplementary note 1, wherein said lens holder moving portion (26; 28; 30) has first and second ends (30a, 30b) opposite to each other in the direction of the optical axis (O),
wherein said elastic member comprises first and second leaf springs (32, 34), mounted to the first and the second ends (30a, 30b) of said lens holder moving portion (26; 28; 30), respectively, supporting said lens holder (24) in the direction of the optical axis (O) shiftably,
wherein said fixed member (13) is disposed at a position in the vicinity of said second leaf spring (34),
wherein the second end portions (162) of said at least one suspension wire (16) is fixed to said first leaf spring (32) at a wire fixing portion (328) thereof.

(Supplementary Note 3)
The lens holder driving device according to Supplementary note 2, wherein said lens holder moving portion (26; 28; 30) comprises an extending portion (310) extending so as to enclose said at least one suspension wire (16) with a space at a position in the vicinity of said wire fixing portion (328),
wherein said at least one damper compound (65) is disposed in said extending portion (310) so as to enclose said at least one suspension wire (16).

(Supplementary Note 4)
The lens holder driving device according to Supplementary note 1, wherein said fixed member (13) comprises:
a base (14); and
a coil board (40) fixed on said base (14), said coil board (40) fixing the first end portions (161) of said plurality of suspension wires (16) at the outer regions thereof and including a driving coil (18) driving said lens holder moving portion (26; 28; 30) formed thereon,
wherein said driving coil (18) comprises driving coil portions (18f, 18b, 18l, 18r) mounted on said coil board (40) so as to oppose to permanent magnet pieces (mounted to said lens holder moving portion (26; 28; 30).

(Supplementary Note 5)
A camera module (70) comprising the lens holder driving device (10) according to Supplementary note 1, a lens barrel (12) held in said lens holder (24), and an image pickup device (76) picking up a subject image formed by said lens barrel (12).

(Supplementary Note 6)
A camera-equipped mobile terminal (80) in which the camera module (70) according to Supplementary note 5 is mounted.

(Supplementary Note 7)
A lens holder driving device (10A; 10B) comprising:
an auto-focusing lens holder driving portion (20A; 20B) moving a lens holder (24) holding a lens barrel (12) along an optical axis (O); and
an image stabilizer portion stabilizing image blurred by moving said auto-focusing lens holder driving portion (20A; 20B) in first and second directions (X, Y) which are orthogonal to the optical axis (O) and which are perpendicular to each other,
wherein said image stabilizer portion comprises:
a fixed member (13) disposed apart from said auto-focusing lens holder driving portion (20A; 20B) in the direction of the optical axis (0);
a plurality of suspension wires (16) having first end portions (161) fixed to said fixed portion (13) at outer regions thereof, said plurality of suspension wires (16) extending along the optical axis (O) and having second end portions (162) fixed to said auto-focusing lens holder driving portion (20A; 20B), said plurality of suspension wires (16) swingably supporting said auto-focusing lens holder driving portion (20A; 20B) in the first direction (X) and the second direction (Y); and at least one damper compound (65) disposed between said auto-focusing lens holder driving portion (20A; 20B) and said fixed member (13), said at least one damper compound (65) suppressing undesired resonance of said auto-focusing lens holder driving portion (20A; 20B) in the direction of the optical axis (O).

(Supplementary Note 8)

The lens holder driving device according to Supplementary note 7, wherein said auto-focusing lens holder driving portion (20A; 20B) comprises:

a focusing coil (26) fixed to said lens holder (24);

a permanent magnet (28) comprising four permanent magnet pieces (282f, 282b, 282l, 282r) which have first surfaces opposed to said focusing coil (26) and which are disposed outsides of said focusing coil (26) with respect to the optical axis (O) in a radial direction so as to oppose to each other in the first direction (X) and the second direction (Y);

a magnet holder (30), disposed around the periphery of said lens holder (24), holding said permanent magnet (28), said magnet holder (30) having first and second ends (30a, 30b) opposite to each other in the direction of the optical axis (O); and first and second leaf springs (32, 34), mounted to the first and the second ends (30a, 30b) of said magnet holder (30), supporting said lens holder (24) in the direction of the optical axis (O) shiftably so as to position said lens holder (24) in the radial direction, wherein said fixed member (13) is disposed at a position in the vicinity of said second leaf spring (34), wherein the second end portions (162) of said plurality of suspension wires (162) are fixed to said first leaf spring (32) at wire fixing portions (328) thereof;

wherein said magnet holder (30A) has at least one protrusion (306a) projecting toward said fixed member (13), wherein said at least one damper compound (65) is disposed between said protrusion (306a) and said fixed member (13).

(Supplementary Note 9)

The lens holder driving device according to Supplementary note 8, wherein said protrusion (306a) projects toward said fixed member (13) via a hole (344a) formed in said second leaf spring (34).

(Supplementary Note 10)

The lens holder driving device according to Supplementary note 8, wherein said fixed member (13) comprises:

a base (14); and a coil board (40) fixed on said base (14), said coil board (40) fixing the first end portions (161) of said plurality of suspension wires (16) at the outer regions thereof and including an image stabilizer coil (18) of said image stabilizer portion formed thereon, wherein said at least one damper compound (65) is disposed between said protrusion (306a) and said coil board (40).

(Supplementary Note 11)

The lens holder driving device according to Supplementary note 10, wherein said image stabilizer coil (18) comprising four image stabilizer coil portions (18f, 18b, 18l, 18r) mounted on said coil board (40) so as to oppose to second surfaces of said four permanent magnet pieces (282f, 282b, 282l, 282r) that are perpendicular of to the first surfaces.

(Supplementary Note 12)

The lens holder driving device according to Supplementary note 8, wherein said magnet holder (30A) has a guide groove (302a) guiding a dispenser for applying said at least one damper compound (65).

In this connection, inasmuch as reference signs in parentheses are attached in order to facilitate an understanding of this invention and are merely one example thereof, this invention is, of course, not limited to them.

What is claimed is:

1. A lens holder driving device comprising:

a lens holder moving portion in which a lens holder moves in a direction of an optical axis and in first and second directions which are orthogonal to the optical axis and which are perpendicular to each other, said lens holder moving portion having first and second ends opposite to each other in the direction of the optical axis; and a fixed member disposed apart from said lens holder moving portion in the direction of the optical axis, wherein said lens holder driving device comprises:

an elastic member mounted to said lens holder moving portion, said elastic member comprising first and second leaf springs, mounted to the first and the second ends of said lens holder moving portion, respectively, supporting said lens holder in the direction of the optical axis shiftably, said first leaf spring being arranged apart from said fixed member compared to said second leaf spring;

a plurality of suspension wires having first end portions fixed to said fixed member at outer regions thereof, said plurality of suspension wires extending along the optical axis and having second end portions fixed to said first leaf spring, said plurality of suspension wires swingably supporting said lens holder moving portion in the first direction and the second direction; and at least one damper compound disposed in the vicinity of said first leaf spring so as to enclose at least one suspension wire among said plurality of suspension wires, said damper compound suppressing undesired resonance in said lens holder moving portion.

2. The lens holder driving device as claimed in claim 1, wherein said lens holder moving portion comprises an extending portion extending so as to enclose said at least one suspension wire with a space at a position in the vicinity of a wire fixing portion of said first leaf spring, wherein said at least one damper compound is disposed in said extending portion so as to enclose said at least one suspension wire.

3. The lens holder driving device as claimed in claim 1, wherein said fixed member comprises:

a base; and a coil board fixed on said base, said coil board fixing the first end portions of said plurality of suspension wires at the outer regions thereof and including a driving coil driving said lens holder moving portion formed thereon, wherein said driving coil comprises driving coil portions mounted on said coil board so as to oppose to permanent magnet pieces mounted to said lens holder moving portion.

4. A camera module comprising the lens holder driving device as claimed in claim 1, a lens barrel held in said lens holder, and an image pickup device picking up a subject image formed by said lens barrel.

5. A camera-equipped mobile terminal in which the camera module as claimed in claim 4 is mounted.

* * * * *